(12) United States Patent
Lee et al.

(10) Patent No.: US 12,034,109 B2
(45) Date of Patent: Jul. 9, 2024

(54) ELECTRODE ASSEMBLY, BATTERY, AND BATTERY PACK AND VEHICLE INCLUDING THE SAME

(71) Applicant: LG ENERGY SOLUTION, LTD., Seoul (KR)

(72) Inventors: Jae-Eun Lee, Daejeon (KR); Jong-Sik Park, Daejeon (KR); Hak-Kyun Kim, Daejeon (KR); Je-Jun Lee, Daejeon (KR); Jae-Won Lim, Daejeon (KR); Yu-Sung Choe, Daejeon (KR); Byoung-Gu Lee, Daejeon (KR); Duk-Hyun Ryu, Daejeon (KR); Kwan-Hee Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/288,979

(22) PCT Filed: Jul. 19, 2022

(86) PCT No.: PCT/KR2022/010565
§ 371 (c)(1),
(2) Date: Oct. 30, 2023

(87) PCT Pub. No.: WO2023/090577
PCT Pub. Date: May 25, 2023

(65) Prior Publication Data
US 2024/0088425 A1    Mar. 14, 2024

(30) Foreign Application Priority Data

Nov. 19, 2021  (KR) .................. 10-2021-0160469
Nov. 19, 2021  (KR) .................. 10-2021-0160474
(Continued)

(51) Int. Cl.
*H01M 50/107*       (2021.01)
*B60L 50/64*        (2019.01)
(Continued)

(52) U.S. Cl.
CPC ......... *H01M 10/0431* (2013.01); *B60L 50/64* (2019.02); *H01M 50/107* (2021.01);
(Continued)

(58) Field of Classification Search
CPC .......... H01M 10/0431; H01M 50/107; H01M 50/186; H01M 50/567; H01M 50/152;
(Continued)

(56) References Cited

U.S. PATENT DOCUMENTS 6,677,082 B2   1/2004  Thackeray et al.
6,680,143 B2   1/2004  Thackeray et al.
(Continued)

FOREIGN PATENT DOCUMENTS

CN   106257710 A   12/2016
CN   106654390 A    5/2017
(Continued)

OTHER PUBLICATIONS

International Search Report (PCT/ISA/210) issued in PCT/KR2022/010565, dated Nov. 16, 2022.
(Continued)

*Primary Examiner* — Lingwen R Zeng
(74) *Attorney, Agent, or Firm* — Birch, Stewart, Kolasch & Birch, LLP

(57) ABSTRACT

An electrode assembly, a battery, a battery pack and a vehicle including the same are provided. In the electrode assembly, the uncoated portion of an electrode includes a segment region divided into a plurality of segments, and the segment region includes a plurality of segment groups separated by a group separation pitch along a winding (Continued)

direction. One end of the electrode assembly includes a plurality of segment alignments. In winding turns corresponding to the plurality of segment alignments, group separation pitches of segment groups disposed in a same winding turn are substantially identical, and separation pitches of the segment groups is greater in a winding turn of a region adjacent to the outer circumference of the electrode assembly than in a winding turn of a region adjacent to the core of the electrode assembly.

36 Claims, 34 Drawing Sheets

(30) Foreign Application Priority Data

Nov. 19, 2021 (KR) .................. 10-2021-0160823
Jun. 22, 2022 (KR) .................. 10-2022-0076274

(51) Int. Cl.
*H01M 10/04* (2006.01)
*H01M 50/152* (2021.01)
*H01M 50/167* (2021.01)
*H01M 50/186* (2021.01)
*H01M 50/213* (2021.01)
*H01M 50/567* (2021.01)

(52) U.S. Cl.
CPC ....... *H01M 50/152* (2021.01); *H01M 50/167* (2021.01); *H01M 50/186* (2021.01); *H01M 50/213* (2021.01); *H01M 50/567* (2021.01); *H01M 2220/20* (2013.01)

(58) Field of Classification Search
CPC ............. H01M 50/167; H01M 50/213; H01M 2220/20; B60L 50/64
See application file for complete search history.

(56) References Cited

U.S. PATENT DOCUMENTS

| 2005/0287428 | A1* | 12/2005 | Cheon ................ H01M 50/528 |
| | | | 429/211 |
| 2020/0295341 | A1 | 9/2020 | Kim et al. |
| 2021/0344033 | A1 | 11/2021 | Park et al. |

FOREIGN PATENT DOCUMENTS

| JP | 2009-224070 A | 10/2009 |
| JP | 4401634 B2 | 1/2010 |
| JP | 2011-171107 A | 9/2011 |
| KR | 10-0515832 B1 | 9/2005 |
| KR | 10-2005-0121904 A | 12/2005 |
| KR | 10-2018-0116156 A | 10/2018 |
| KR | 10-2020-0041625 A | 4/2020 |

OTHER PUBLICATIONS

Written Opinion of the International Searching Authority (PCT/ISA/237) issued in PCT/KR2022/010565, dated Nov. 16, 2022.

* cited by examiner

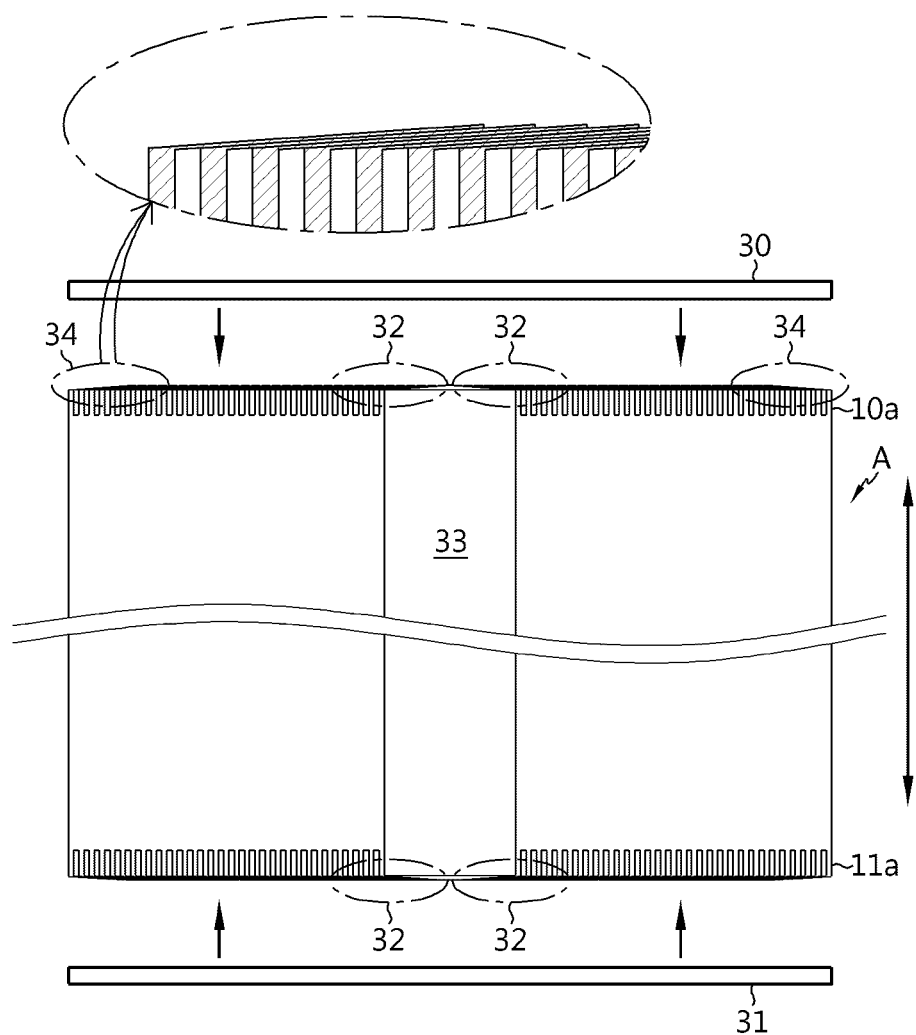

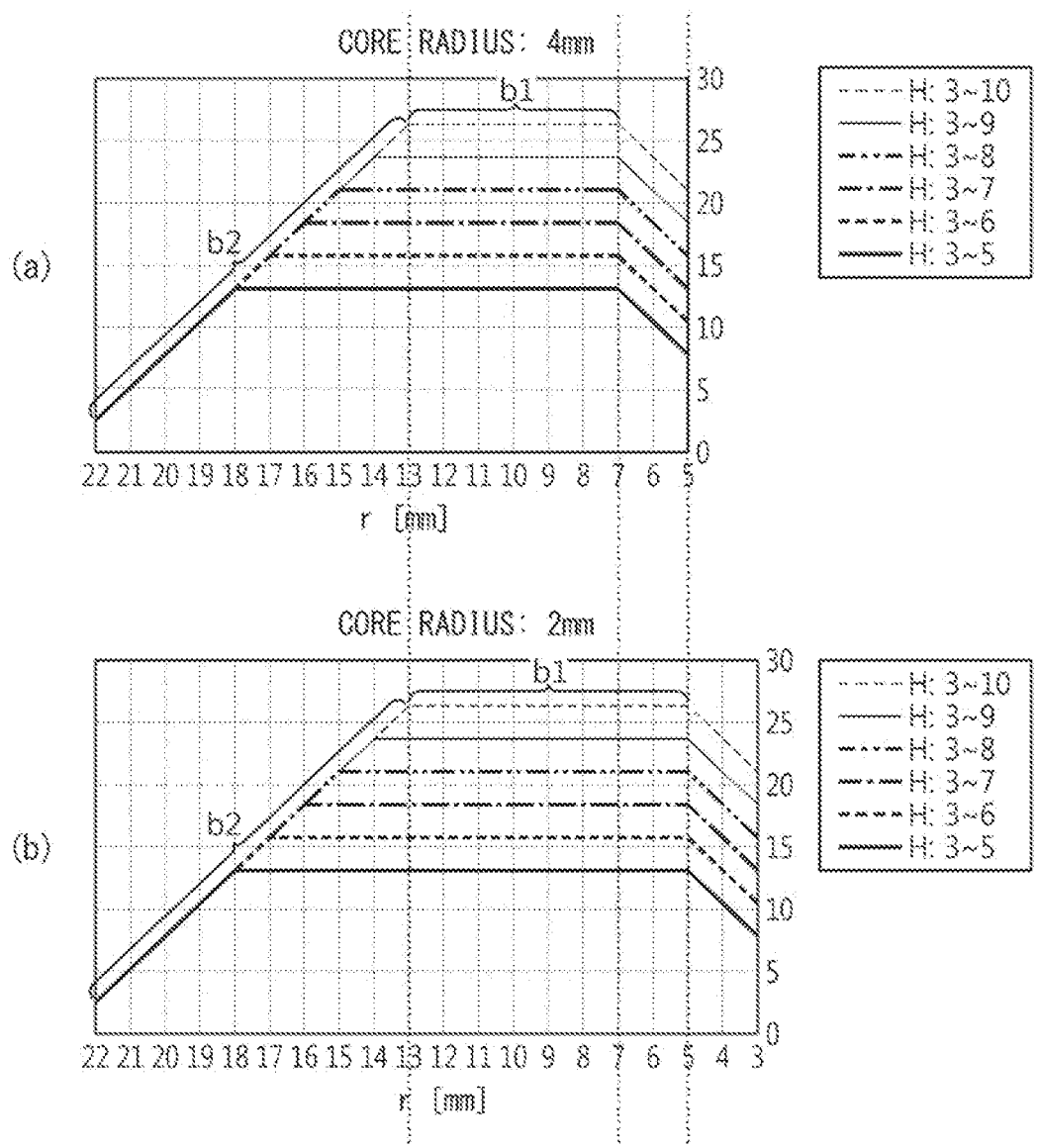

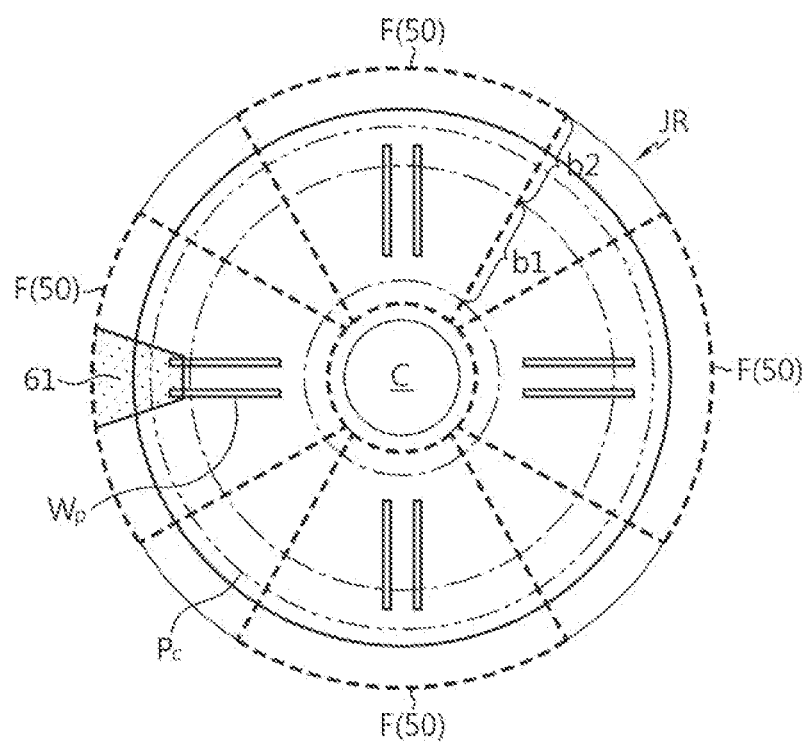

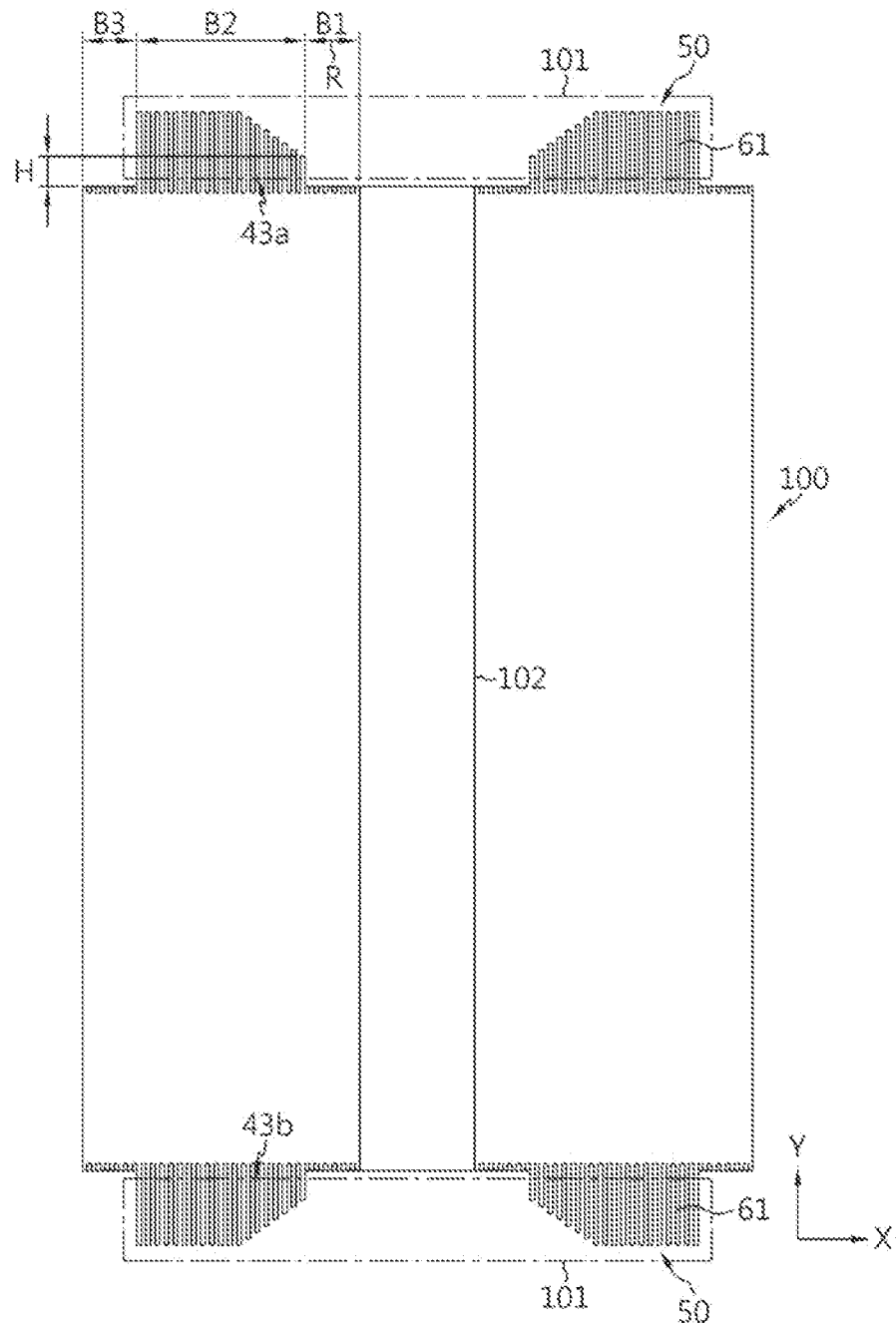

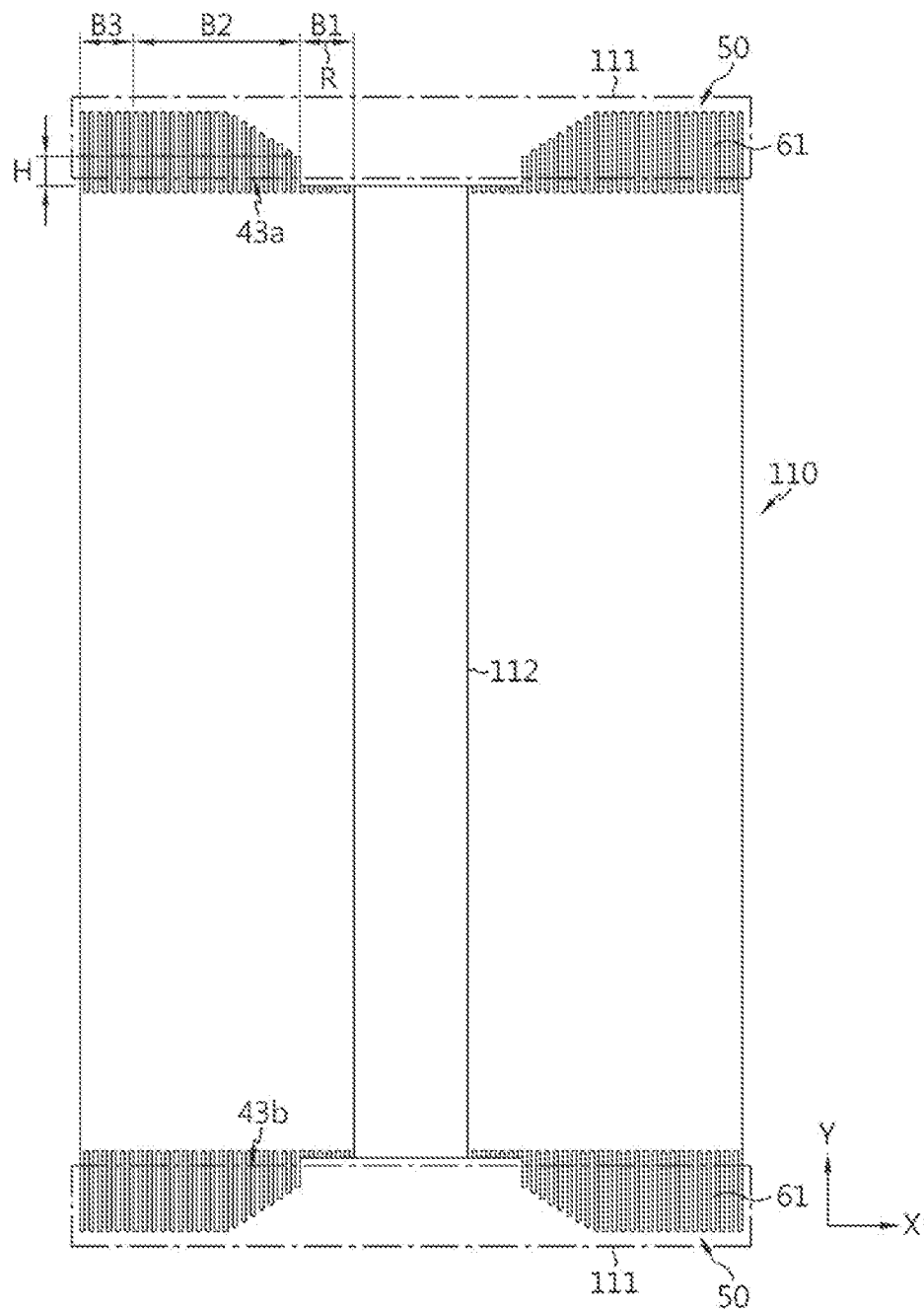

ELECTRODE ASSEMBLY, BATTERY, AND BATTERY PACK AND VEHICLE INCLUDING THE SAME

TECHNICAL FIELD

The present disclosure relates to an electrode assembly, a battery, and a battery pack and a vehicle including the same.

The present application claims priority to Korean Patent Application Nos. 10-2021-0160469, 10-2021-0160474 and 10-2021-0160823 filed on Nov. 19, 2021, in the Republic of Korea, and Korean Patent Application No. 10-2022-0076274 filed on Jun. 22, 2022, in the Republic of Korea, the disclosures of which are incorporated herein by reference.

BACKGROUND ART

Secondary batteries (hereinafter, batteries) that are easily applicable to various product groups and have electrical characteristics such as high energy density are universally applied not only to portable devices but also to electric vehicles (EVs) or hybrid electric vehicles (HEVs) driven by an electric drive source.

These batteries are attracting attention as a new energy source to improve eco-friendliness and energy efficiency because they have the primary advantage that they can dramatically reduce the use of fossil fuels as well as the secondary advantage that no by-products are generated from the use of energy.

Batteries currently widely used in the art include lithium-ion batteries, lithium polymer batteries, nickel cadmium batteries, nickel hydrogen batteries, nickel zinc batteries, and the like. A unit battery, namely a unit battery, has an operating voltage of about 2.5V to 4.5V. Therefore, when a higher output voltage is required, a battery pack may be configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of unit battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap plate of a sealing body that seals the opening of the battery housing, and the negative electrode terminal is the battery housing. However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor of 1865 or 2170, resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collecting plate is welded to the uncoated portion to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collecting plate to a bending surface region of an uncoated portion.

Referring to FIGS. 1 to 3, a positive electrode 10 and a negative electrode 11 have a structure in which a current collector sheet 20 is coated with an active material 21, and include an uncoated portion 22 at one long side along the winding direction X. The long side means a relatively long side in a direction parallel to the X-axis direction.

An electrode assembly A is manufactured by sequentially stacking the positive electrode 10 and the negative electrode 11 together with two sheets of separators 12 as shown in FIG. 2 and then winding them in one direction X. At this time, the uncoated portions of the positive electrode 10 and the negative electrode 11 are arranged in opposite directions.

After the winding process, the uncoated portion 10a of the positive electrode 10 and the uncoated portion 11a of the negative electrode 11 are bent toward the core. After that, current collecting plates 30, 31 are welded and coupled to the uncoated portions 10a, 11a, respectively.

An electrode tab is not separately coupled to the positive electrode uncoated portion 10a and the negative electrode uncoated portion 11a, the current collecting plates 30, 31 are connected to external electrode terminals, and a current path is formed with a large cross-sectional area along the winding axis direction of electrode assembly A (see arrow), which has an advantage of lowering the resistance of the battery. This is because resistance is inversely proportional to the cross-sectional area of the path through which the current flows.

In the tab-less cylindrical battery, in order to improve the welding characteristics between the uncoated portions 10a, 11a and the current collecting plates 30, 31, a strong pressure must be applied to the welding regions of the uncoated portions 10a, 11a to bend the uncoated portions 10a, 11a as flat as possible.

When bending welding regions of the uncoated portions 10a, 11a, the shapes of the uncoated portions 10a, 11a may be irregularly distorted and deformed. In this case, the deformed portion may contact an electrode of the opposite polarity to cause an internal short circuit or cause fine cracks in the uncoated portions 10a, 11a.

In addition, when the electrode assembly is manufactured in a state where the uncoated portions 10a, 11a are bent, there is a problem in that the process efficiency is lowered in the electrolyte injection process that proceeds after inserting the electrode assembly into the battery housing. Since there are not enough gaps in the bending surface region of the uncoated portions 10a, 11a, which cover the entire upper and lower surfaces of the electrode assembly A, it takes a lot of time for an electrolyte to permeate into the inner space of the electrode assembly, and the uniformity of electrolyte impregnation in the radial direction of electrode assembly A deteriorates.

Therefore, it is necessary to improve the structure of the uncoated portions 10a, 11a, which may improve the electrolyte impregnation (rate and uniformity) while improving the bending quality of the uncoated portions 10a, 11a.

DISCLOSURE

Technical Problem

The present disclosure is designed to solve the problems of the related art, and therefore the present disclosure is directed to providing an electrode assembly having an uncoated portion structure that is improved to relieve stress applied to uncoated portions when the uncoated portions exposed at both ends of an electrode assembly are bent.

The present disclosure is also directed to providing an electrode assembly, which may improve electrolyte impregnation (rate and uniformity) by applying a plurality of segments to the uncoated portion of the electrode, arranging the plurality of segments in a predetermined direction when the electrode is wound, and exposing the end of the active material layer formed on the electrode in a region where the segments are not disposed.

The present disclosure is also directed to providing an electrode assembly in which the electrolyte injection passage is not blocked even when the uncoated portion is bent.

The present disclosure is also directed to providing an electrode assembly with improved properties of the welding region by applying a segment structure to the uncoated portion of the electrode and sufficiently increasing the segment stack number in the area used as the welding target area.

The present disclosure is also directed to providing an electrode assembly with improved energy density and reduced resistance by applying a structure in which a current collecting plate is welded to the bending surface region formed by bending the segments.

The present disclosure is also directed to providing a battery including a terminal and a current collecting plate with an improved design so that electrical wiring may be performed at the upper portion.

The present disclosure is also directed to providing a battery including the electrode assembly having an improved structure, a battery pack including the battery, and a vehicle including the battery pack.

The technical objects to be solved by the present disclosure are not limited to the above, and other objects not mentioned herein will be clearly understood by those skilled in the art from the following disclosure.

Technical Solution

In one aspect of the present disclosure, there is provided an electrode assembly in which a first electrode, a second electrode, and a separator interposed therebetween are wound in a winding direction about a winding axis to define a core and an outer circumference of the electrode assembly.

The first electrode may include a first active material portion coated with an active material layer along the winding direction and a first uncoated portion not coated with an active material layer in which the first uncoated portion protrudes beyond the separator.

The first uncoated portion may include a region divided into a plurality of independently bendable segments by a plurality of cut grooves along the winding direction.

The segment region may include a plurality of segment groups separated by a group separation pitch along the winding direction, and a first end of the electrode assembly may include a plurality of segment alignments in which the plurality of segment groups are aligned to be overlapped along a radial direction of the electrode assembly.

The overlapping of the plurality of segments included in the segment alignment in the radial direction means that, when a predetermined straight line passing through the segment alignment is drawn from the center of the core of the electrode assembly, all segments intersect the corresponding straight line.

The segments included in each segment alignment may be bent along the radial direction to form a bending surface region.

In winding turns corresponding to the plurality of segment alignments, group separation pitches of segment groups disposed in a same winding turn may be substantially identical, and separation pitches of the segment groups may be greater in a winding turn of a region adjacent to the outer circumference of the electrode assembly than in a winding turn of a region adjacent to the core of the electrode assembly.

Each segment alignment may include a radial region in which the group separation pitch increases stepwise or gradually from the winding turn of the region adjacent to the core of the electrode assembly toward the winding turn of the region adjacent to the outer circumference of the electrode assembly.

The bending surface region of each segment alignment may partially define a surface of the first end of the electrode assembly.

The bending surface region of each segment alignment may approximately have a shape of a geometric figure, and widths in the winding direction of segment groups located within the geometric figure may increase stepwise or gradually along the radial direction of the electrode assembly.

The geometric figure may have a fan shape.

Alternatively, the geometric figure may have a rectangular or trapezoidal shape.

An electrolyte impregnation portion is defined between adjacent bending surface regions in a circumferential direction of the electrode assembly, whereby an end of the first active material portion is recessed inward from the first end of the electrode assembly relative to an end of the separator such that the end of the first active material portion is exposed between the winding turns of the separator.

The plurality of segment alignments may extend radially based on the center of the core of the electrode assembly.

Each of the electrolyte impregnation portions may extend radially based on the center of the core of the electrode assembly.

The plurality of segment alignments may extend in a cross (+) shape, a radial (X) shape or a linear shape based on the center of the core of the electrode assembly, when viewed along the winding axis of the electrode assembly.

When a line connecting a center of the core of the electrode assembly and a geometric center of a figure approximately corresponding to the bending surface region is defined as an angle measurement line, angles between adjacent angle measurement lines of adjacent bending surface regions in a circumferential direction of the electrode assembly may be substantially identical.

When a line connecting a center of the core of the electrode assembly and a geometric center of a figure approximately corresponding to the bending surface region is defined as an angle measurement line, an angle between adjacent angle measurement lines of adjacent bending surface regions in a circumferential direction of the electrode assembly may be 30°±10°, 40°±10°, 45°±10°, 60°±10°, 72°±10°, 90°±10°, 120°±10° or 180°±10°.

When a line connecting a center of the core of the electrode assembly and a geometric center of a figure approximately corresponding to the bending surface region is defined as an angle measurement line, an angle between adjacent angle measurement lines of adjacent bending surface regions in a circumferential direction of the electrode assembly may be 90°±10°, and the group separation pitch between segment groups disposed in a same winding turn may be set within the range of 8 mm to 50 mm. Here, the group separation pitch may increase stepwise or gradually as the number of winding turns increases.

When a line connecting a center of the core of the electrode assembly and a geometric center of a figure approximately corresponding to the bending surface region is defined as an angle measurement line, an angle between adjacent angle measurement lines of adjacent bending surface regions in a circumferential direction of the electrode assembly may be 180°±10°, and the group separation pitch between segment groups disposed in a same winding turn may be set within the range of 30 mm to 90 mm. Here, the group separation pitch may increase stepwise or gradually as the number of winding turns increases.

Each of the segments may have the shape of a geometric figure in which one or more straight lines, one or more curved lines, or combinations thereof are connected.

Each of the segments may have a greater width in a lower portion than in an upper portion along the winding axis.

Each of the segments may have a tapered shape in which the width decreases gradually or continuously from a lower portion toward an upper portion along the winding axis.

Each segment alignment may include a height variable region in which heights of the segments increase stepwise from a first height ($h_1$) to an N–1$^{th}$ height ($h_{N-1}$, N is a natural number of 3 or more) from the core of the electrode assembly toward the outer circumference of the electrode assembly, and a height uniform region in which heights of the segments are uniform as an N$^{th}$ height ($h_N$, greater than $h_{N-1}$).

When a starting radius of a winding turn containing a segment with a height $h_k$ (k is a natural number of 1 to N) is $r_k$ and the radius of the core of the electrode assembly is $r_c$, the height $h_k$ of the segment may satisfy the following formula:

$$2 \text{ mm} \leq h_k \leq r_k - \alpha * r_c \ (\alpha \text{ is } 0.90 \text{ to } 1).$$

Based on a cross section along the winding axis direction, and sequentially along the radial direction of the electrode assembly, the segment alignment may include a segment skip region having no segment, a height variable region where heights of the segments vary, and a height uniform region where heights of the segments are uniform, whereby the plurality of segments may be disposed in the height variable region and the height uniform region.

When the number of segments meeting an imaginary line parallel to the winding axis direction at an arbitrary radius location of each bending surface region based on a center of the core of the electrode assembly is defined as a stack number of the segments at the corresponding radius location, the bending surface region may include, from the core of the electrode assembly toward the outer circumference of the electrode assembly, a stack number uniform region where the stack number of the segments is uniform and a stack number decrease region where the stack number of the segments decreases toward the outer circumference of the electrode assembly.

In the stack number uniform region, the stack number of the segments may be 10 to 35.

The first electrode may be a positive electrode, and a stack thickness of the segments in the stack number uniform region may be in the range of 100 μm to 875 μm.

The first electrode may be a negative electrode, and a stack thickness of the segments in the stack number uniform region may be in the range of 50 μm to 700 μm.

The second electrode may include a second active material portion coated with an active material layer and a second uncoated portion not coated with an active material layer along the winding direction, the second uncoated portion may include a segment region divided into a plurality of independently bendable segments by a plurality of cut grooves provided along the winding direction, the segment region of the second uncoated portion may include a plurality of segment groups separated by a group separation pitch along the winding direction, a second end of the electrode assembly may include a plurality of segment alignments in which the plurality of segment groups of the second uncoated portion are aligned along the radial direction of the electrode assembly, the segments included in each segment alignment of the second uncoated portion may be bent along the radial direction to form a bending surface region, and in winding turns corresponding to the plurality of segment alignments of the second uncoated portion, group separation pitches of segment groups disposed in a same winding turn may be substantially identical, and separation pitches of the segment groups of the second uncoated portion may be greater in a winding turn of a region adjacent to the outer circumference of the electrode assembly than in the winding turn of the region adjacent to the core of the electrode assembly.

The plurality of segment alignments included in the first end of the electrode assembly and the plurality of segment alignments included in the second end of the electrode assembly may be disposed to be plane-symmetrical to each other.

The total number of winding turns of the electrode assembly may be 20 to 55, and the electrode assembly may have a diameter of 35 mm to 50 mm.

In another aspect of the present disclosure, there is also provided a battery, comprising an electrode assembly having one or more features described above.

The battery may also comprise a battery housing configured to accommodate the electrode assembly therein, the battery housing having an open end, the battery housing being electrically connected to one of the first electrode and the second electrode to have a first polarity; a sealing body configured to seal the open end of the battery housing; and a terminal having a surface exposed outside the battery housing, the terminal being electrically connected to another of the first electrode and the second electrode to have a second polarity.

The battery may further comprise a beading portion at the open end of the battery housing; a current collecting plate electrically coupled to the bending surface regions; and an insulator configured to cover the current collecting plate, the insulator having an edge interposed and fixed between an inner circumference of the beading portion and the current collecting plate.

In the battery, the electrode assembly may have a cavity may at the core of the electrode assembly, and the cavity may not be blocked by the bending surface regions such that the cavity is exposed to outside the electrode assembly.

The sealing body may include a cap plate configured to seal the open end of the battery housing, and a gasket configured to surround an edge of the cap plate and crimped to the open end of the battery housing, and the terminal having the second polarity may be the cap plate.

The battery according to the present disclosure may further include a current collecting plate electrically connected to an uncoated portion of a second electrode having the first polarity, at least a part of an edge of the current collecting plate being coupled to a sidewall of the battery housing. In this case, the sealing body may include a cap plate with no polarity and a gasket configured to surround an edge of the cap plate, the gasket being crimped to the open end of the battery housing, the battery housing may include a perforation hole in a center of a closed surface of the battery housing opposite the open end of the battery housing, and the terminal is a rivet terminal extending through the perforation hole, the terminal being insulated from the battery can and electrically connected to the first electrode to have the second polarity.

In another aspect of the present disclosure, there is also provided a battery pack, comprising a plurality of batteries having at least one of the above features.

In another aspect of the present disclosure, there is also provided a vehicle, comprising the battery pack.

Advantageous Effects

According to one aspect of the present disclosure, the internal resistance of the battery may be reduced, and the energy density may be increased by using the uncoated portion itself protruding at the upper portion and the lower portion of the electrode assembly as an electrode tab.

According to still another aspect of the present disclosure, the uncoated portion may be prevented from being torn when the uncoated portion is bent by improving the structure of the uncoated portion of the electrode assembly, and the welding strength of the current collecting plate may be improved by sufficiently increasing the number of overlapping layers of the uncoated portion.

According to still another aspect of the present disclosure, it is possible to improve electrolyte impregnation (rate and uniformity) by applying a plurality of segments to the uncoated portion of the electrode, arranging the plurality of segments in a predetermined direction when the electrode is wound, and exposing the end of the active material layer formed on the electrode between the winding turn of the separator in a region where the segments are not disposed.

According to still another aspect of the present disclosure, by sufficiently increasing the segment stack number in the area used as the welding target area, it is possible to improve the physical properties of the area where the current collecting plate is welded.

According to still another aspect of the present disclosure, an electrode assembly having improved energy density and reduced resistance may be provided by applying a structure in which a current collecting plate is welded to the bending surface region formed by bending the segments.

According to still another aspect of the present disclosure, a cylindrical battery having an improved design so that electrical wiring can be performed at the upper portion thereof may be provided.

According to still another aspect of the present disclosure, by improving the structure of the uncoated portion adjacent to the core of the electrode assembly, the cavity in the core of the electrode assembly is prevented from being blocked when the uncoated portion is bent, so that the electrolyte injection process and the process of welding the battery housing (or, rivet terminal) and the current collecting plate may be easily performed.

According to still another aspect of the present disclosure, it is possible to provide a cylindrical battery having a structure in which the internal resistance is low, an internal short circuit is prevented, and the welding strength between the current collecting plate and the uncoated portion is improved, and a battery pack and a vehicle including the cylindrical battery.

In particular, the present disclosure may provide a cylindrical battery having a ratio of diameter to height of 0.4 or more and a resistance of 4 milliohm or less, and a battery pack and a vehicle including the cylindrical battery.

In addition, the present disclosure may have several other effects, and such effects will be described in each embodiment, or any description that can be easily inferred by a person skilled in the art will be omitted for an effect.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a diagram showing a process of welding a current collecting plate to a bending surface region of an uncoated portion in the conventional tab-less cylindrical battery.

FIG. 11c is graphs showing the results of counting the stack number of segments measured along the radial direction in the bending surface region of the positive electrode formed at the upper portion of the electrode assembly according to the embodiments 6-1 to 6-6 and the embodiments 7-1 to 7-6.

FIG. 12 is a top plan view of the electrode assembly showing a stack number uniform region b1 and a stack number decrease region b2 in the bending surface region of the segment according to an embodiment of the present disclosure.

FIG. 13 is a cross-sectional view of a jelly-roll type electrode assembly in which the electrode according to an embodiment of the present disclosure is applied to a first electrode (positive electrode) and a second electrode (negative electrode), taken along the Y-axis direction (winding axis direction) to pass through the segment alignment.

FIG. 14 is a cross-sectional view of a jelly-roll type electrode assembly in which an electrode according to another embodiment of the present disclosure is applied to the first electrode (positive electrode) and the second electrode (negative electrode), taken along the Y-axis direction (winding axis direction) to pass through the segment alignment.

BEST MODE

Figure 1:
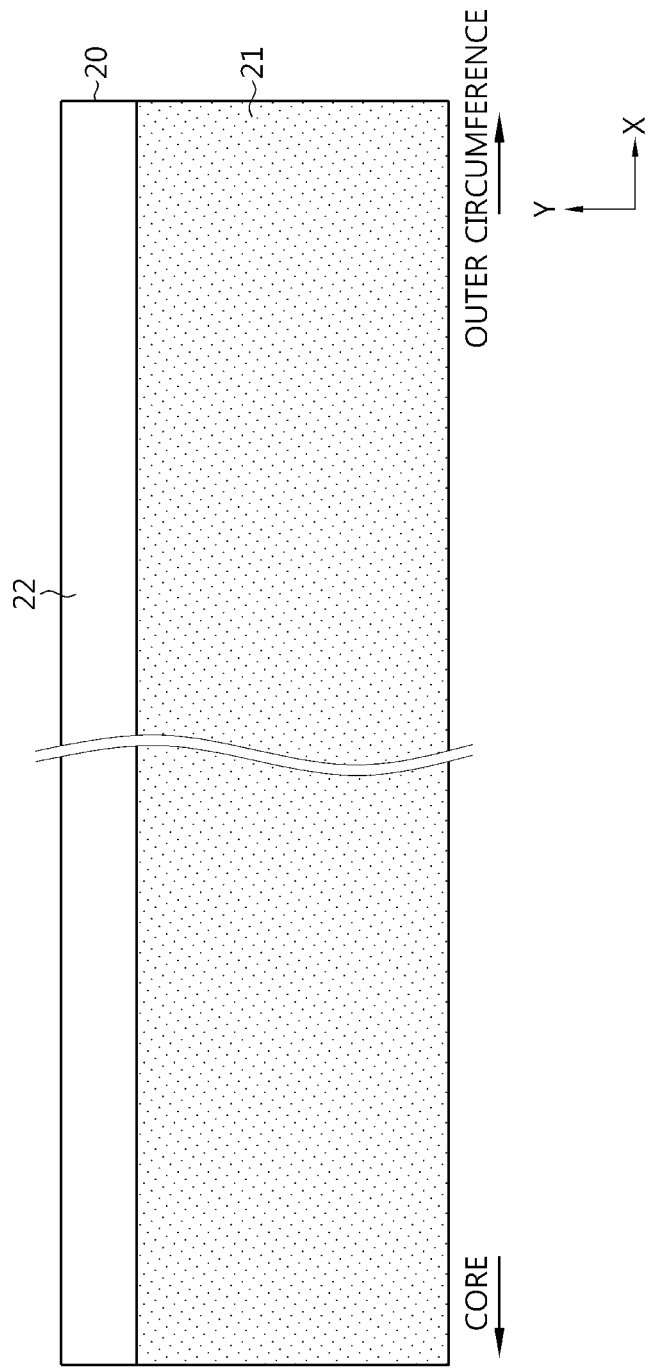
FIG. 1 is a plan view showing a structure of an electrode used for manufacturing a conventional tab-less cylindrical battery.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help understanding of the present disclosure, the accompanying drawings are not drawn to scale, and the dimensions of some components may be exaggerated. In addition, the same reference numerals may be assigned to the same elements in different embodiments.

When it is explained that two objects are 'identical', this means that these objects are 'substantially identical'.

Accordingly, the substantially identical objects may include deviations considered low in the art, for example, deviations within 5%. Also, when it is explained that certain parameters are uniform in a region, this may mean that the parameters are uniform in terms of an average in the corresponding region.

In addition, terms such as "about" or "approximately" refer to cases where there is a deviation of about 1%, 2%, 3%, . . . , 20% based on the number for which the corresponding term is used.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

When an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Throughout the specification, "A and/or B" refers to either A or B or both A and B unless expressly stated otherwise, and "C to D" refers to C or greater and D or smaller unless expressly stated otherwise.

A direction that goes along a lengthwise direction of a winding axis of an electrode assembly wound in a roll shape is herein referred to as an axis direction Y. Additionally, a direction around the winding axis is herein referred to as a circumferential or peripheral direction X. Additionally, a direction that gets closer to or faces away from the winding axis is referred to as a radial direction. Among them, in particular, the direction that gets closer to the winding axis is referred to as a centripetal direction, and the direction that faces away from the winding axis is referred to as a centrifugal direction.

First, an electrode assembly according to an embodiment of the present disclosure will be described. The electrode assembly is a jelly-roll type electrode assembly in which a first electrode and a second electrode having a sheet shape and a separator interposed therebetween are wound in one direction.

Preferably, at least one of the first electrode and the second electrode includes an uncoated portion not coated with an active material at a long side end in the winding direction. At least a part of the uncoated portion is used as an electrode tab by itself. That is, a tab in the form of a strip is not separately attached to the uncoated portion, and a part of the uncoated portion is used as the tab.

Figure 4A:
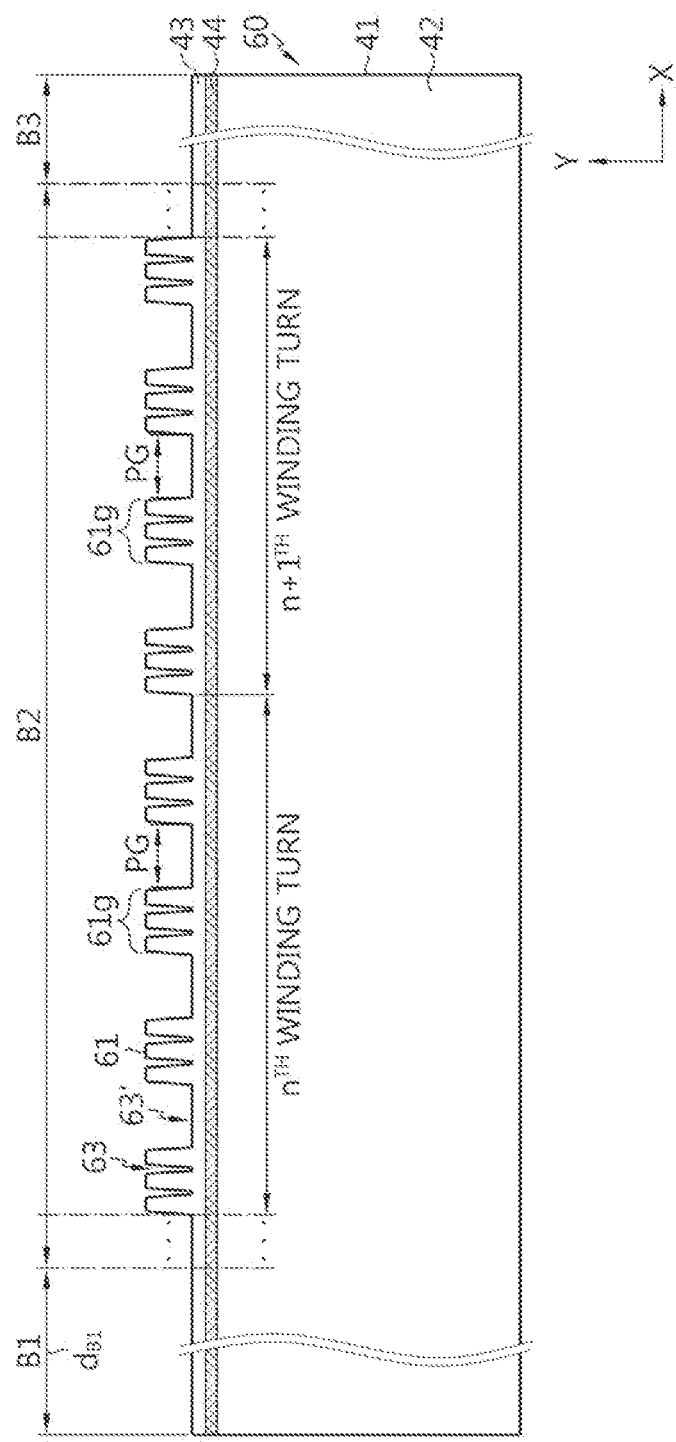
FIG. 4a is a plan view showing a structure of an electrode according to an embodiment of the present disclosure.
Figure 4B:
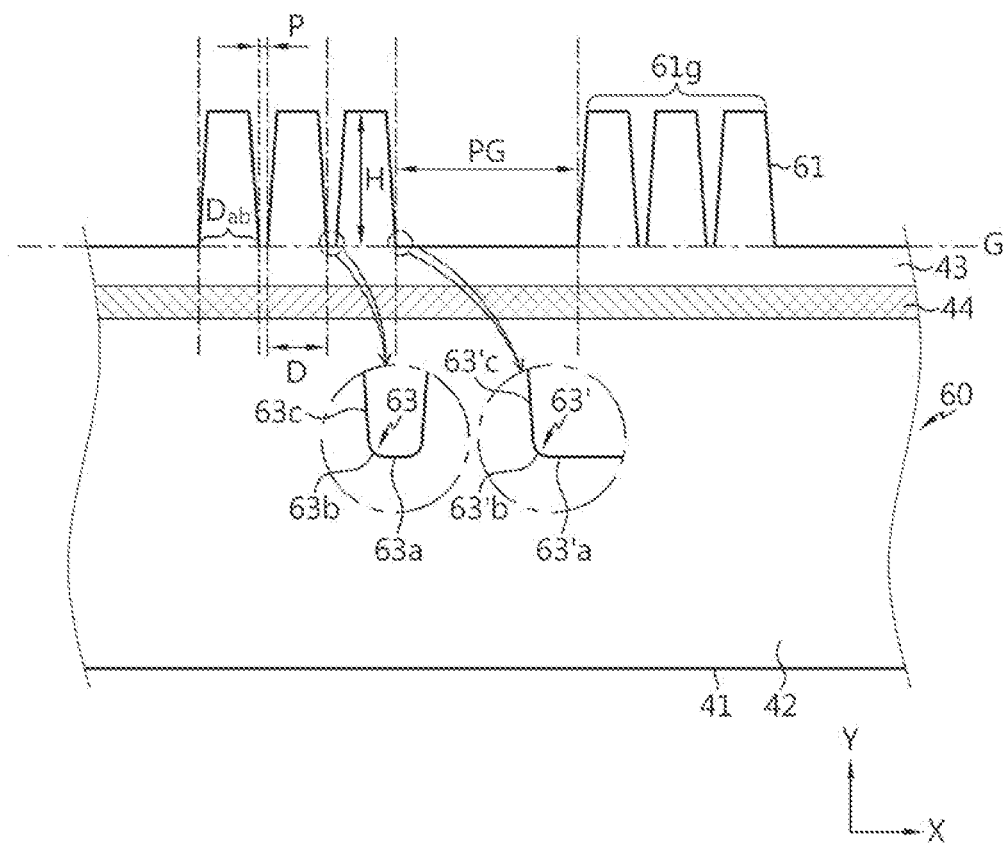
FIG. 4b is a diagram showing definitions of a width in the winding direction, a height in the winding axis direction, and a pitch in the winding direction of segments and a group separation pitch between segment groups according to an embodiment of the present disclosure.

FIG. 4a is a plan view showing the structure of an electrode 60 according to an embodiment of the present disclosure, and FIG. 4b is a diagram showing definitions of parameters of segments 61 and a separation pitch between segment groups 61g.

Referring to FIGS. 4a and 4b, the electrode 60 according to an embodiment includes a sheet-shaped current collector 41 and an active material layer 42. The current collector 41 may be made of a metal foil. The metal foil may be a conductive metal such as aluminum or copper. The current collector 41 may be appropriately selected according to the polarity of the electrode 60. The metal foil may be replaced with a metal mesh or the like. The metal foil may have a structure in which metal thin films are coated on both surfaces of a substrate made of an insulation film. The active material layer 42 is formed on at least one surface of the current collector 41. The active material layer 42 is formed along the winding direction X. The electrode 60 includes an uncoated portion 43 at the long side end in the winding direction X. The uncoated portion 43 is a partial area of the current collector 41 not coated with the active material. In the electrode 60, the area of the current collector 41 where the active material layer 42 is formed may be called an active material portion.

The width of the electrode 60 along the short side of the current collector 41 may be 60 mm to 70 mm, and the length of the electrode 60 along the long side of the current collector 41 may be 3 m to 5 m. Therefore, the ratio of the short side to the long side of the electrode 60 may be 1.2% to 2.3%. This ratio is significantly smaller than 6% to 11% that is the ratio of the short side to the long side of an electrode used in a cylindrical battery with a form factor of 1865 or 2170.

Preferably, an insulating coating layer 44 may be formed at a boundary between the active material layer 42 and the uncoated portion 43. The insulating coating layer 44 is formed such that at least a part thereof overlaps with the boundary between the active material layer 42 and the uncoated portion 43. The insulating coating layer 44 prevents a short circuit between two electrodes having different polarities and facing each other with a separator interposed therebetween. The insulating coating layer 44 may cover a boundary between the active material layer 42 and the uncoated portion 43 with a width of 0.3 mm to 5 mm. The insulating coating layer 44 may include a polymer resin and an inorganic filler such as $Al_2O_3$ or $SiO_2$. Since the portion of the current collector 41 covered by the insulating coating layer 44 is not an area coated with an active material layer, it may be regarded as an uncoated portion.

The uncoated portion 43 includes a first portion B1 adjacent to the core, a second portion B3 adjacent to the outer circumference, and a third portion B2 interposed between the first portion B1 and the second portion B3. The core and the outer circumference refer to a central region and an outer circumferential region of the electrode assembly when the electrode 60 is wound into an electrode assembly.

Among the first portion B1, the second portion B3 and the third portion B2, the third portion B2 has the longest length and occupies most of the length of the electrode 60. The first portion B1 may form a plurality of winding turns adjacent to the core of the electrode assembly. The second portion B3 may form one or more winding turns adjacent to the outer circumference of the electrode assembly.

The third portion B2 corresponds to a segment region. The segment region has a structure in which the uncoated portion 43 is divided into a plurality of segments 61. The segments 61 may be bent independently.

In one aspect, each of the segments 61 may have a greater width in a lower portion rather than in an upper portion. In another aspect, each of the segments 61 may have a tapered shape in which the width decreases gradually or continuously from the lower portion toward the upper portion.

Preferably, the segment 61 may have a trapezoidal shape. Alternatively, the segment 61 may have a shape such as a rectangular, parallelogram, semicircular or semielliptical shape. As will be described later, the geometric shape of the segment 61 may be modified in various ways.

The segment 61 may be formed by laser notching. Alternatively, the segment 61 may be formed by a known metal foil cutting process such as ultrasonic cutting or punching.

The third portion B2 includes a plurality of segment groups 61g disposed along winding direction X. Each segment group 61g contains one or more segments 61. The segment groups 61g adjacent in the winding direction X are separated by a group separation pitch PG.

Figure 6A:
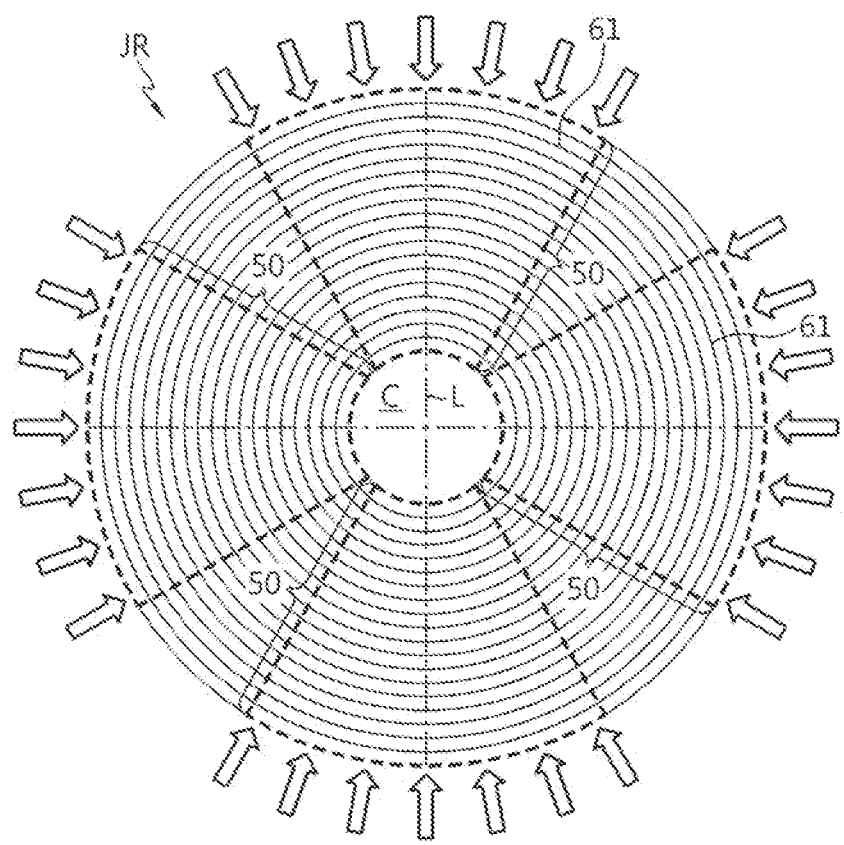
FIGS. 6a and 6b are top plan views respectively showing a plurality of regions in which a segment alignment is formed at an end of the electrode assembly and a bending surface region formed by bending the segments included in the segment alignment according to an embodiment of the present disclosure.

When the electrode 60 is wound as a positive electrode or a negative electrode of the electrode assembly, the segment groups 61g are aligned along a radial direction at one end of the electrode assembly to form a plurality of segment alignment 50 as shown in FIG. 6a. The segment alignment 50 refers to a gathering of segment groups 61g arranged to overlap along the radial direction of the electrode assembly JR.

The overlapping of the plurality of segments included in the segment alignment 50 in the radial direction means that, when a predetermined straight line passing through the segment alignment 50 is drawn from the center of the core, all segments 61 intersect the corresponding straight line.

Figure 6B:
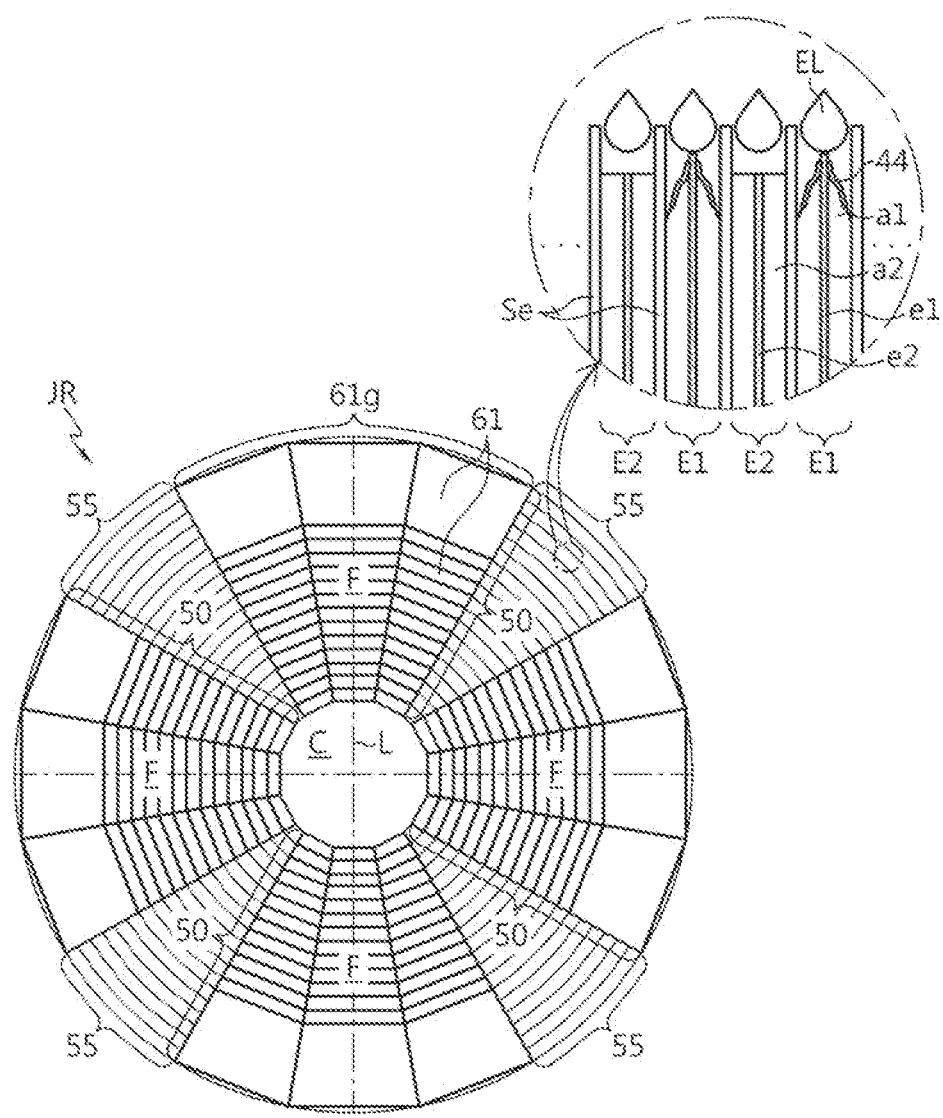

The segments 61 included in each segment alignment 50 are bent toward the core C to form a bending surface region F, as shown in FIG. 6b. When the segments 61 are bent, the bending surface region F corresponds to an upper region of the segment alignment 50.

In order to bend the segments 61 included in the segment alignment 50, a bending force may be applied to the segments 61 using a jig or the like. The bending force is preferably applied in multiple directions as indicated by arrows in FIG. 6a.

The segment alignment 50 or the bending surface region F has the shape of an approximate geometric figure when viewed in the winding axis direction of the electrode assembly. The width in the winding direction of the segment groups 61g located within the geometric figure may increase stepwise or gradually along the radial direction of the electrode assembly.

The segment alignment 50 or the bending surface region F may have an approximate fan shape when viewed in the winding axis direction of the electrode assembly.

Alternatively, the segment alignment 50 or the bending surface region F may have a rectangular or trapezoidal shape when viewed in the winding axis direction of the electrode assembly.

When the segment alignment 50 or the bending surface region F has a rectangular shape, the segment alignment 50 or the bending surface region F may be disposed so that the line connecting the centers of opposite short sides follows the radial direction of the electrode assembly.

When the segment alignment 50 or the bending surface region F has a trapezoidal shape, the segment alignment 50 or the bending surface region F may be disposed so that the line connecting the centers of the short side and the long side opposite to each other follows the radial direction of the electrode assembly and the short side faces the core of the electrode assembly.

In winding turns corresponding to the plurality of segment alignments 50, group separation pitches PG of the segment groups 61g arranged in the same winding turn are substantially identical to each other. Here, it should be understood that the fact that the group separation pitch PG is substantially identical includes not only the case where the deviation of the group separation pitches PG is 0% but also the case where the deviation of the group separation pitches PG is 10% or less or 5% or less.

The group separation pitch PG of the segment group 61g may be greater in the winding turn adjacent to outer circumference than in the winding turn adjacent to the core C.

Preferably, the group separation pitch PG of the segment group 61g included in the n+1$^{th}$ winding turn may be greater than the group separation pitch PG of the segment group 61g included in the n$^{th}$ winding turn. Here, the winding turns may be counted while increasing by 1 each time the electrode is wound one turn, using the position of the first segment 61 closest to the first portion B1 as a reference point.

In one embodiment, when the group separation pitch of the segment group 61g included in the k$^{th}$ winding turn is referred to as $PG_k$, $PG_k$ may proportionally increase as the index k of the winding turn increases.

In another embodiment, when the group separation pitch of the segment group 61g included in the k$^{th}$ winding turn is $PG_k$, $PG_k$ may proportionally increase whenever the index k of the winding turn increases at a predetermined interval.

Accordingly, each segment alignment 50 may include a radial region in which the group separation pitch PG increases stepwise or gradually from the winding turn in a region adjacent to the core to the winding turn in a region adjacent to the outer circumference.

The number of segment alignments 50 corresponds to the number of segment groups 61g included in each winding turn.

In one example, as shown in FIGS. 4a, 6a, and 6b, if the number of segment groups 61g arranged in the winding turn is 4, the number of segment alignments 50 and bending surface regions F is also 4, respectively.

Figure 7A:
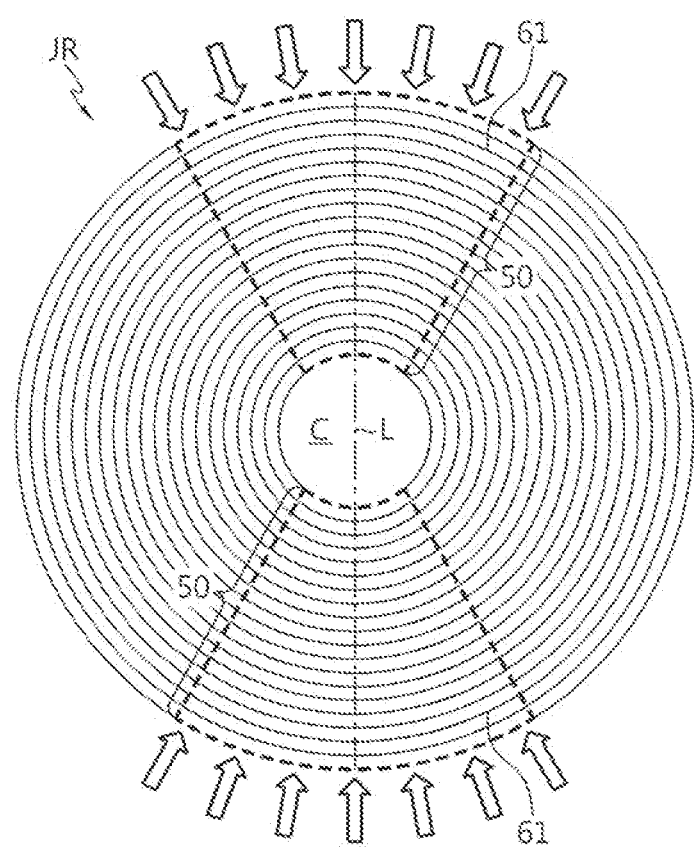
FIGS. 7a and 7b are top plan views respectively showing a plurality of regions in which a segment alignment is formed at an end of the electrode assembly and a bending surface region formed by bending the segments included in the segment alignment according to another embodiment of the present disclosure.
Figure 7B:
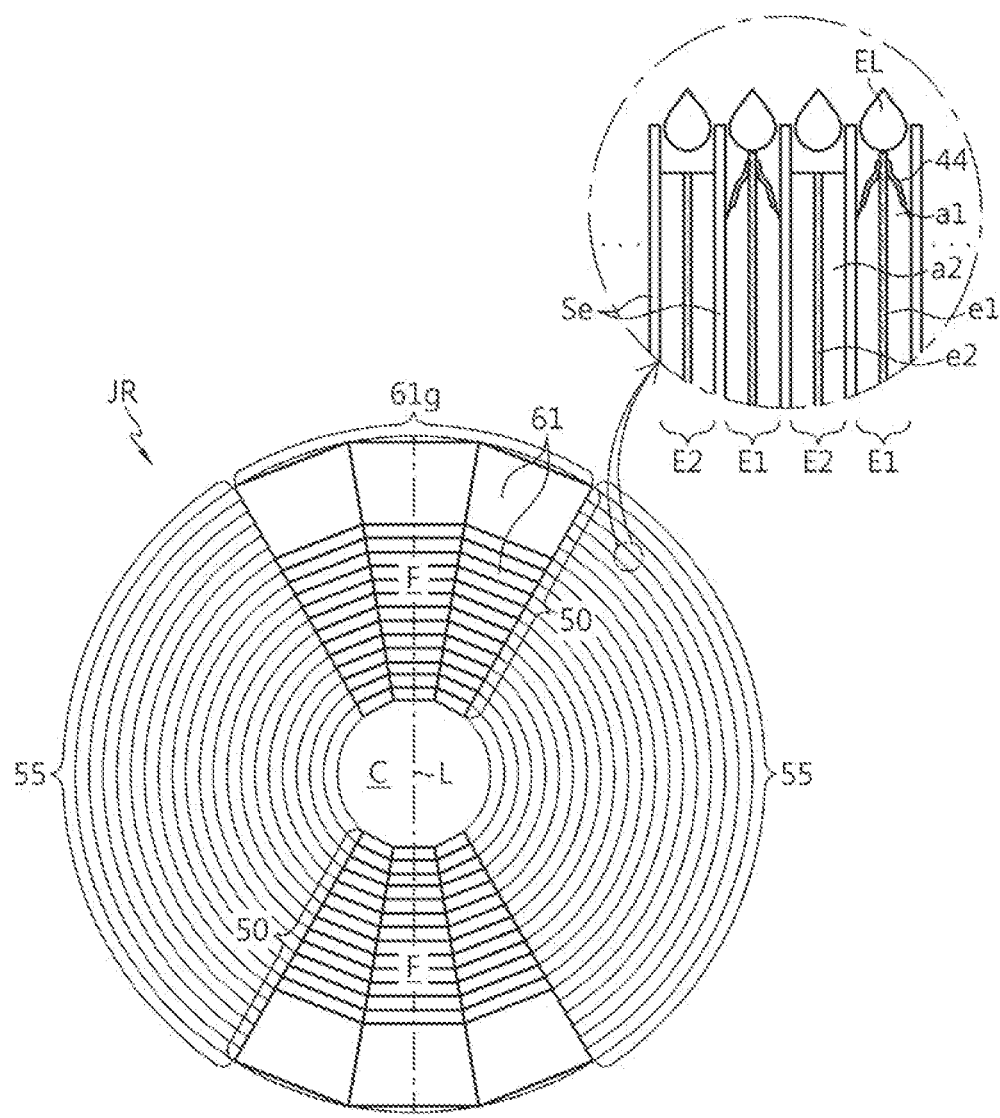

In another example, if the number of segment groups 61g included in the winding turn of the electrode 60 shown in FIG. 4a is reduced to two, as shown in FIGS. 7a and 7b, the number of segment alignments 50 and bending surface regions F is also reduced to two, respectively.

Meanwhile, in FIGS. 6a and 7a, the segment groups 61g are shown as regularly aligned along the radial direction. However, it is obvious to those skilled in the art that the alignment position of the segment group 61g may be rotated by a predetermined angle in a clockwise or counterclockwise direction from the design position due to the thickness deviation of the electrode constituting each winding turn or the imperfection of the winding process.

Referring to FIGS. 6b and 7b, the bending surface region F partially covers the surface of one end of the electrode assembly. Therefore, between the bending surface regions F adjacent in the circumferential direction, an electrolyte impregnation portion 55 is provided wherein the end of the active material layer is recessed toward the inside of the electrode assembly rather than the end of the separator and is exposed between the winding turns of the separator.

The electrolyte impregnation portion 55 corresponds to a portion of the winding turns formed by winding a region of the uncoated portion 43 where the second cut groove 63' is formed. The electrolyte impregnation portion 55 is a region in which the electrolyte EL may be mainly impregnated, and has a lower height than the bending surface region F in the winding axis direction Y. In the electrolyte impregnation portion 55, there is no segment 61 protruding to the outside of the separator Se. In addition, in the electrolyte impregnation portion 55, the ends of the active material layer a1 of the positive electrode E1 and the active material layer a2 of the negative electrode E2 are recessed downward to be spaced apart from the end of the separator Se by a predetermined separation distance between the separators Se adjacent in the radial direction of the electrode assembly JR.

Thus, the insulation between the positive electrode E1 and the negative electrode E2 may be maintained. In an embodiment, the separation distance may be between 0.6 mm and 1 mm.

An insulating coating layer 44 may be formed on at least one of the ends of the positive electrode E1 and the negative electrode E2. The end of the positive electrode E1 may include a sliding portion in which the thickness of the active material layer a1 gradually decreases. The arrangement structure of the electrode and the separator shown in FIGS. 6b and 7b may also be applied to the lower portion of the electrode assembly JR. Preferably, the insulating coating layer 44 and the sliding portion may be formed at an end of the negative electrode E2 in the lower portion of the electrode assembly JR.

The electrolyte EL may be impregnated into the electrode assembly JR while directly contacting the positive electrode E1 and the negative electrode E2 through the gap provided between the ends of the separators Se. Specifically, the electrolyte EL dropped to the top of the electrode assembly JR quickly permeates into the electrode assembly JR while simultaneously contacting the ends of the positive electrode E1 and the negative electrode E2 and the end of the separator Se. As a result, the electrolyte impregnability (rate and uniformity) may be significantly improved.

Figure 5:
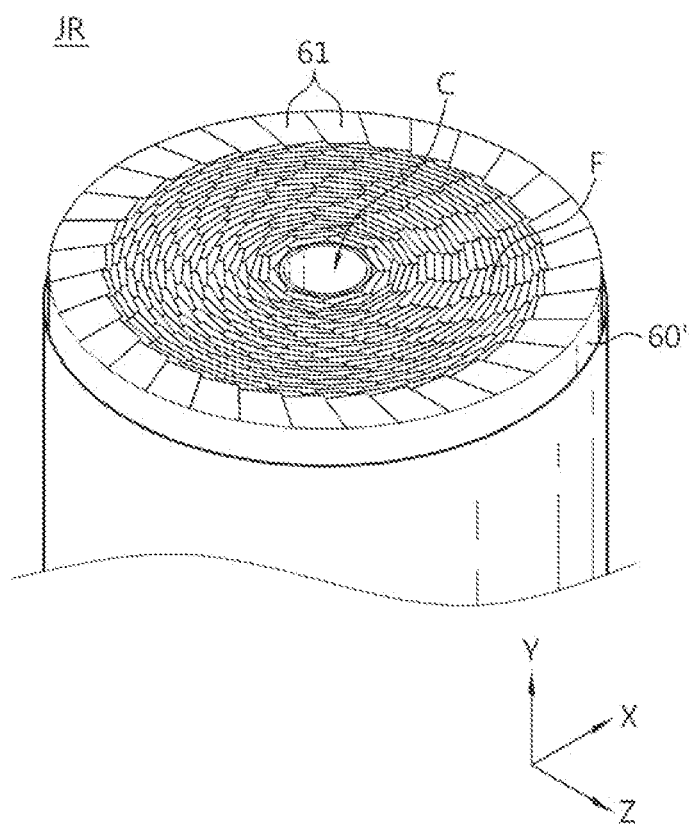
FIG. 5 is a partial perspective view showing a structure in which a bending surface region formed by bending segments covers the entire end portion of the electrode assembly according to an embodiment of the present disclosure.

FIG. 5 is a partial perspective view showing an upper surface of an electrode assembly JR wound using an electrode 60' in which the uncoated portion 43 has no spaced structure of the segment groups 61g and the segments 61 are continuously arranged along a winding direction.

Referring to FIG. 5, when viewed in the winding axis direction, in the bending surface region F, there is substantially no gap through which an electrolyte can directly penetrate into the electrode assembly JR. Therefore, the electrolyte impregnability (rate and uniformity) is poor compared to the embodiment of the present disclosure.

Referring to FIG. 4a again, in each segment group 61g, a first cut groove 63 is interposed between segments 61 adjacent in the winding direction X. In addition, a second cut groove 63' is interposed between segment groups 61g adjacent in the winding direction X. In the winding direction X, the width of the second cut groove 63' is greater than the width of the first cut groove 63. The first cut groove 63 and the second cut groove 63' may be formed together in the notching process.

As shown in FIG. 4b, the first cut groove 63 includes a flat bottom portion 63a, a round portion 63b adjacent thereto, and a side portion 63c of the segment 61. Similarly, the second cut groove 63' also includes a flat bottom portion 63'a, a round portion 63'b adjacent thereto, and a side portion 63'c of the segment 61. The level of the bottom portion 63a of the first cut groove 63 and the level of the bottom portion 63'a of the second cut groove 63' may be substantially the same.

The round portion 63c, 63'c may prevent cracks from occurring at the lower end of the segment 61 by relieving stress when the segment 61 is bent.

In order to prevent damage to the active material layer 42 and/or the insulating coating layer 44 during bending of the segment 61, a predetermined gap is preferably provided between the bottom portion 63a, 63'a of the first and second cut grooves 63, 63' and the active material layer 42. This is because when the segment 61 is bent, stress is concentrated near the bottom portion 63a, 63'a. The gap is 0.2 mm to 4 mm, preferably 1.5 mm to 2.5 mm. When the gap is adjusted to the corresponding numerical range, the active material layer 42 and/or the insulating coating layer 44 near the lower end (bottom portion 63a, 63'a of the first and second cut grooves 63, 63'. In addition, the gap may prevent damage to the active material layer 42 and/or the insulating coating layer 44 due to tolerances during notching or cutting of the segment 61. The bottom portion 63a, 63'a of the first and second cut grooves 63, 63' may be spaced apart from the insulating coating layer 44 by 0.5 mm to 1.0 mm. When the electrode 60 is wound, the end of the insulating coating layer 44 in the winding axis Y direction may be located in the range of −2 mm to 2 mm along the winding axis direction based on the end of the separator. The insulating coating layer 44 may prevent a short circuit between two electrodes having different polarities and facing each other with a separator interposed therebetween, and may support a bending point when the segment 61 is bent. In order to improve the short circuit prevention effect between the two electrodes, the insulating coating layer 44 may be exposed to the outside of the separator. In addition, in order to further maximize the effect of preventing a short circuit between the two electrodes, the width of the insulating coating layer 44 may be increased so that the end of the insulating coating layer 44 in the winding axis Y direction is located above the bottom portion 63a, 63'a of the first and second cut grooves 63, 63'. In one embodiment, the end of the insulating coating layer 44 in the winding axis direction Y may be located within a range of −1 mm to +1 mm based on the bottom portion 63a, 63'a of the first and second cut grooves 63, 63'.

Referring to FIG. 4b, the width (D), height (H), and separation pitch (P) of the segment 61 are designed to prevent the uncoated portion 43 near the bending point from being torn during bending of the uncoated portion 43 and to prevent abnormal deformation of the uncoated portion 43 while sufficiently increasing the number of overlapping layers of the uncoated portion 43 to secure sufficient welding strength.

The segment 61 is bent at the line G passing through the bottom of the first cut groove 63 or at the upside thereof. The first cut groove 63 enables smooth and easy bending of the segment 61 in the radial direction of the electrode assembly.

The width (D) of the segment 61 is defined as the length between two points where two straight lines extending from both side portions 63c of the segment 61 meet a straight line extending from the bottom portion 63a of the first cut groove 63. The height (H) of the segment 61 is defined as the shortest distance between the uppermost edge of the segment 61 and a straight line extending from the bottom portion 63a of the first cut groove 63. The separation pitch (P) of the segment 61 is defined as the length between two points where a straight line extending from the bottom portion 63a of the first cut groove 63 meets straight lines extending from both side portions 63c connected to the bottom portion 63a. When the side portion 63c and/or the bottom portion 63a is curved, the straight line may be replaced with a tangent extending from the side portion 63c and/or the bottom portion 63a at an intersection point where the side portion 63c and the bottom portion 63a meet. The group separation pitch PG between the segment groups 61g is defined substantially the same as the separation pitch (P) between the segments 61. That is, the group separation pitch PG corresponds to the length between two points where a straight line extending from the bottom portion 63'a of the second cut groove 63' and the side portion 63'c of the segment 61 adjacent to both ends of the bottom portion 63'a meet.

Preferably, the width (D) of the segment 61 is 1 mm or more. If D is less than 1 mm, when the segment 61 is bent toward the core, an area or an empty space (gap) where the segments 61 do not overlap enough to sufficiently secure sufficient welding strength may occur.

Preferably, the width (D) of the segments 61 may be adjusted adaptively depending on the radius of the winding turn where the segments 61 are located so that segments 61 overlap well in the radial direction when the segments 61 are bent toward the core of the electrode assembly.

Figure 4C:
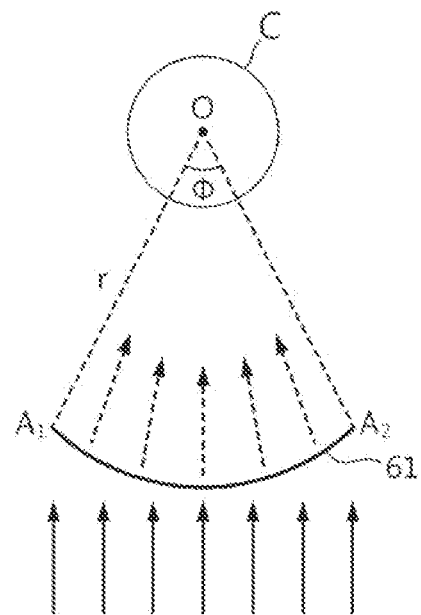
FIG. 4c is a diagram showing an arc $(A_1A_2)$ formed by a lower end of the segment, where the width D of the segment is defined, with respect to the core center O of the electrode assembly, when the electrode is wound according to an embodiment of the present disclosure.

FIG. 4c is a diagram showing an arc ($A_1A_2$) formed by a lower end (line Dab in FIG. 4b) of the segment 61, where the width D of the segment 61 is defined, with respect to the center O of the core of the electrode assembly, when the electrode 60 is wound according to an embodiment of the present disclosure.

Referring to FIG. 4c, the arc ($A_1A_2$) has a length corresponding to the width (D) of the segment 61 and has a circumferential angle (Φ) based on the center O of the core of the electrode assembly. The circumferential angle (Φ) may be defined as the angle between two line segments connecting both ends of the arc ($A_1A_2$) and the center O of the core on a plane perpendicular to the winding axis passing through the arc ($A_1A_2$).

When the length of the arc ($A_1A_2$) of the segment 61 is the same, the circumferential angle (Φ) decreases as the radius (r) of the winding turn where the segment 61 is located increases. Conversely, when the circumferential angle (Φ) of the segment 61 is the same, the length of the arc ($A_1A_2$) increases proportionally as the radius (r) of the winding turn where the segment 61 is located increases.

The circumferential angle (Φ) affects the bending quality of the segment 61. In the drawing, a solid arrow indicates a direction of force applied to bend the segment 61, and a dotted arrow indicates a direction in which the segment 61 is bent. The bending direction is a direction toward the center O of the core.

According to experiments, when the circumferential angle ((©) of the segment 61 exceeds 30 degrees, the bending shape of the segment 61 is not uniform. The difference between the force applied to the middle part of the segment 61 and the force applied to the side part increases, so the compression of the segment 61 is not uniform in the circumferential direction. In addition, if the pressing force is increased for uniformity of bending, cracks may occur in the uncoated portion 43 near the first cut groove 63.

Therefore, the circumferential angle (Φ) of the segment 61 is preferably 300 or less regardless of the radius (r) of the winding turn where the segment 61 is located in order to improve bending uniformity and prevent cracking.

In one embodiment, the circumferential angles (Φ) of the segments 61 included in the electrode 60 are substantially the same, and the widths of the segments 61 may proportionally increase as the radius (r) of the winding turn in which the segment 61 is located increases. The term 'substantially the same' means completely identical or with a variance of less than 5%.

For example, when the radius of the electrode assembly is 22 mm, the radius of the core is 4 mm, the segments 61 are disposed starting from the winding turn located at the point where the radius is 7 mm, if the circumferential angles (Φ) of the segments 61 are uniform as 28.6 degrees, the widths (D) of the segments 61 may proportionally increase according to the radius (r) of the winding turn where the segments 61 are located, as shown in Table 1 below. That is, the widths of the segments 61 may increase at the same rate by 0.5 mm whenever the radius (r) of the winding turn increases by 1 mm.

TABLE 1

| winding turn radius (mm) | 7.0 | 8.0 | 9.0 | 10.0 | 11.0 | 12.0 | 13.0 | 14.0 | 15.0 | 16.0 | 17.0 | 18.0 | 19.0 | 20.0 | 21.0 | 22.0 |
|---|---|---|---|---|---|---|---|---|---|---|---|---|---|---|---|---|
| segment width (D, mm) | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 |
| circumferential angle (degree) | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 |

Preferably, the width D(r) of the segment 61 located in a winding turn having a radius of r based on the core center O of the electrode assembly may be determined within a range satisfying Formula 1 below.

$$1 \leq D(r) \leq (2*\pi*r/360°)*30° \qquad \text{<Formula 1>}$$

Referring to FIG. 4b again, the height (H) of the segment 61 may be 2 mm or more. If the height (H) is less than 2 mm, when the segment 61 is bent toward the core, an area or an empty space (gap) where the segments 61 do not overlap enough to sufficiently secure sufficient welding strength may occur.

The height (H) of the segment 61 may be determined by applying the condition that the segment 61 does not block the core when being bent toward the core. Preferably, the height (H) of segment 61 may be adjusted so that 90% or more of the diameter of the core may be opened to the outside.

Preferably, the heights (H) of the segments 61 may increase from the core toward the outer circumference depending on the radius of the winding turn and the radius of the core where the segments 61 are located.

In one embodiment, when the heights (H) of the segments 61 increase stepwise over N steps from $h_1$ to $h_N$ as the radius of the winding turn increases, assuming that the $k^{th}$ height of the segment 61 (k is a natural number from 1 to N) is $h_k$, the starting radius of the winding turn including the segment 61 having the height $h_k$ is $r_k$ and the radius of the core is $r_c$, the heights $h_1$ to $h_N$ of the segments 61 may be determined to satisfy Formula 2 below.

$$2 \text{ mm} \leq h_k \leq r_k - \alpha*r_c \text{ (preferably, } \alpha \text{ is 0.90 to 1)} \qquad \text{<Formula 2>}$$

If the heights ($h_k$) of the segments 61 meet Formula 2, even if the segments 61 are bent toward the core, 90% or more of the diameter of the core may be open to the outside.

In one example, the radius of the entire winding turns of the electrode 60 is 22 mm, the heights of the segments 61 start from 3 mm, and the heights of segments 61 are increased sequentially to 3 mm, 4 mm, 5 mm and 6 mm whenever the radius of the winding turn including the segment 61 increases by 1 mm, and the heights may be maintained substantially identically at 6 mm in the remaining winding turns. That is, among the radii of the entire winding turns, the width of the height variable region of the segment 61 is 3 mm, and the remaining radial region corresponds to the height uniform region.

In this case, when α is 1 and the equal sign condition is applied in the right inequality, the starting radius $r_1$, $r_2$, $r_3$, $r_4$ of the winding turns including the segments 61 having heights of 3 mm, 4 mm, 5 mm, and 6 mm depending on the radius ($r_c$) of the core of the electrode assembly may be as shown in Table 2 below.

TABLE 2

| Item | | Segment height ((mm)) | | | |
|---|---|---|---|---|---|
| | | 3 ($h_1$) | 4 ($h_2$) | 5 ($h_3$) | 6 ($h_4$) |
| Core radius ($r_c$) (mm) | 2 | 5 ($r_1$) | 6 ($r_2$) | 7 ($r_3$) | 8 ($r_4$) |
| | 2.5 | 5.5 ($r_1$) | 6.5 ($r_2$) | 7.5 ($r_3$) | 8.5 ($r_4$) |
| | 3 | 6 ($r_1$) | 7 ($r_2$) | 8 ($r_3$) | 9 ($r_4$) |
| | 3.5 | 6.5 ($r_1$) | 7.5 ($r_2$) | 8.5 ($r_3$) | 9.5 ($r_4$) |
| | 4 | 7 ($r_1$) | 8 ($r_2$) | 9 ($r_3$) | 10 ($r_4$) |

When the segments 61 are arranged at the radius locations shown in Table 2, the core is not blocked even if the segments 61 are bent toward the core. Meanwhile, $r_1$, $r_2$, $r_3$, $r_4$ shown in Table 1 may be shifted toward the core according to the value of a. In one example, when α is 0.90, $r_1$, $r_2$, $r_3$, $r_4$ may be shifted toward the core by 10% of the core radius. In this case, when the segment 61 is bent toward the core, 10% of the core radius is blocked by the segment 61. $r_1$, $r_2$, $r_3$, $r_4$ shown in Table 1 are limit values of the location where the segment 61 starts. Therefore, the location of the segment 61 may be shifted toward the outer circumference by a predetermined distance rather than the radius shown in Table 2.

Figure 4D:
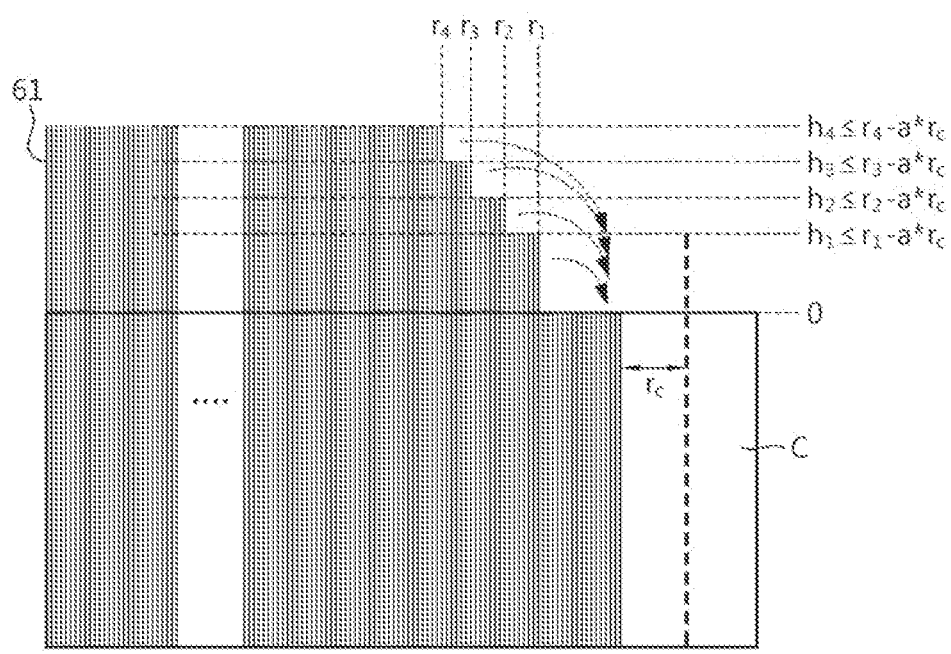
FIG. 4d is a partially sectioned view showing the electrode assembly, taken along a winding axis to pass through the segment alignment according to an embodiment of the present disclosure, and schematically shows the relationship between heights $h_1$, $h_2$, $h_3$, $h_4$ of segments, core radius $r_c$, and radii $r_1$, $r_2$, $r_3$, $r_4$ of winding turns where segments begin to appear.

FIG. 4d is a partially sectioned view showing the electrode assembly, taken along a winding axis to pass through the segment alignment 50, and schematically shows the relationship between heights $h_1$, $h_2$, $h_3$, $h_4$ of segments, core radius (re), and radii $r_1$, $r_2$, $r_3$, $r_4$ of winding turns where segments begin to appear.

Referring to Table 2 and FIG. 4d together, for example, when the radius (re) of the core C is 3 mm, the starting radii $r_1$, $r_2$, $r_3$ and $r_4$ of the winding turns including the segments 61 having heights of 3 mm ($h_1$), 4 mm ($h_2$), 5 mm ($h_3$) and 6 mm ($h_4$) may be 6 mm, 7 mm, 8 mm, and 9 mm, respectively, and the heights of the segments 61 may be maintained at 6 mm from the radius 9 mm to the last winding turn. Also, the segment 61 may not be included in the winding turn having a radius smaller than 6 mm ($r_1$). In this example, since the segment 61 having a height of 3 mm ($h_1$) closest to the core C is located from the winding turn having a radius of 6 mm, even if the segments 61 are bent toward the core C, the segments 61 cover only the radial region of 3 mm to 6 mm and substantially does not block the core C. According to the a value of Formula 2, the location of the segment 61 may be shifted toward the core C within 10% of the core radius (re).

Preferably, the height (H) of the segment 61 satisfies Formula 2, and at the same time the maximum height may be limited.

Figure 4E:
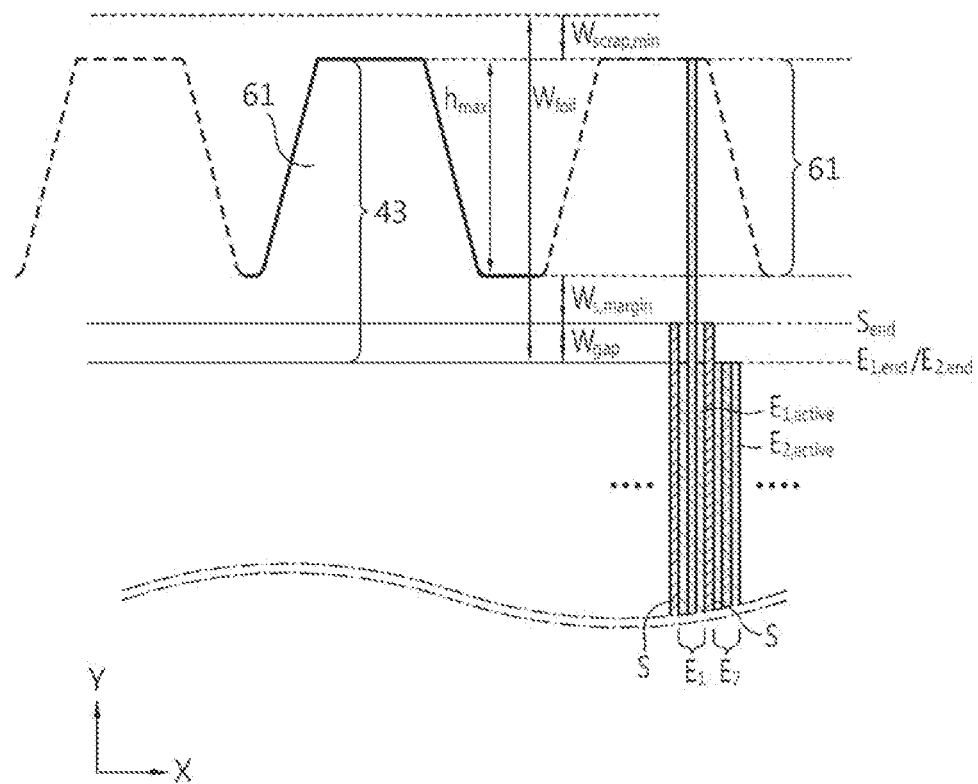
FIG. 4e is a conceptual diagram for determining a maximum value $(h_{max})$ for the height (H) of the segment in a height variable region of the segment according to an embodiment of the present disclosure.

FIG. 4e is a conceptual diagram for determining a maximum value ($h_{max}$) for the height (H) of the segment 61 in a height variable region of the segment 61.

Referring to FIG. 4e, in the winding structure of the electrode assembly, the electrode E1 including the segment 61 faces the electrode E2 of opposite polarity with the separator S interposed therebetween in the radial direction. Both surfaces of the electrode E1 are coated with an active material layer ($E_{1,active}$), and both surfaces of the electrode E2 are also coated with an active material layer ($E_{2,active}$). For electrical insulation, the end ($S_{end}$) of the separator S may further extend outward from the end ($E_{2,end}$) of the electrode E2 to a length corresponding to the insulation gap ($W_{gap}$). Also, the end of the electrode E1 does not further extend outward beyond the end of the electrode E2 for electrical insulation. Therefore, a region corresponding to the insulation gap ($W_{gap}$) should be secured at the lower end of the uncoated portion 43. Also, when the electrodes ($E_1$, $E_2$) and the separator S are wound, the end ($S_{end}$) of the separator S causes meandering. Therefore, in order for the segment 61 to be exposed to the outside of the separator S, the region ($W_{margin,min}$) corresponding to a minimum meandering margin of the separator S must be allocated to the uncoated portion 43. In addition, in order to cut the segment 61, a minimum cutting scrap margin ($W_{scrap,min}$) should be allocated to the end of the current collector foil. Therefore, the maximum height ($h_{max}$) of the segment 61 in the height variable region of the segment 61 may be determined by Formula 3 below. In Formula 3, $W_{foil}$ corresponds to the width of the current collector before the current collector is cut.

$$h_{max} = W_{foil} - W_{scrap,min} - W_{margin,min} - W_{gap} \qquad \text{<Formula 3>}$$

In one example, the minimum cutting scrap margin ($W_{scrap,min}$) may be 1.5 mm, and the minimum meandering margin ($W_{margin,min}$) of the separator S may be 0.5 mm. Under these conditions, when the width ($W_{foil}$) of the current collector foil before forming the segment 61 is 8 mm to 12 mm and the insulation gap ($W_{gap}$) is 0.6 mm, 0.8 mm, and 1.0 mm, the maximum height ($h_{max}$) of the segment 61 may be calculated using Formula 3 as in Table 3 below.

TABLE 3

| Item | | Gap of Separator ↔ Negative electrode (mm) | | |
|---|---|---|---|---|
| | | 0.6 | 0.8 | 1 |
| Width of current collector foil (mm) | 8 | 5.4 | 5.2 | 5 |
| | 9 | 6.4 | 6.2 | 6 |
| | 10 | 7.4 | 7.2 | 7 |
| | 11 | 8.4 | 8.2 | 8 |
| | 12 | 9.4 | 9.2 | 9 |

Considering Table 3, the maximum height ($h_{max}$) of the segment 61 in the height variable region of the segment 61 may be set to 10 mm. Therefore, in the height variable region of the segment 61, the height of the segment 61 satisfies Formula 2 and may increase stepwise or gradually along the radial direction of the electrode assembly in the range of 2 mm to 10 mm.

Referring to FIG. 4b again, the separation pitch (P) of the segment 61 may be adjusted in the range of 0.05 mm to 1 mm. If the separation pitch (P) is less than 0.05 mm, cracks may occur in the uncoated portion 43 near the lower end of the first cut groove 63 due to stress when the electrode 60 travels in the winding process or the like. Meanwhile, if the separation pitch (P) exceeds 1 mm, an area or an empty space (gap) where the segments 61 do not overlap each other enough to sufficiently secure the welding strength when the segment 61 is bent may occur.

Meanwhile, when the current collector 41 of the electrode 60 is made of aluminum, it is more preferable to set the separation pitch (P) as 0.5 mm or more. When the separation pitch (P) is 0.5 mm or more, even if the electrode 60 travels at a speed of 100 mm/sec or more under a tension of 300 gf or more in the winding process or the like, cracks may be prevented from occurring at the bottom of the first cut groove 63.

According to the experimental results, when the current collector 41 of the electrode 60 is an aluminum foil with a thickness of 15 μm and the separation pitch (P) is 0.5 mm or more, no cracks are generated at the bottom of the first cut groove 63 when the electrode 60 travels under the above travel conditions.

As shown in FIG. 4b, the first cut groove 63 corresponds to a space created by removing the uncoated portion 43. Preferably, an edge of the lower portion of the first cut groove 63 has a round shape. That is, the first cut groove 63 includes a substantially flat bottom portion 63a and a round portion 63b. The round portion 63b connects the bottom portion 63a and the side portion 63c of the segment 61. In a modified example, the bottom portion 63a of the first cut groove 63 may be replaced with an arc shape. In this case, the side portions 63c of the segments 61 may be smoothly connected by the arc shape of the bottom portion 63a.

Preferably, the curvature radius of the round portion 63b may be greater than 0 and less than or equal to 0.1 mm. More preferably, the round portion 63b may have a curvature radius of 0.01 mm to 0.05 mm. When the curvature radius of the round portion 63b meets the above numerical range, it is possible to prevent cracks from occurring in the lower portion of the first cut groove 63 while the electrode 60 is traveling in the winding process or the like.

It is obvious to those skilled in the art that the structural characteristics of the first cut groove 63 described above can be substantially identically applied to the second cut groove 63' formed between the segment groups 61g.

The lower internal angles (θ) of the plurality of segments 61 included in the segment alignment 50 may increase from the core toward the outer circumference. The lower internal angle (θ) is an angle between a straight line extending from the bottom portion 63a of the first cut groove 63 and a straight line extending from the side portion 63c of the segment 61. When the segment 61 is symmetrical in the left and right direction, the lower internal angles (θ) of the left and right sides are substantially the same.

If the radius of the electrode assembly JR increases, the curvature increases. If the lower internal angle (θ) of the segment 61 increases as the radius of the electrode assembly increases, the stress generated in the radial direction and the circumferential direction when the segment 61 is bent may be relieved. In addition, if the lower internal angle (θ) increases, when the segment 61 is bent, the area overlapping with the segment 61 at the inner side and the number of overlapping layers also increase, so that welding strength may be uniformly secured in the radial direction and the circumferential direction, and the bending surface region may be formed flat.

Preferably, the lower internal angle (θ) may be determined by the radius of the winding turn where the segment 61 is located in the segment alignment 50 and the width (D) of the segment 61.

Figure 4F:
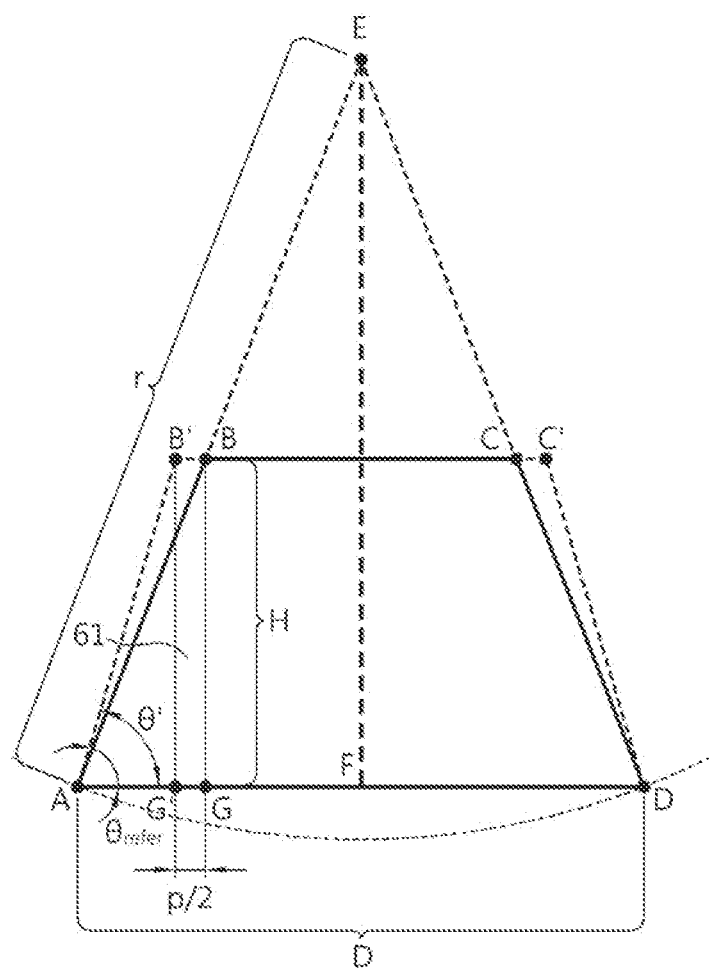
FIG. 4f is a schematic diagram for explaining the formula that determines a lower internal angle ($\theta$) of the segment according to an embodiment of the present disclosure.

FIG. 4f is a schematic diagram for explaining the formula that determines a lower internal angle (θ) of the segment 61.

Referring to FIG. 4f, the sides of the segment 61 ideally coincide with the line segment AE and the line segment DE connecting the center E of the core center to both end points A and D of the line segment AD corresponding to the width (D) of the segment 61.

When the side of the segment 61 extends in the most ideal direction, assuming that the line segment EF is approximately equal to the line segment AE and the line segment DE, the lower internal angle ($\theta_{refer}$) of the segment 61 may be determined approximately from the width (D) of the segment 61 and the radius (r) of the winding turn where the segment 61 is located using Formula 4 below.

$$\theta_{refer} = \cos^{-1}\left(\frac{0.5 * D}{r}\right) \qquad \text{<Formula 4>}$$

The angle of Formula 4 is an ideal criterion angle for the lower internal angle ($\theta_{refer}$) of the segment 61. Meanwhile, a separation pitch (P) exists between adjacent segments 61 located in the same winding turn. The length of the separation pitch (P) is expressed as p. Since the separation pitch (P) exists between adjacent segments 61, a tolerance of 50% of the separation pitch (p) may be endowed for the lower internal angle (θ). That is, the width of the upper side BC of the segment 61 may be increased by a maximum of p/2 to the upper side B'C'. The lower internal angle (θ') with the tolerance reflected may be expressed as in Formula 5 below. The lower internal angle ($\theta_{refer}$) is the ideal criterion angle ∠BAG, and the lower internal angle (θ') is the angle ∠B'AG' that reflects the tolerance according to the separation pitch (p). In Formula 5, H is the height of the segment 61, and p corresponds to the separation pitch.

$$\theta' = \tan^{-1}\left(\frac{2 * H * \tan\theta_{refer}}{2 * H - p * \tan\theta_{refer}}\right) \qquad \text{<Formula 5>}$$

Preferably, the lower internal angle (θ) of the segment 61 included in the segment alignment 50 and located at each winding turn may satisfy Formula 6 below. Then, when the segments 61 are bent toward the core center of the electrode assembly, the segments 61 adjacent in the circumferential direction do not interfere with each other and may be smoothly bent.

$$\cos^{-1}\left(\frac{0.5 * D}{r}\right) \leq \theta \leq \tan^{-1}\left(\frac{2 * H * \tan\theta_{refer}}{2 * H - p * \tan\theta_{refer}}\right) \qquad \text{<Formula 6>}$$

In one example, when the electrode 60 forms a winding structure with a diameter of 22 mm and a core radius of 4 mm, the lower internal angle of the segment 61 may stepwise increase in the range of 60 degree to 85 degree in the height variable region.

Referring to FIG. 4a again, the width ($d_{B1}$) of the first portion B1 is designed so that the core of the electrode assembly is open to the outside by 90% or more based on the diameter when the segment 61 of the third portion B2 included in the segment alignment 50 is bent toward the core. The width ($d_{B1}$) of the first portion B1 may increase in proportion to the bending length of the segment 61 most adjacent to the first portion B1. The bending length corresponds to a length from the bending point to the upper end side of the segment 61. Preferably, when the electrode 60 is used to manufacture an electrode assembly of a cylindrical battery having a form factor of 4680, the width ($d_{B1}$) of the first portion B1 may be set to 180 mm to 350 mm depending on the diameter of the core of the electrode assembly and the height of the segment 61 most adjacent to the first portion B1.

The bending point of the segment 61 may be set at a line passing through the lower end of the first cut groove 63 or a point spaced upward from the line by a predetermined distance. When the segment 61 is bent toward the core at a point spaced from the lower end of the first cut groove 63 by a certain distance, the segments are overlapped better in the radial direction. When the segments 61 are bent, a segment at an outer side presses a segment at an inner side based on the center of the core. At this time, if the bending point is spaced apart from the lower end of the first cut groove 63 by a predetermined distance, the segment at the inner side is pressed in the winding axis direction by the segment at the outer side, and the segments are overlapped better. The separation distance of the bending points may be 3 mm or less, preferably 2 mm or less.

In the present disclosure, the number of segment groups 61g included in each winding turn, the number of segment groups 61 included in each segment group 61g, and the width of each segment group 61g may be desirably adjusted to disperse stress to the maximum during the bending process of the uncoated portion 43, overlap the segments 61 in several layers so as to ensure sufficient welding strength of the current collecting plate in the bending surface region F, and sufficiently improve electrolyte impregnation (rate and uniformity) by providing a plurality of electrolyte impregnation portions 55 in the circumferential direction.

The segment structure of the third portion B2 may be extended to the second portion B3. In this case, the winding turn formed by the second portion B3 may also include a plurality of segment groups 61g like the third portion B2. In this case, the features applied to the segment structure of the third portion B2 may also be applied to the segment structure of the second portion B3 without limitation.

The number of segments 61, the width of the segments 61, the height of the segments 61 and/or the separation pitch of the segments 61 constituting segment groups 61g included in different winding turns may be different.

Figure 4G:
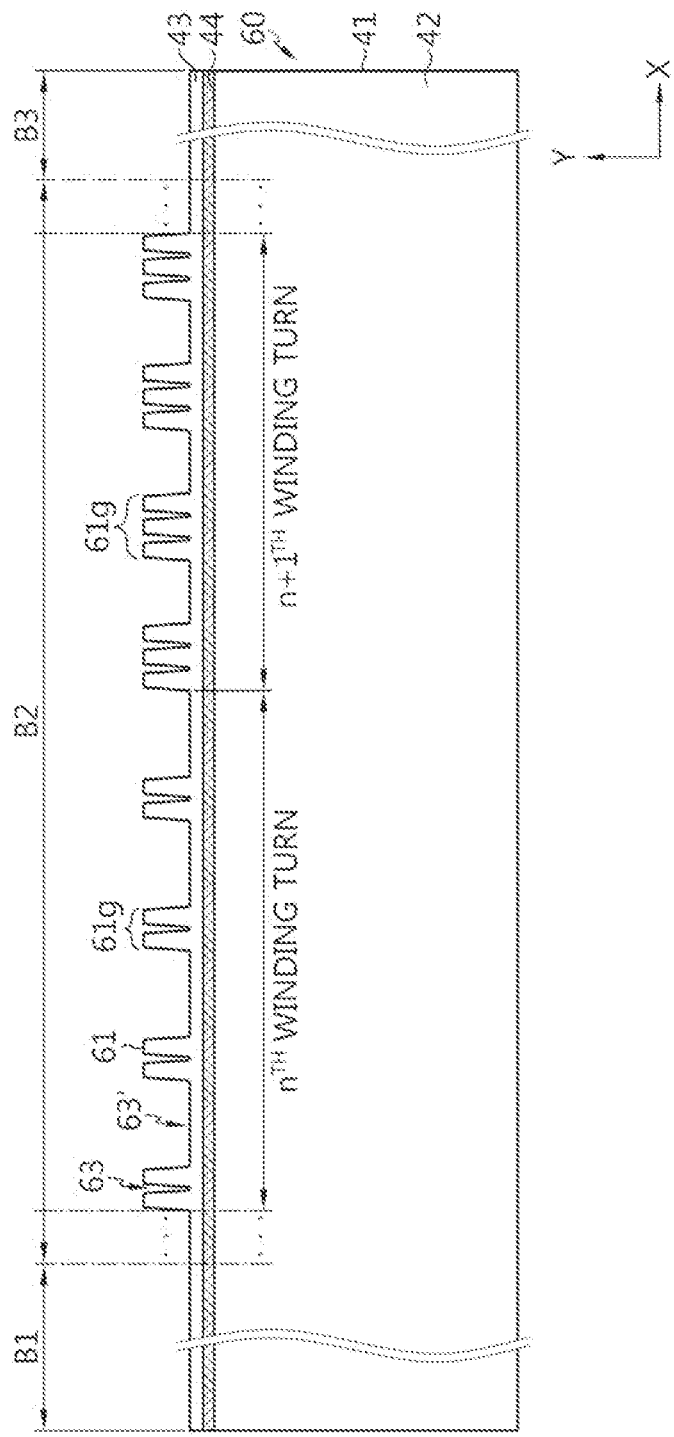
FIG. 4g is a plan view showing a structure of an electrode according to another embodiment of the present disclosure.

That is, as shown in FIG. 4g, the number of segments in the segment group 61g included in a winding turn located close to the outer circumference may be greater than the number of segments in the segment group 61g included in a winding turn located closer to the core.

In another aspect, the segment height of the segment group 61g included in the winding turn located closer to the outer circumference may be greater than the segment height of the segment group 61g included in the winding turn located closer to the core.

In still another aspect, the segment width of the segment group 61g included in the winding turn located close to the outer circumference may be greater than the segment width of the segment group 61g included in the winding turn located closer to the core.

In still another aspect, the segment separation pitch of the segment group 61g included in the winding turn located closer to the outer circumference may be greater than the segment separation pitch of the segment group 61g included in the winding turn located closer to the core.

Figure 4H:
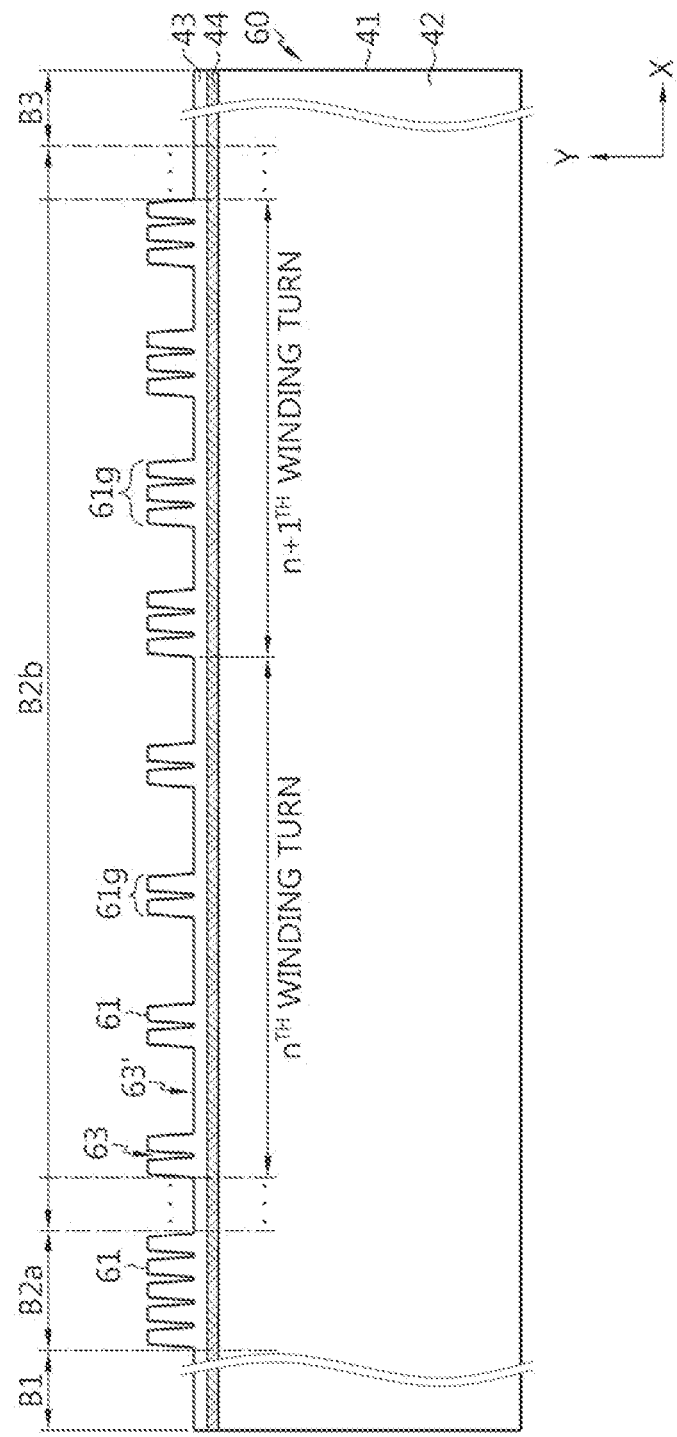
FIG. 4h is a plan view showing a structure of an electrode according to still another embodiment of the present disclosure.

In the present disclosure, the third portion B2 of the electrode 60 may be divided into two sub regions. That is, as shown in FIG. 4h, the third portion B2 may be divided into a first region B2a in which the segments 61 are continuously arranged without a separated arrangement structure of the segment groups 61g and a second region B2b in which a separated arrangement structure of the segment groups 61g exists. The first region B2a may be adjacent to the first portion B1, and the second region B2b may be adjacent to the second portion B3.

Figure 8:
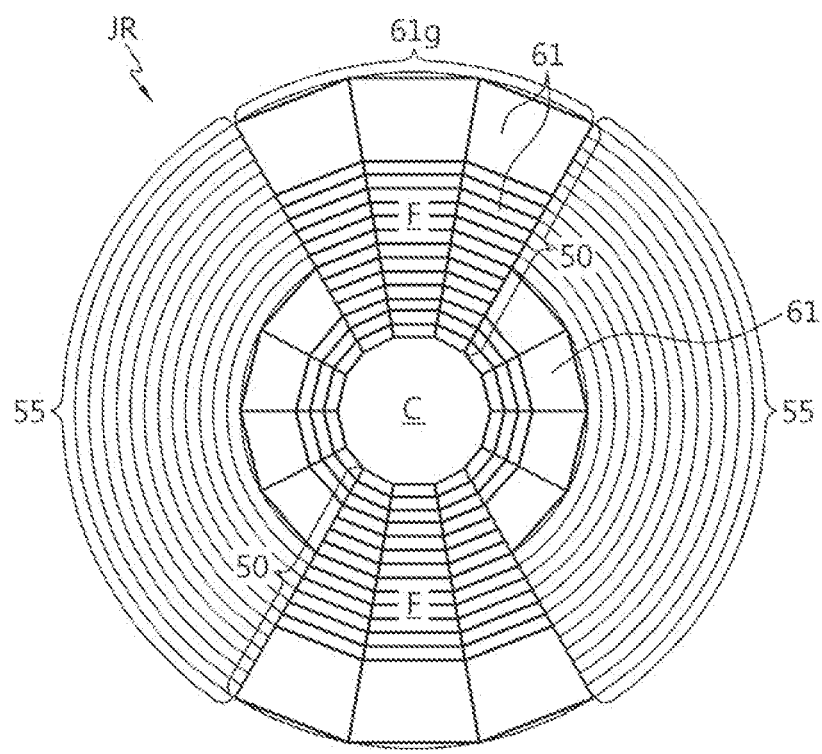
FIG. 8 is a top plan view showing the bending surface region formed at an end of the electrode assembly according to still another embodiment of the present disclosure.

When the electrode assembly is wound using the electrode 60 including the first region B2a and the second region B2b, as shown in FIG. 8, an annular bending surface region F is additionally formed near the core C of the electrode assembly JR in addition to the radial bending surface region F formed by the segments 61 included in the segment alignment 50. This structure has the effect of increasing the welding strength of the current collecting plate without substantially affecting the electrolyte impregnability by further increasing the area of the bending surface region F.

In the present disclosure, the plurality of segment alignments 50 (or bending surface regions F) may be symmetrically arranged in a cross (+) shape, a radial (X) shape, or a linear shape based on the center of the core when viewed in the winding axis direction of the electrode assembly JR.

For reference, FIGS. 6a and 6b show an example in which a plurality of segment alignments 50 (bending surface regions F) are arranged in a cross (+) shape based on the center of the core when viewed in the winding axis direction of the electrode assembly JR.

FIGS. 7a and 7b show an example in which a plurality of segment alignments 50 (bending surface regions F) are arranged in a linear shape based on the center of the core when viewed in the winding axis direction of the electrode assembly JR.

In one aspect, the line connecting the center of the core of the electrode assembly JR and a geometric center of the figure that approximates the bending surface region F may be defined as an angle measurement line L, and an angle between the angle measurement lines L of the bending surface regions F adjacent in the circumferential direction may be substantially the same.

The geometric center of the figure may be, for example, the center of gravity of the figure. In determining the geometric center, all regions contained within the figure are considered to have the same mass.

Specifically, when the angle measurement line L is defined as the line connecting the center of the core of the electrode assembly JR and the geometric center of the figure that approximates the bending surface region F, the angle between the angle measurement lines L of the bending surface regions F adjacent in the circumferential direction may be 30°±10°, 40°±10°, 45°±10°, 60°±10°, 72°±10°, 90°±10°, 120°±10° or 180°+10°.

In one aspect, among various arrangements of the bending surface region F, when the angle between the angle measurement lines L of the bending surface regions F adjacent in the circumferential direction is 90°±10° (see FIG. 6b), the group separation pitch PG of the segment groups 61g forming the segment alignment 50 may be set to increase gradually or stepwise within a range of 8 mm to 50 mm, preferably 10 mm to 45 mm, as the winding turn increases.

In another aspect, among various arrangements of the bending surface region F, when the angle between the angle measurement lines L of the bending surface regions F adjacent in the circumferential direction is 180°±10° (see FIG. 7b), the group separation pitch PG of the segment groups 61g forming the segment alignment 50 may be set to increase gradually or stepwise within a range of 30 mm to 90 mm, preferably 35 mm to 70 mm, as the winding turn increases.

Meanwhile, when the figure corresponding approximately to the bending surface region F is line symmetric when viewed in the winding axis direction of the electrode assembly, the angle measurement line L may be replaced with a line connecting the center of the core of the electrode assembly JR and the center of the region of the winding turn located at the outermost side of the bending surface region F. In one example, when the figure has a fan shape, a line connecting the center of the arc of the fan shape and the center of the core may be defined as the angle measurement line L.

When the group separation pitch PG of the segment groups 61g is set to increase according to the number of winding turns within the above range, the segment groups 61g are radially arranged regularly along the radial direction of the electrode assembly. As a result, the electrolyte impregnation portions 55 are also formed radially, so that the impregnation of electrolyte may be remarkably improved. Moreover, since the segments 61 are arranged in a local area along the radial direction of the electrode assembly, the stress generated during bending of the segment 61 is dispersed, so that the segment 61 may be bent easily. Therefore, the stack number of the segments 61 is sufficiently increased in the winding axis direction, so that the welding strength with the current collecting plate may be improved. The improved welding strength reduces the resistance of the electrode assembly or the cylindrical battery manufactured using the same.

In the present disclosure, the segment 61 may be deformed into various shapes while satisfying at least one of the following conditions.

Condition 1: the width of the lower portion is greater than the width of the upper portion.
Condition 2: the width of the lower portion is the same as the width of the upper portion.
Condition 3: the width is kept uniform from the upper portion to the lower portion.
Condition 4: the width decreases from the lower portion to the upper portion.
Condition 5: the width decreases and then increases from the lower portion to the upper portion.
Condition 6: the width increases and then decreases from the lower portion to the upper portion.
Condition 7: the width increases from the lower portion to the upper portion and then is kept uniform.
Condition 8: the width decreases from the lower portion to the upper portion and then is kept uniform.
Condition 9: the interior angle of one side and the interior angle of the other side of the lower portion are equal.

Here, the interior angle may be defined as an angle formed by the side portion of the segment based on the width direction of the lower portion of the segment. If the side portion is a curve, the interior angle is defined as the angle between the tangent drawn at the lowest end of the curve and the width direction of the lower portion of the segment.

Condition 10: the interior angle of one side of the lower portion and the interior angle of the other side are different.
Condition 11: the interior angle of one side of the lower portion and the interior angle of the other side of the lower portion have an acute angle, a right angle, or an obtuse angle, respectively.
Condition 12: symmetrical in the left and right direction based on the winding axis direction.
Condition 13: asymmetrical in the left and right direction based on the winding axis direction.
Condition 14: the side portion is straight.
Condition 15: the side portion is curved.
Condition 16: the side portion is convex outward.
Condition 17: the side portion is convex inward.
Condition 18: the corner of the upper portion and/or the lower portion has a structure where straight lines meet.
Condition 19: the corner of the upper portion and/or the lower portion has a structure where a straight line and a curve meet.
Condition 20: the corner of the upper portion and/or the lower portion has a structure where curves meet.
Condition 21: the corner of the upper portion and/or the lower portion has a round structure.

Figure 9:
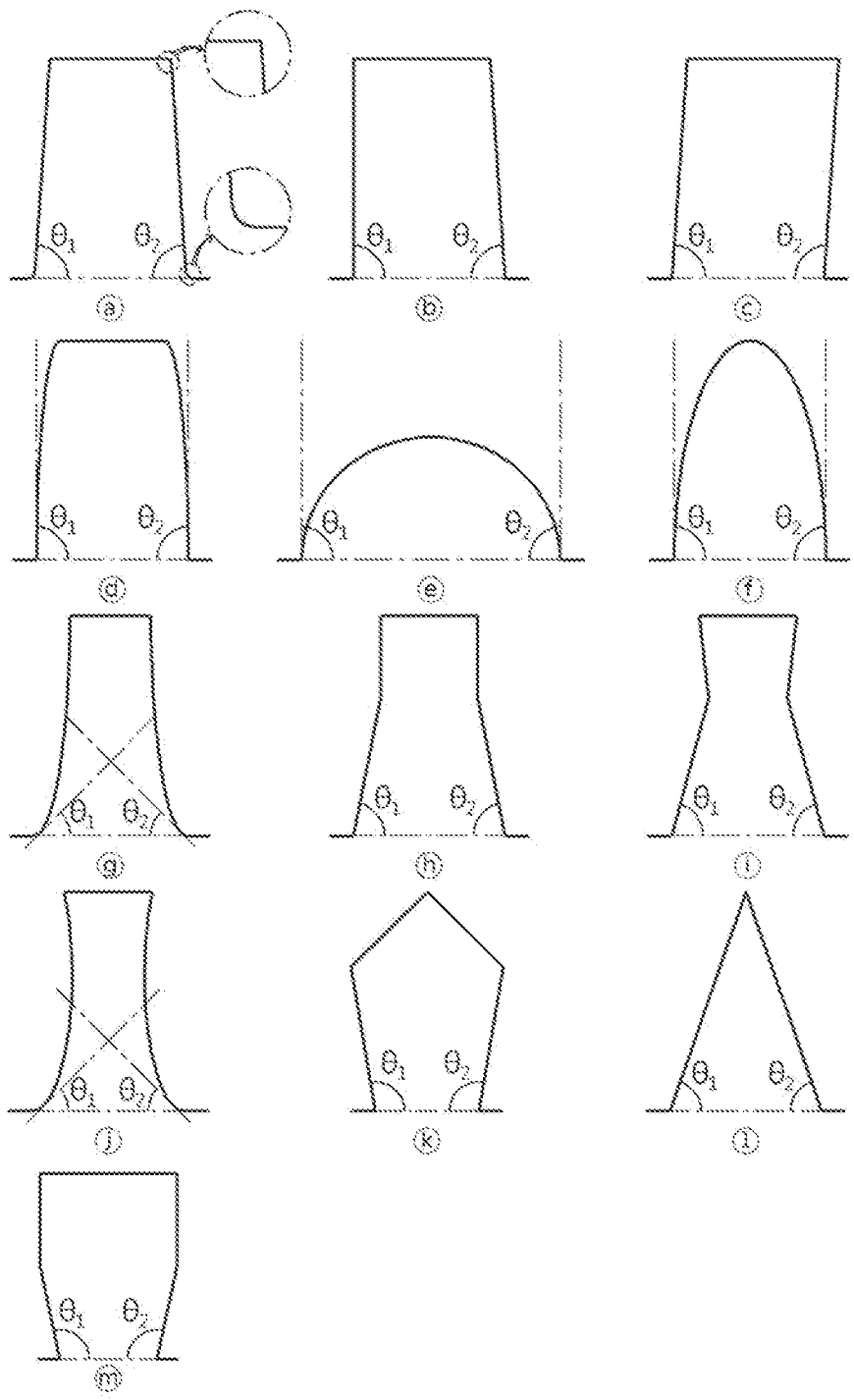
FIG. 9 is a diagram showing a segment structure according to various modifications of the present disclosure.

FIG. 9 is a diagram exemplarily showing the shapes of segments 61 according to various modifications of the present disclosure.

As shown in the drawing, the segment 61 may have various geometric shapes in which a dotted line connecting the bottoms 63a of the first cut grooves 63 at both sides is a base. The geometric shape has a structure in which at least one straight line, at least one curved line, or a combination thereof are connected. In one example, the segment 61 may have a polygonal shape, a round shape, or various combinations thereof.

Specifically, the segment 61 may have a left-right symmetrical trapezoidal shape (ⓐ); a left-right asymmetric trapezoidal shape (ⓑ); a parallelogram shape (ⓒ); a triangular shape (ⓘ); a pentagonal shape (ⓚ); an arc shape (ⓔ); or an elliptical shape (ⓕ).

Since the shape of the segment 61 is not limited to those shown in FIG. 9, it may be transformed into other polygonal shapes, other round shapes, or combinations thereof to satisfy at least one of the conditions 1 to 21 described above.

In the polygonal shapes ⓐ, ⓑ, ⓒ, ⓚ and ⓘ of the segment 61, the corners of the upper portion and/or the lower portion may have a shape where straight lines meet or a round shape (see the enlarged view of the corners of the upper portion and/or the lower portion of the shape ⓐ).

In the polygonal shapes a, ⓑ, ⓒ, ⓚ, and ⓘ of the segment 61 and the curved shapes ⓔ and ⓕ of the segment 61, the interior angle ($\theta_1$) at one side and the interior angle ($\theta_2$) at the other side of the lower portion may be the same or different, and the interior angle ($\theta_1$) at one side and the interior angle ($\theta_2$) at the other side of the lower portion may be an acute angle, a right angle, or an obtuse angle, respectively. The interior angle is an angle at which the base and the side of a geometric figure meet. When the side is curved, the straight line may be replaced by a tangent line extending from the point where the base meets the side.

The shape of the side portion of the segment 61 having a polygonal shape may be modified in various ways.

In one example, the side portion of the segment shape ⓐ may be transformed into an outwardly convex curve, such as the shape ⓓ, or may be transformed into an inwardly curved segment, such as the shape ⓖ or ⓙ.

In another example, the side portion of the segment shape a may be transformed into a bent straight line curved indented into the segment, such as the shape ⓗ or ⓘ. Although not shown, the side portion of the segment shape ⓐ may be transformed into a straight line convexly bent to the outside.

In the segment shapes ⓓ, ⓖ, ⓙ, ⓗ, and ⓘ in which the side portion is modified in various ways, the interior angle ($\theta_1$) at one side and the interior angle ($\theta_2$) at the other side of the lower portion may be the same or different, and the interior angle ($\theta_1$) at one side and the interior angle ($\theta_2$) at the other side of the lower portion may be any one of an acute angle, a right angle, and an obtuse angle, respectively.

The width (length in the winding direction) of the segment 61 may have various change pattern from the bottom to the top.

In one example, the width of the segment 61 may be kept uniform from the bottom to the top (shape ⓒ). In another example, the width of the segment 61 may gradually decrease from the bottom to the top (shapes ⓐ, ⓑ, ⓓ, ⓔ, ⓕ, and ⓖ). In still another example, the width of the segment 61 may gradually decrease and then increase from the bottom to the top (shapes ⓘ and ⓙ). In still another example, the width of the segment 61 may gradually increase and then decrease from the bottom to the top (shape ⓚ). In still another example, the width of segment 61 may gradually decrease from the bottom to the top and then be kept uniform (shape ⓗ). Although not shown, the width of the segment 61 may gradually increase from the bottom to the top and then be kept uniform.

Meanwhile, among the shapes of the segment 61 illustrated in FIG. 9, the polygonal shape with a flat top may be rotated by 180 degrees. In one example, when the segment shape ⓐ, ⓑ, ⓓ or ⓖ rotates by 180 degrees, the width of the segment 61 may gradually increase from the bottom to the top. In another example, when the segment shape ⓗ is rotated by 180 degrees, the width of the segment 61 may be kept uniform from the bottom to the top and then gradually increase.

In the embodiments (modifications) described above, according to another aspect of the present disclosure, it is possible to differently change the shape of the segment 61 according to the area of the third portion B2. In one example, for a region in which stress is concentrated, a round shape (e.g., semicircle, ellipse, etc.) that is advantageous for stress distribution may be applied, and for a region in which stress is relatively low, a polygonal shape (e.g., square, trapezoid, parallelogram, etc.) having a wide area as much as possible may be applied.

In the embodiments (modifications), the segment structure of the third portion B2 may also be applied to the first portion B1. However, when the segment structure is applied to the first portion B1, a reverse forming phenomenon in which the end of the first portion B1 is curved toward the outer circumference when the segment 61 of the third portion B2 is bent according to the radius of curvature of the core may occur. Therefore, even if there is no segment structure in the first portion B1, or even if the segment structure is applied, it is desirable to adjust the width and/or height and/or separation pitch of the segment 61 as small as possible to a level where reverse forming does not occur in consideration of the radius of curvature of the core.

According to still another aspect of the present disclosure, after the electrode 60 is wound into the electrode assembly JR, the segments constituting the segment alignment 50 exposed on the upper portion and the lower portion of the electrode assembly JR may be overlapped into several layers along the radial direction of the electrode assembly JR to form the bending surface regions F.

Figure 10:
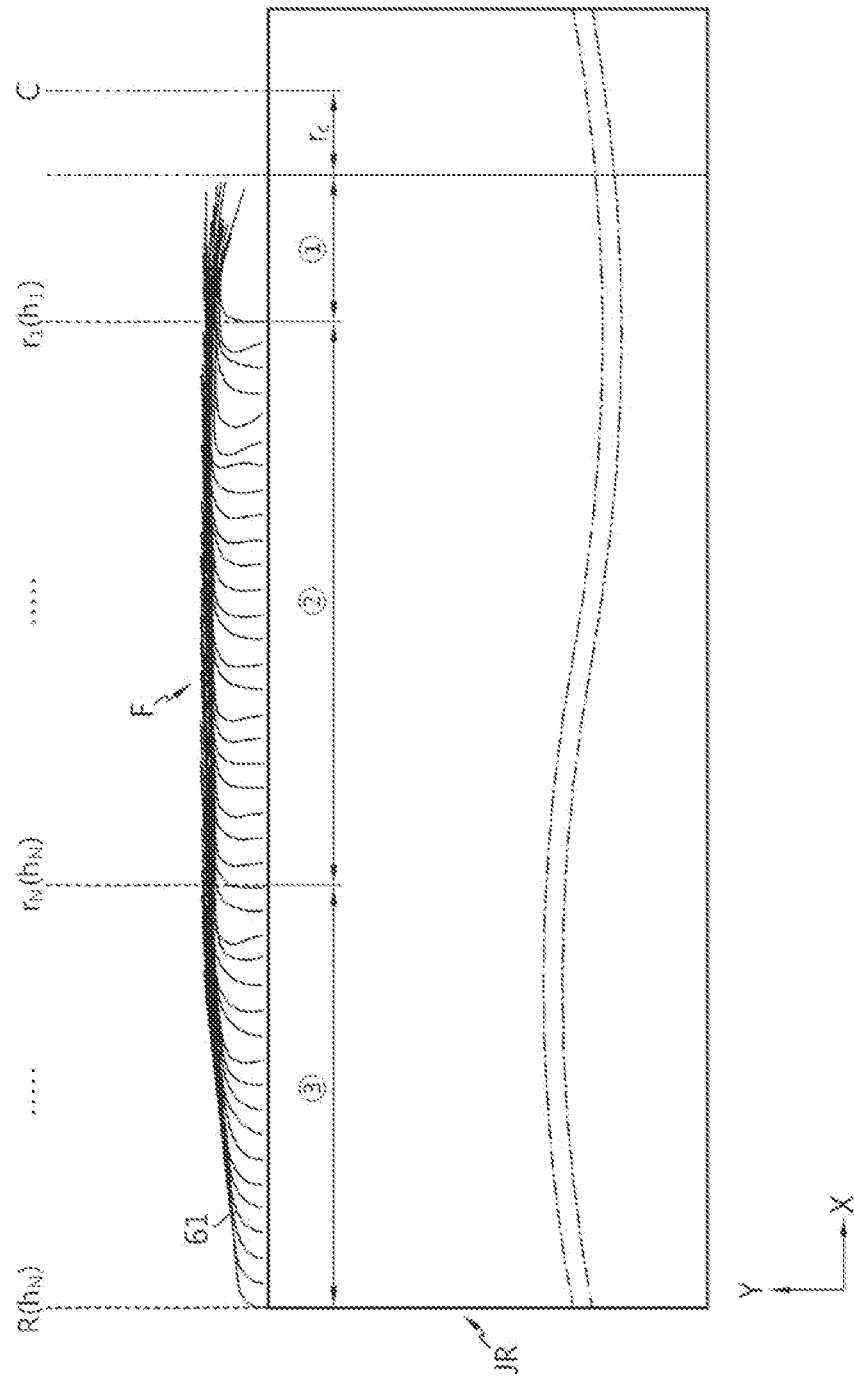
FIG. 10 is a schematic diagram showing a cross section of a bending surface region formed by bending the segment toward the core of the electrode assembly according to an embodiment of the present disclosure.

FIG. 10 is a schematic diagram showing a cross section of the bending surface region F formed by bending the segments 61 toward the core C of the electrode assembly JR. The sectional structure of the bending surface region F shows a structure when the segment alignment 50 is cut in the radial direction. The bending surface region F is formed by bending the segments 61 whose heights are changed stepwise from the core toward the outer circumference of the electrode assembly JR. In FIG. 10, the cross section of the bending surface region F is shown only at the left side based on the winding axis of the electrode assembly JR. The bending surface region F may be formed at both the upper portion and the lower portion of the electrode assembly JR.

Referring to FIG. 10, the bending surface region F has a structure in which the segments 61 are overlapped into a plurality of layers in the winding axis direction. The overlapping direction is the winding axis direction Y. The region ① is a segment skip region (first portion) with no segment, and the regions ② and ③ are regions where winding turns containing the segment groups 61g disposed in the winding direction with a separation gap therebetween are located. The region ② is a height variable region in which the heights of the segments 61 vary, and the region ③ is a height uniform region in which the heights of the segments are maintained uniformly until the outer circumference of the electrode assembly. As will be described later, the lengths of the region ② and the region ③ in the radial direction may be variable. Meanwhile, the uncoated portion (second portion) included in at least one winding turn including an outermost winding turn may not include a segment structure. In this case, the second portion may be excluded in the region ③.

In the region ②, the heights of the segments 61 may be changed stepwise from the minimum height $h_1$ (=$h_{min}$) to the maximum height $h_N$ (=$h_{max}$) in the radius $r_1$ to $r_N$ region of the electrode assembly JR. The height variable regions where the heights of the segments 61 vary are $r_1$ to $r_N$. From the radius $r_N$ to the radius R of the electrode assembly JR, the heights of the segments 61 are maintained uniformly at $h_N$. Uniform heights means that the deviation of heights is within 5%.

At any radius location in the region ② and the region ③, the stack number of the segments 61 varies depending on the radius location. In addition, the stack number of the segments 61 may vary depending on the width of the region ②, the minimum height ($h_1$) and maximum height ($h_{N-1}$) of the segments in the height variable region of the segments 61, and the height change width (Δh) of the segments 61. The stack number of the segments 61 is the number of segments that meet an imaginary line when the imaginary line is drawn in the winding axis direction from an arbitrary radius location of the electrode assembly JR.

Preferably, the stack number of the segments 61 at each location of the bending surface region F may be optimized according to the required welding strength of the current collecting plate by adjusting the height, width (length in the winding direction) and separation pitch of the segments 61 according to the radius of the winding turn containing the segment 61.

First, in the height variable region (②) of the segments 61, when the minimum height ($h_1$) of the segments is the same, it will be described through specific embodiments how the stack number of the segments 61 varies along the radial direction of the bending surface region F according to the change in the maximum height ($h_{N-1}$) of the segments 61.

The electrode assemblies of the embodiments 1-1 to 1-7 are prepared. The electrode assemblies of the embodiments have a radius of 22 mm and a core diameter of 4 mm. The positive electrode and the negative electrode included in the electrode assembly have the electrode structure shown in FIG. 4a. The second portion B3 of the positive electrode and the negative electrode does not contain a segment. The length of the second portion B3 is 2% to 4% of the total length of the electrode. The positive electrode, the negative electrode, and the separator are wound by the method described in FIG. 2. The winding turns are between 48 turns and 56 turns, but the winding turns of the embodiments are 51 turns. The thickness of the positive electrode, the negative electrode and the separator are 149 m, 193 m and 13 m, respectively. The thickness of the positive electrode and the negative electrode is the thickness including the thickness of the active material layer. The thicknesses of the positive electrode current collector and the negative electrode current collector are 15 m and 10 m, respectively. The lengths of the positive and negative electrodes in the winding direction are 3948 mm and 4045 mm, respectively.

In each embodiment, the minimum height of the segments 61 is set to 3 mm so that the height variable region (②) of the segments 61 starts with a radius of 5 mm. In addition, in each embodiment, the heights of the segments 61 are increased by 1 mm per 1 mm increase in radius, and the maximum height of the segments 61 is changed variously from 4 mm to 10 mm.

Specifically, in the embodiment 1-1, the height variable region (②) of the segments 61 is 5 mm to 6 mm, and the heights of the segments 61 are variable from the radius 3 mm to 4 mm. In the embodiment 1-2, the height variable region (②) of the segments 61 is 5 mm to 7 mm, and the heights of the segments 61 are variable from 3 mm to 5 mm. In the embodiment 1-3, the height variable region (②) of the segments 61 is 5 mm to 8 mm, and the heights of the segments 61 are variable from 3 mm to 6 mm. In the embodiment 1-4, the height variable region (②) of the segments 61 is 5 mm to 9 mm, and the heights of the segments 61 are variable from 3 mm to 7 mm. In the embodiment 1-5, the height variable region (②) of the segments 61 is 5 mm to 10 mm, and the heights of the segments 61 are variable from 3 mm to 8 mm. In the embodiment 1-6, the height variable region (②) of the segments 61 is 5 mm to 11 mm, and the heights of the segments 61 are variable from 3 mm to 9 mm. In the embodiment 1-7, the height variable region (②) of the segments 61 is 5 mm to 12 mm, and the heights of the segments 61 are variable from 3 mm to 10 mm. In the embodiment 1-1 to 1-7, the heights of the segments 61 are uniform from the radius corresponding to the upper limit of the height variable region (②) to the outer circumference. In one example, in the embodiment 1-7, the heights of the segments 61 are uniform at 10 mm from radius 12 mm to 22 mm. Meanwhile, in the electrode assembly of the comparative example, the heights of the segments 61 are maintained at a single height of 3 mm from the radius of 5 mm to the radius of 22 mm.

Figure 11A:
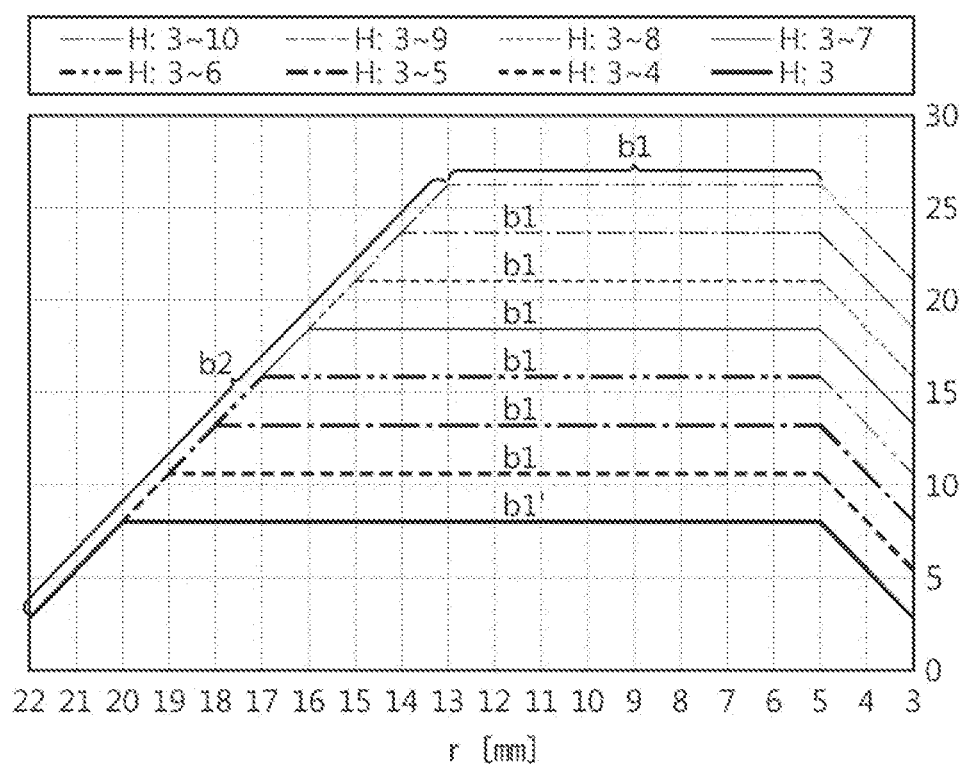
FIG. 11a is graphs showing the results of counting the stack number of segments along a radial direction in the bending surface region of a positive electrode formed at the upper portion of the electrode assemblies according to the embodiments 1-1 to 1-7 and the comparative example.

FIG. 11a is graphs showing the results of counting the stack number of segments along the radial direction in the bending surface region F of the positive electrode formed at the upper portion of the electrode assemblies according to the embodiments 1-1 to 1-7 and the comparative example. The bending surface region F is formed by bending the segments 61 included in the segment alignment 50 toward the core of the electrode assembly JR. The bending surface region of the negative electrode also shows substantially the same results. The horizontal axis of the graph is the radius based on the center of the core, and the vertical axis of the graph is the stack number of segments counted at each radius point, which is also applied in the same way to FIGS. 11b and 11c, explained later.

Referring to FIG. 11a, the stack number uniform region b1 of the segments is commonly shown in the embodiments 1-1 to 1-7 and the comparative example 1. The stack number uniform region b1 is a radial region of a flattened area in each graph. The length of the stack number uniform region b1 increases as the maximum height of the segments decreases, and the stack number uniform region b1' of the comparative example is longest. Meanwhile, the stack number of segments increases as the maximum height ($h_N$) of the segments increases. That is, when the maximum height ($h_N$) of the segments increases so that the width of the height variable region (②) of the segments increases, the stack number of segments increases while the width of the stack number uniform region b1 decreases. At the outer side of the stack number uniform region b1, the stack number decrease region b2 appears, in which the stack number of segments decreases as the radius increases. The stack number decrease region b2 is a radial region in which the stack number of segments decreases as the radius of the electrode assembly increases. The stack number uniform region b1 and the stack number decrease region b2 are adjacent in the radial direction and complementary to each other. That is, when the length of one region increases, the length of the other region decreases. In addition, in the stack number decrease region b2, the stack number decreases in proportion to the distance away from the stack number uniform region b1.

From the point of view of the stack number of the segments, in the embodiments 1-1 to 1-7, the stack number of the segments is 10 or more in the stack number uniform region b1. An area where the stack number of segments is 10 or more may be set as a desirable welding target area. The welding target area is a region to which at least a part of the current collecting plate can be welded.

In the embodiments 1-1 to 1-7, the stack number uniform region b1 starts from the radius point where the height variable region (②) of the segments starts. That is, the height variable region (②) starts with the radius of 5 mm and extends toward the outer circumference.

In the embodiments 1-1 to 1-7 and the comparative example 1, for the positive electrode, Table 4 below shows the results of calculating a ratio of the length of the segment skip region (c) to the radius (b−a) of the electrode assembly excluding the core, a ratio (e/f) of the length of the stack number uniform region b1 to the length (f) from the radius point (5 mm) where the stack number uniform region starts to the outermost point (22 mm) of the electrode assembly, a ratio (d/f) of the length of the height variable region (d) of the segment to the length (f) from the radius point (5 mm) where the stack number uniform region starts to the outermost point (22 mm) of the electrode assembly, a ratio (h) of the length of the electrode area corresponding to the segment skip region to the entire length of the electrode, a ratio (i) of the length of the electrode area corresponding to the height variable region to the entire length of the electrode, and a ratio (j) of the length of the electrode area corresponding to the height uniform region to the entire length of the electrode, and the like.

Except that the negative electrode shows a difference of 0.1% to 1.2% for the parameter h, the other parameters are substantially the same as the positive electrode. The sum of the proportions h, i and j is slightly different from 100%. The reason is that there is a region with no segment in the second portion B3 corresponding to the core side uncoated portion of the electrode. For example, in the embodiment 1-1, a segment does not exist in the second portion B3 corresponding to approximately 300 of the entire length of the electrode. In Table 4, a to f are parameters based on the length in the radial direction, and h, i, and j are parameters based on the length in the winding direction of the electrode. Also, the parameters corresponding to the ratio (%) are values rounded at one decimal place. These points are substantially the same in Tables 5 and 6, explained later.

TABLE 4

| Ref. | a. core radius (mm) | b. radius of winding structure (mm) | c. segment skip region (mm) | d. height variable region (mm) | e. stack number uniform region (mm) | f. segment region (mm) | g. stack number of uniform region | c/(b−a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 1-1 | 2 | 22 | 3 | 1 | 14 | 17 | 11 | 15% | 6% | 82% | 6% | 3% | 87% |
| embodiment 1-2 | 2 | 22 | 3 | 2 | 13 | 17 | 13 | 15% | 12% | 76% | 6% | 7% | 83% |
| embodiment 1-3 | 2 | 22 | 3 | 3 | 12 | 17 | 16 | 15% | 18% | 71% | 6% | 11% | 80% |
| embodiment 1-4 | 2 | 22 | 3 | 4 | 11 | 17 | 18 | 15% | 24% | 65% | 6% | 15% | 75% |
| embodiment 1-5 | 2 | 22 | 3 | 5 | 10 | 17 | 21 | 15% | 29% | 59% | 6% | 21% | 69% |
| embodiment 1-6 | 2 | 22 | 3 | 6 | 9 | 17 | 23 | 15% | 35% | 53% | 6% | 25% | 65% |
| embodiment 1-7 | 2 | 22 | 3 | 7 | 8 | 17 | 27 | 15% | 41% | 47% | 6% | 32% | 59% |
| comparative example 1 | 2 | 22 | 3 | 0 | 15 | 17 | 8 | 15% | 0% | 88% | 6% | — | — |

Seeing the embodiments 1-1 to 1-7 of Table 4, the stack number of segments is 11 to 27, and the ratio (d/f) of the height variable region (d) to the radial region f containing segments is 6% to 41%. In addition, the ratio (e/f) of the stack number uniform region (e) to the radial region f containing segments is 47% to 82%. In addition, the ratio (c/(b−a)) of the segment skip region (c) to the radius (b−a) of the electrode assembly excluding the core is 15%. In addition, the ratio of the length of the electrode area corresponding to the segment skip region to the entire length of the electrode is 6%, the ratio of the length of the electrode area corresponding to the height variable region to the entire length of the electrode to is 3% to 32%, and the ratio of the length of the electrode area corresponding to the height uniform region to the entire length of the electrode is 59% to 87%. The stack number (g) of the stack number uniform region is 10 or more in all of the embodiments 1-1 to 1-7. The stack number uniform region (e) decreases as the height variable region (d) of the segments increases, but the stack number (g) of the segments increases in the stack number uniform region (e). Preferably, the stack number uniform region (e) in which the stack number (g) of segments is 10 or more may be set as a welding target area.

In the cylindrical batteries with a form factor of 1865 or 2170, the radius of the electrode assembly is approximately 9 mm to 10 mm. Therefore, for a conventional cylindrical battery, as in the embodiments 1-1 to 1-7, the length of the segment region (f) in the radial direction cannot be secured at the level of 17 mm, and the length of the stack number uniform region (e) cannot be secured at the level of 8 mm to 14 mm. This is because, in a conventional cylindrical battery, when the radius of the core is designed to be 2 mm, which is the same as in the embodiments 1-1 to 1-7, the radial region in which segments can be disposed is substantially only 7 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) used in the embodiments 1-1 to 1-7. Therefore, the numerical ranges for the parameters h, i, and j cannot be easily derived from design specifications of the conventional cylindrical battery.

Next, when the maximum height ($h_N$) of the segments is the same in the height variable region (②  in FIG. 10) of the segments, it will be explained through specific embodiments how the stack number of the segments varies along the radial direction of the bending surface region F according to the change in the minimum height ($h_1$) of the segments.

The electrode assemblies of the embodiments 2-1 to 2-5 have a radius of 22 mm and a diameter of core C of 4 mm. In the height variable region (② in FIG. 10) of the segments 61, the minimum height ($h_1$) is the same as 4 mm, and the maximum height ($h_N$) varies from 6 mm to 10 mm in increments of 1 mm. Therefore, in the electrode assemblies of the embodiments 2-1 to 2-5, the height variable region (② in FIG. 10) of the segments has a width of 2 mm, 3 mm, 4 mm, 5 mm, and 6 mm, respectively, and the segment skip region (① in FIG. 10) is a radial region with a radius of 2 mm to 6 mm.

The electrode assemblies of the embodiments 3-1 to 3-4 have a radius of 22 mm and a diameter of the core C of 4 mm. In the height variable region (② in FIG. 10) of the segments 61, the minimum height ($h_1$) is the same as 5 mm, and the maximum height ($h_N$) varies from 7 mm to 10 mm in increments of 1 mm. Therefore, in the electrode assemblies of the embodiments 3-1 to 3-4, the height variable region (② in FIG. 10) of the segments has a width of 2 mm, 3 mm, 4 mm, and 5 mm, respectively, and the segment skip region (① in FIG. 10) is a radial region with a radius of 2 mm to 7 mm.

The electrode assemblies of the embodiments 4-1 to 4-3 have a radius of 22 mm and a diameter of the core C of 4 mm. In the height variable region (② in FIG. 10) of the segments 61, the minimum height ($h_1$) is the same as 6 mm, and the maximum height ($h_N$) varies from 8 mm to 10 mm in increments of 1 mm. Therefore, in the electrode assemblies of the embodiments 4-1 to 4-3, the width of the height variable region (② in FIG. 10) of the segments is 2 mm, 3 mm, and 4 mm, respectively, and the segment skip region (① in FIG. 10) is a radial region with a radius of 2 mm to 8 mm.

The electrode assemblies of the embodiments 5-1 to 5-2 have a radius of 22 mm and a diameter of core C of 4 mm. In the height variable region (② in FIG. 10) of the segments 61, the minimum height ($h_1$) is the same as 7 mm, and the maximum height ($h_N$) varies from 9 mm to 10 mm in 1 mm increments. Therefore, in the electrode assemblies of the embodiments 5-1 to 5-2, the width of the height variable region (② in FIG. 10) of the segments is 2 mm and 3 mm, respectively, and the segment skip region (① in FIG. 10) is a radial region with a radius of 2 mm to 9 mm.

Figure 11B:
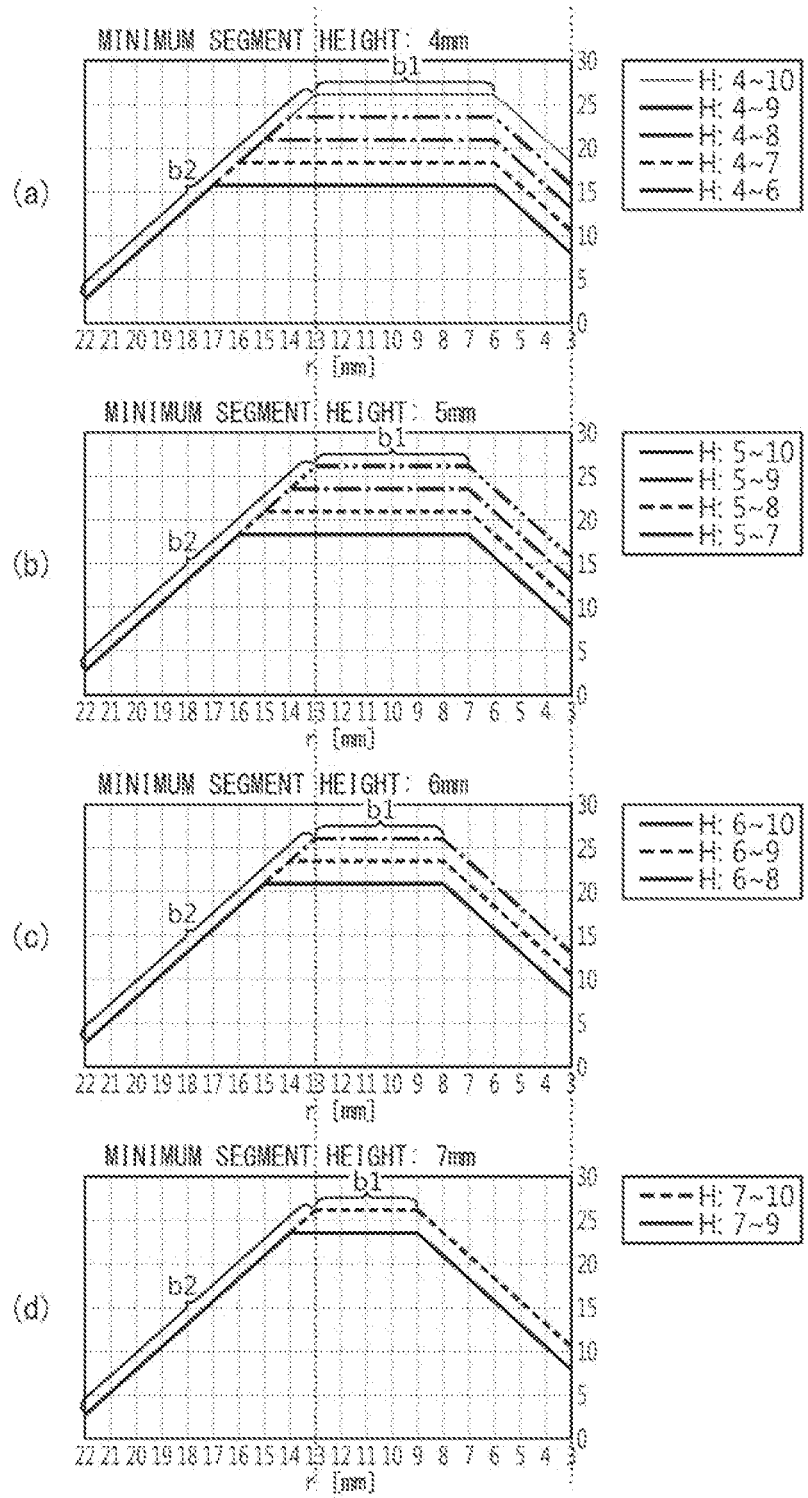
FIG. 11b is graphs showing the results of counting the stack number of segments along the radial direction in the bending surface region of the positive electrode formed at the upper portion of the electrode assemblies according to the embodiments 2-1 to 2-5, the embodiments 3-1 to 3-4, the embodiments 4-1 to 4-3, and the embodiments 5-1 to 5-2.

FIG. 11*b* is graphs showing the results of counting the stack number of segments along the radial direction in the bending surface region F of the positive electrode formed at the upper portion of the electrode assemblies according to the embodiments 2-1 to 2-5, the embodiments 3-1 to 3-4, the embodiments 4-1 to 4-3, and the embodiments 5-1 to 5-2. The bending surface region of the negative electrode also shows substantially the same results.

In FIG. 11*b*, the graph (a) shows the result of counting the stack number of segments along the radial direction in the bending surface region F for the embodiment 2-1 to 2-5, the graph (b) is for the embodiment 3-1 to 3-4, the graph (c) is for the embodiment 4-1 to 4-3, and the graph (d) is for the embodiments 5-1 to 5-2.

Referring to FIG. 11*b*, the stack number uniform region b1 of the segments appears in common in all embodiments. The stack number uniform region b1 is a radial region of the flat area in the graph. The length of the stack number uniform region b1 increases as the maximum height ($h_N$) of the segments decreases when the minimum height ($h_1$) of the segments is the same. Also, the length of the stack number uniform region b1 increases as the minimum height ($h_1$) of the segments decreases when the maximum height ($h_N$) of the segments is the same. Meanwhile, in the stack number uniform region b1, the stack number of segments increases as the maximum height ($h_N$) of the segments increases. Even in the embodiments, the stack number decrease region b2 appears near the stack number uniform region b1.

In all of the embodiments, the stack number of segments in the stack number uniform region b1 is 10 or more. Preferably, an area where the stack number of segments is 10 or more may be set as a desirable welding target area.

In the embodiments, the stack number uniform region b1 starts from the radius point where the height variable region (② in FIG. 10) of the segments starts. In the embodiments 2-1 to 2-5, the height variable region (② in FIG. 10) of the segments starts from 6 mm and extends toward the outer circumference. In the embodiments 3-1 to 3-4, the height variable region (② in FIG. 10) of the segments starts from 7 mm and extends toward the outer circumference. In the embodiments 4-3 to 4-3, the height variable region (② in FIG. 10) of the segments starts from 8 mm and extends toward the outer circumference. In the embodiments 5-1 to 5-2, the height variable region (② in FIG. 10) of the segments starts from 9 mm and extends toward the outer circumference.

Table 5 below shows the results of calculating various parameters for the embodiments 2-1 to 2-5, the embodiments 3-1 to 3-4, the embodiments 4-1 to 4-3, and the embodiments 5-1 to 5-2, including a ratio (e/f) of the length of the stack number uniform region to the length from the radius point (6 mm, 7 mm, 8 mm, 9 mm) where the stack number uniform region starts to the outermost point (22 mm) of the electrode assembly, a ratio (d/f) of the length of the height variable region (②) of the segments to the length from the radius point (6 mm, 7 mm, 8 mm, 9 mm) where the stack number uniform region starts to the outermost point (22 mm) of the electrode assembly, and the like.

TABLE 5

| Ref. | a. core radius (mm) | b. radius of winding structure (mm) | c. segment skip region (mm) | d. height variable region (mm) | e. stack number uniform region (mm) | f. segment region (mm) | g. stack number of uniform region | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 2-1 | 2 | 22 | 4 | 2 | 7 | 16 | 16 | 20% | 13% | 44% | 10% | 6% | 81% |
| embodiment 2-2 | 2 | 22 | 4 | 3 | 8 | 16 | 18 | 20% | 19% | 50% | 10% | 11% | 77% |
| embodiment 2-3 | 2 | 22 | 4 | 4 | 9 | 16 | 21 | 20% | 25% | 56% | 10% | 16% | 72% |
| embodiment 2-4 | 2 | 22 | 4 | 5 | 10 | 16 | 23 | 20% | 31% | 63% | 10% | 20% | 68% |
| Embodiment 2-5 | 2 | 22 | 4 | 6 | 11 | 16 | 27 | 20% | 38% | 69% | 10% | 25% | 65% |
| embodiment 3-1 | 2 | 22 | 5 | 2 | 6 | 15 | 18 | 25% | 13% | 40% | 13% | 7% | 77% |
| embodiment 3-2 | 2 | 22 | 5 | 3 | 7 | 15 | 21 | 25% | 20% | 47% | 13% | 12% | 72% |
| embodiment 3-3 | 2 | 22 | 5 | 4 | 8 | 15 | 24 | 25% | 27% | 53% | 13% | 16% | 68% |
| embodiment 3-4 | 2 | 22 | 5 | 5 | 9 | 15 | 27 | 25% | 33% | 60% | 13% | 22% | 62% |
| embodiment 4-1 | 2 | 22 | 6 | 2 | 5 | 14 | 21 | 30% | 14% | 36% | 16% | 9% | 72% |
| embodiment 4-2 | 2 | 22 | 6 | 3 | 6 | 14 | 23 | 30% | 21% | 43% | 16% | 13% | 68% |
| embodiment 4-3 | 2 | 22 | 6 | 4 | 7 | 14 | 27 | 30% | 29% | 50% | 16% | 19% | 62% |
| embodiment 5-1 | 2 | 22 | 7 | 2 | 4 | 13 | 23 | 35% | 15% | 31% | 20% | 9% | 68% |
| embodiment 5-2 | 2 | 22 | 7 | 3 | 5 | 13 | 27 | 35% | 23% | 38% | 20% | 15% | 62% |

Referring to the embodiments 2-5, 3-4, 4-3, and 5-2 of Table 5 together with FIGS. 10 and 11*b*, the maximum height ($h_N$) of the segments in the height variable region (②) of the segments is the same as 10 mm, but the minimum height ($h_1$) of the segments increases to 4 mm, 5 mm, 6 mm, and 7 mm by 1 mm, and the length of the height variable region (②) decreases to 6 mm, 5 mm, 4 mm, and 3 mm by 1 mm. In the four embodiments, the ratio (e/f) of the stack number uniform region is largest in the embodiments 2-5 as 69% and is smallest in the embodiment 5-1 as 31%, and the stack numbers of the stack number uniform regions are all the same. From the results shown in Table 5, when the maximum height ($h_N$) of the segments is the same, it may be understood that as the width of the height variable region (②) of the segment increases since the minimum height ($h_1$) of the segments decreases, the width of the stack number uniform region also increases proportionally. The reason is that as the minimum length ($h_1$) of the segments is smaller, the radius point at which the segment starts is closer to the core, and thus the area where the segments are stacked expands toward the core.

Seeing Table 5, it may be found that the stack number of the segments is 16 to 27, the ratio (d/f) of the height variable region (②) of the segments is 13% to 38%, and the ratio (e/f) of the stack number uniform region is 31% to 69%. In addition, the ratio (c/(b−a)) of the segment skip region (c) to the radius (b−a) of the electrode assembly excluding the core is 20% to 35%. In addition, the ratio of the length of the electrode area corresponding to the segment skip region to the entire length of the electrode is 10% to 20%, the ratio of the length of the electrode area corresponding to the height variable region to the entire length of the electrode is 6% to 25%, and the ratio of the length of the electrode area corresponding to the height uniform region to the entire length of the electrode is 62% to 810%.

In the cylindrical batteries with a form factor of 1865 or 2170, the electrode assembly has a radius of approximately 9 mm to 10 mm. Therefore, different from the embodiments, it is not possible to secure the length of the segment region (f) in the radial direction at the level of 13 mm to 16 mm, and it is not possible to secure the length of the stack number uniform region (e) where the stack number of the segments is 10 or more at the level of 5 mm to 11 mm while securing the length of the segment skip region (c) at the level of about 4 mm to 7 mm. This is because, in the conventional cylindrical battery, when the radius of the core is designed to be 2 mm, which is the same as the embodiments, the radial region in which segments can be disposed is substantially only 7 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) in the embodiments. Therefore, the numerical ranges for the parameters h, i, and j cannot be easily derived from design specifications of the conventional cylindrical batteries.

Next, when the minimum height ($h_1$) and the maximum height ($h_N$) of the segments are the same in the height variable region (② of FIG. 10) of the segments, it will be explained through specific embodiments how the stack number of the segments according to the diameter of the core C of the electrode assembly changes along the radial direction of the bending surface region F.

The electrode assemblies of the embodiments 6-1 to 6-6 have a radius of 22 mm, and the radius of the core C is 4 mm. In the height variable region (② of FIG. 10) of the segments 61, the minimum height ($h_1$) of the segments is the same as 3 mm, and the maximum height ($h_N$) of the segments varies from 5 mm to 10 mm in increments of 1 mm. Therefore, in the electrode assemblies of the embodiments 6-1 to 6-6, the width of the height variable region (② of FIG. 10) of the segments is 2 mm, 3 mm, 4 mm, 5 mm, 6 mm, and 7 mm, respectively, and the segment skip region (① of FIG. 10) is a radial region with a radius of 4 mm to 7 mm.

The electrode assemblies of the embodiments 7-1 to 7-6 have a radius of 22 mm, and the radius of the core C is 2 mm. In the height variable region (② of FIG. 10) of the segments 61, the minimum height ($h_1$) of the segments is the same as 3 mm, and the maximum height ($h_N$) of the segments varies from 5 mm to 10 mm in increments of 1 mm. Therefore, in the electrode assemblies of the embodiments 7-1 to 7-6, the height variable region (② of FIG. 10) of the segments has a width of 2 mm, 3 mm, 4 mm, 5 mm, 6 mm, and 7 mm, respectively, and the segment skip region (①) is all the same as a radial region with a radius of 2 mm to 5 mm.

FIG. 11c is graphs showing the results of counting the stack number of segments measured along the radial direction in the bending surface region F of the positive electrode formed at the upper portion of the electrode assembly according to the embodiments 6-1 to 6-6 and the embodiments 7-1 to 7-6. Substantially the same results appear in the bending surface region of the negative electrode.

In FIG. 11c, the graph (a) shows the result of counting the stack number of segments measured along the radial direction in the bending surface region F for the embodiments 6-1 to 6-6, and the graph (b) is for the embodiments 7-1 to 7-6.

Referring to FIG. 11c, the stack number uniform region b1 of the segments appears in common in all embodiments. The stack number uniform region b1 is a radial region of the flat area in the graph. The length of the stack number uniform region b1 in the radial direction increases as the maximum height ($h_N$) of the segments decreases when the minimum height ($h_1$) of the segments is the same. Meanwhile, in the stack number uniform region b1, the stack number of segments increases as the maximum height ($h_N$) of the segments increases. In the embodiments, the stack number decrease region b2 is identified near the stack number uniform region b1.

In all of the embodiments, the stack number of the segments is 10 or more in the stack number uniform region b1. Preferably, an area where the stack number of segments is 10 or more may be set as a desirable welding target area.

In the embodiments, the stack number uniform region b1 starts from the radius point where the height variable region (② of FIG. 10) of the segments starts. In the embodiments 6-1 to 6-6, the radius where the height variable region (② of FIG. 10) of the segment starts is 7 mm, and in the embodiments 7-1 to 7-6, the radius where the height variable region (② of FIG. 10) of the segments starts is 5 mm.

Table 6 below shows the results of calculating various parameters for the embodiments 6-1 to 6-6 and the embodiments 7-1 to 7-6, including a ratio (e/f) of the length of the stack number uniform region to the length from the radius point (7 mm, 5 mm) where the stack number uniform region starts to the outermost point (22 mm) of the electrode assembly, a ratio (d/f) of the length of the height variable region (②)) of the segments to the length from the radius point (7 mm, 5 mm) where the stack number uniform region starts to the outermost point (22 mm) of the electrode assembly, and the like.

TABLE 6

| Ref. | a. core radius (mm) | b. radius of winding structure (mm) | c. segment skip region (mm) | d. height variable region (mm) | e. stack number uniform region (mm) | f. segment region (mm) | g. uniform region stack number | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 6-1 | 4 | 22 | 3 | 2 | 11 | 15 | 13 | 17% | 13% | 73% | 6% | 7% | 83% |
| embodiment 6-2 | 4 | 22 | 3 | 3 | 10 | 15 | 16 | 17% | 20% | 67% | 6% | 11% | 80% |
| embodiment 6-3 | 4 | 22 | 3 | 4 | 9 | 15 | 18 | 17% | 27% | 60% | 6% | 15% | 75% |
| embodiment 6-4 | 4 | 22 | 3 | 5 | 8 | 15 | 21 | 17% | 33% | 53% | 6% | 21% | 69% |
| embodiment 6-5 | 4 | 22 | 3 | 6 | 7 | 15 | 23 | 17% | 40% | 47% | 6% | 25% | 65% |
| embodiment 6-6 | 4 | 22 | 3 | 7 | 6 | 15 | 27 | 17% | 47% | 40% | 6% | 32% | 59% |
| embodiment 7-1 | 2 | 22 | 3 | 2 | 13 | 17 | 13 | 15% | 12% | 76% | 6% | 7% | 83% |
| embodiment 7-2 | 2 | 22 | 3 | 3 | 12 | 17 | 16 | 15% | 18% | 71% | 6% | 11% | 80% |
| embodiment 7-3 | 2 | 22 | 3 | 4 | 11 | 17 | 18 | 15% | 24% | 65% | 6% | 15% | 75% |
| embodiment 7-4 | 2 | 22 | 3 | 5 | 10 | 17 | 21 | 15% | 29% | 59% | 6% | 21% | 69% |
| embodiment 7-5 | 2 | 22 | 3 | 6 | 9 | 17 | 23 | 15% | 35% | 53% | 6% | 25% | 65% |
| embodiment 7-6 | 2 | 22 | 3 | 7 | 8 | 17 | 27 | 15% | 41% | 47% | 6% | 32% | 59% |

Seeing FIG. 10 and the embodiments 6-6 and 7-6 of Table 6, the minimum height ($h_1$) and the maximum height ($h_N$) of the segments in the height variable region (②) of the segments are the same as 3 mm and 10 mm, respectively. However, in the embodiment 6-6, the radius of the core is larger by 2 mm than that in the embodiment 7-6. Therefore, in the embodiment 6-6, the stack number uniform region (e) and the segment region (f) are smaller by 2 mm than those in the embodiment 7-6, and the stack number of segments is the same in the stack number uniform region. This result comes from the difference in the radius of the core. From the results shown in Table 6, when the width of the height variable region (②) of the segments is the same, it may be understood that, as the radius (a) of the core is smaller, the ratio (d/f) of the height variable region (②) decreases, but the ratio (e/f) of the stack number uniform region increases. Seeing Table 6, it may be found that the stack number of segments is 13 to 27, the ratio (d/f) of the height variable region (②) of the segments is 12% to 47%, and the ratio (e/f) of the length of the stack number uniform region is 40% to 76%. In addition, the ratio (c/(b−a)) of the segment skip region (c) to the radius (b−a) of the electrode assembly excluding the core is 15% to 17%. In addition, the ratio of the length of the electrode area corresponding to the segment skip region to the entire length of the electrode is 6%, the ratio of the length of the electrode area corresponding to the height variable region to the entire length of the electrode is 7% to 32%, and the ratio of the length of the electrode area corresponding to the height uniform region to the entire length of the electrode is 59% to 83%.

For cylindrical batteries with a form factor of 1865 or 2170, the radius of the electrode assembly is approximately 9 mm to 10 mm. Therefore, different from the embodiments, the length of the segment region (f) in the radial direction is not secured at the level of 15 mm to 17 mm, and at the same time the length of the stack number uniform region (e) where the stack number of segments is 10 or more cannot be secured at the level of 6 mm to 13 mm, while securing the length of the segment skip region (c) at the level of about 3 mm. This is because, in the conventional cylindrical battery, when the radius of the core is designed to be 2 mm to 4 mm, which is the same as the embodiments, the radial region in which segments can be disposed is substantially only 5 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) in the embodiments. Therefore, the numerical ranges for the parameters h, i, and j cannot be easily derived from design specifications of the conventional cylindrical batteries.

Comprehensively considering the data in Tables 4 to 6, the stack number of segments may be 11 to 27 in the stack number uniform region of the segments. In addition, the ratio (d/f) of the height variable region (②) of the segments may be 6% to 47%. Also, the ratio (e/f) of the stack number uniform region may be 310% to 82%. In addition, the ratio (c/(b−a)) of the length of the segment skip region to the radius of the electrode assembly excluding the core may be 15% to 35%. In addition, the ratio of the length of the electrode area corresponding to the segment skip region to the entire length (length in the winding direction) of the electrode may be 6% to 20%. In addition, the ratio of the length of the electrode area corresponding to the height variable region of the segments to the entire length of the electrode may be 3% to 32%. In addition, the ratio of the length of the electrode area corresponding to the height uniform region of the segments to the entire length of the electrode may be 59% to 87%.

Meanwhile, the parameters described in Tables 4 to 6 are be varied according to design factors including the radius (a) of the core; the radius of the electrode assembly (b); the minimum height ($h_1$) and the maximum height ($h_N$) in the height variable region of the segments; the height change width (Δh) of the segments per 1 mm increment of the radius; the thickness of the positive electrode, the negative electrode and the separator, and the like.

Therefore, in the stack number uniform region of the segments, the segment stack number may be extended as 10 to 35. The ratio (d/f) of the height variable region (②) of the segments may be extended as 1% to 50%. Also, the ratio (e/f) of the stack number uniform region may be extended as 30% to 85%. In addition, the ratio (c/(b−a)) of the length of the segment skip region to the radius of the electrode assembly excluding the core may be extended as 10% to 40%. In addition, the ratio of the length of the electrode area corresponding to the segment skip region to the entire length (length in the winding direction) of the electrode may be expanded as 1% to 30%. In addition, the ratio of the length of the electrode area corresponding to the height variable region of the segments to the entire length of the electrode may be expanded as 1% to 40%. In addition, the ratio of the length of the electrode area corresponding to the height uniform region of the segments to the entire length of the electrode may be expanded as 50% to 90%.

In the bending surface region F formed at the upper portion and the lower portion of the electrode assembly, the stack number uniform region may be used as the welding target area of the current collecting plate.

Preferably, the welding region of the current collecting plate overlaps the stack number uniform region by at least 50% in the radial direction of the electrode assembly, and a higher overlapping ratio is more preferred.

Preferably, the rest area of the welding region of the current collecting plate that does not overlap with the stack number uniform region may overlap with the stack number decrease region adjacent to the stack number uniform region in the radial direction.

More preferably, the rest area of the welding region of the current collecting plate that does not overlap with the stack number uniform region may overlap with the area of the stack number decrease region in which the segment stack number is 10 or more.

If the current collecting plate is welded to the area where the segment stack number is 10 or more, it is desirable in terms of the welding strength and prevention of damage to the separator or the active material layer during welding. In particular, it is useful when welding the current collecting plate using a high-power laser with high transmission characteristics.

If the stack number uniform region where 10 or more of the segments are stacked and the current collecting plate are welded with a laser, even if the output of the laser is increased to improve welding quality, the stack number uniform region absorbs most of the laser energy to form a welding bead, so it is possible to prevent the separator and the active material layer below the bending surface region F from being damaged by the laser.

In addition, since the segment stack number is 10 or more in the area where the laser is irradiated, welding beads are formed with sufficient volume and thickness. Therefore, sufficient welding strength may be secured, and the resistance of the welding interface may be reduced to a level suitable for rapid charging.

When welding the current collecting plate, the output of the laser may be determined by the desired welding strength between the bending surface region F and the current collecting plate. The welding strength increases in proportion to the stack number of segments. This is because the volume of the welding beads formed by the laser increases as the stack number increases. The welding beads are formed as the material of the current collecting plate and the material of the segment are melted together. Therefore, when the volume of the welding bead is large, the current collecting plate and the bending surface region are coupled stronger, and the contact resistance of the welding interface is lowered.

Preferably, the welding strength may be 2 kgf/cm$^2$ or more, more preferably 4 kgf/cm$^2$ or more. Also, the welding strength may be preferably set to 8 kgf/cm$^2$ or less, more preferably 6 kgf/cm$^2$ or less.

When the welding strength satisfies the above numerical range, even if severe vibration is applied to the electrode assembly along the winding axis direction and/or the radial direction, the properties of the welding interface do not deteriorate, and the resistance of the welding interface may be reduced since the volume of the welding beads is sufficient.

The power of the laser to meet the welding strength condition differs depending on the laser equipment, and may be appropriately adjusted in the range of 250 W to 320 W or in the range of 40% to 90% of the laser maximum output provided by the equipment.

The welding strength may be defined as a tensile force (kgf/cm$^2$) per unit area of the current collecting plate when the current collecting plate starts to separate from the bending surface region F. Specifically, after the current collecting plate is completely welded, a tensile force may be applied to the current collecting plate while gradually increasing the magnitude of the tensile force. When the tensile force exceeds a threshold value, the segment starts to separate from the welding interface. At this time, the value obtained by dividing the tensile force applied to the current collecting plate by the area of the current collecting plate corresponds to the welding strength.

In the bending surface region F, the segments are stacked in a plurality of layers, and according to the above embodiments, the stack number of segments may increase to 10 at minimum to 35 at maximum.

The thickness of the positive electrode current collector may be selected in the range of 10 μm to 25 μm, and the thickness of the negative electrode current collector may be selected in the range of 5 μm to 20 μm. Therefore, the bending surface region F of the positive electrode may include an area where the total stack thickness of the segments is 100 μm to 875 μm. In addition, the bending surface region F of the negative electrode may include an area where the total stack thickness of the segments is 50 μm to 700 μm.

FIG. 12 is a top plan view of the electrode assembly showing the stack number uniform region b1 and the stack number decrease region b2 in the bending surface region F formed by the segments 61 included in the segment alignment 50 according to an embodiment of the present disclosure.

Referring to FIG. 12, the bending surface region F of the segments 61 is formed by bending the segments 61 included in the segment alignment 50 toward the core C of the electrode assembly JR. In FIG. 12, the area between two circles indicated by the dashed-dotted line corresponds to the stack number uniform region b1 in which the stack number of the segments 61 is 10 or more, and the outer area of the stack number uniform region b1 corresponds to the stack number decrease region b2.

In one example, when the current collecting plate (P$_c$) is welded to the bending surface region F formed by bending the segments 61 of the segment alignment 50, a welding pattern (W$_p$) is generated on the surface of the current collecting plate (P$_c$). The welding pattern (W$_p$) may have an array of line patterns or dot patterns. The welding pattern ($W_p$) corresponds to the welding region and may overlap by 50% or more with the stack number uniform region b1 of the segments along the radial direction. Therefore, a part of the welding pattern ($W_p$) may be included in the stack number uniform region b1, and the rest of the welding pattern ($W_p$) may be included in the stack number decrease region b2 outside the stack number uniform region b1. Of course, the entire welding pattern ($W_p$) may overlap with the stack number uniform region b1.

Preferably, the edge of the portion where the current collecting plate ($P_c$) contacts the bending surface region F may cover the end of the segment 61 bent toward the core C in the last winding turn. In this case, since the welding pattern ($W_p$) is formed in a state where the segments 61 are pressed by the current collecting plate ($P_c$), the current collecting plate ($P_c$) and the bending surface region F are strongly coupled. As a result, since the segments 61 stacked in the winding axis direction come into close contact with each other, the resistance at the welding interface may be lowered and lifting of the segments 61 may be prevented.

Meanwhile, the bending direction of the segments may be opposite to that described above. That is, the segments may be bent from the core toward the outer circumference. In this case, the pattern in which the heights of the segments 61 included in the segment group 61g change along the winding direction (X-axis direction) may be opposite to that of the embodiments (modifications) described above. For example, the heights of the segments 61 may gradually decrease from the core toward the outer circumference. Also, the structure applied to the first portion B1 and the structure applied to the second portion B3 may be switched with each other. Preferably, the height change pattern may be designed such that the heights of the segments 61 are gradually decreased from the core toward the outer circumference, but when the segment 61 closest to the outer circumference of the electrode assembly is bent toward the outer circumference, the end of the segment 61 does not protrude out of the outer circumference of the electrode assembly.

The electrode structure of the above embodiments (modifications) may be applied to at least one of the first electrode and the second electrode having different polarities included in the jelly-roll type electrode assembly. In addition, when the electrode structure of the above embodiments (modifications) is applied to any one of the first electrode and the second electrode, the conventional electrode structure may be applied to the other one. In addition, the electrode structures applied to the first electrode and the second electrode may not be identical but be different from each other.

For example, when the first electrode and the second electrode are a positive electrode and a negative electrode, respectively, any one of the above embodiments (modifications) may be applied to the first electrode and the conventional electrode structure (see FIG. 1) may be applied to the second electrode.

As another example, when the first electrode and the second electrode are a positive electrode and a negative electrode, respectively, any one of the above embodiments (modifications) may be selectively applied to the first electrode and any one of the above embodiments (modifications) may be selectively applied to the second electrode.

In the present disclosure, a positive electrode active material coated on the positive electrode and a negative electrode active material coated on the negative electrode may employ any active material known in the art without limitation.

In one example, the positive electrode active material may include an alkali metal compound expressed by a general formula $A(A_xMy)O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; $x\geq 0$, $1\leq x+y\leq 2$, $-0.1\leq z\leq 2$; and the stoichiometric coefficients x, y and z are selected so that the compound maintains electrical neutrality).

In another example, the positive electrode active material may be an alkali metal compound $xLiM1O_2-(1-x)Li_2M2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0\leq x\leq 1$).

In still another example, the positive electrode active material may be lithium metal phosphate expressed by a general formula $Li_aM1_xFe_{1-x}M2_yP_{1-y}M3_zO_{4-z}$ (M1 includes at least one element selected from the Ti, Si, Mn, Co, Fe, V, Cr, Mo, Ni, Nd, Al, Mg and Al; M2 includes at least one element selected from Ti, Si, Mn, Co, Fe, V, Cr, Mo, Ni, Nd, Al, Mg, Al, As, Sb, Si, Ge, V and S; M3 includes a halogen element optionally including F; $0<a\leq 2$, $0\leq x\leq 1$, $0\leq y<1$, $0\leq z<1$; the stoichiometric coefficient a, x, y and z are selected so that the compound maintains electrical neutrality), or $Li_3M2(PO_4)_3$ (M includes at least one element selected from Ti, Si, Mn, Fe, Co, V, Cr, Mo, Ni, Al, Mg and Al).

Preferably, the positive electrode active material may include primary particles and/or secondary particles in which the primary particles are aggregated.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, low-crystalline carbon, high-crystalline carbon or the like may be used.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

At least one surface of the separator may include a coating layer of inorganic particles. It is also possible that the separator itself is made of a coating layer of inorganic particles. The particles constituting the coating layer may have a structure coupled with a binder so that interstitial volumes exist among adjacent particles.

The inorganic particles may be made of an inorganic material having a dielectric constant of 5 or more. The inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$, $PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

Hereinafter, the structure of the electrode assembly according to an embodiment of the present disclosure will be described in detail.

FIG. 13 is a cross-sectional view of a jelly-roll type electrode assembly 100 in which the electrode 60 according to an embodiment is applied to a first electrode (positive electrode) and a second electrode (negative electrode), taken along the Y-axis direction (winding axis direction) to pass through the segment alignment 50.

Referring to FIG. 13, the uncoated portion 43*a* of the first electrode includes a first portion B1 adjacent to the core of the electrode assembly 100, a second portion B3 adjacent to the surface of the outer circumference of the electrode assembly 100, and a third portion B2 interposed between the first portion B1 and the second portion B3.

The height of the uncoated portion of the first portion B1 is relatively smaller than the height of the segments 61. In addition, in the third portion B2, the bending length of the innermost segment 61 is equal to or smaller than the radial length R of the first portion B1. The bending length H corresponds to the distance from the point where the innermost segment 61 is bent to the top of the segment 61. In a modification, the bending length H may be smaller than the sum of the radial length R of the winding turn formed by the first portion B1 and 10% of the radius of the core 102.

Therefore, even if the segments 61 included in the segment alignment 50 are bent, 90% or more of the diameter of the core 102 of the electrode assembly 100 is open to the outside. The core 102 is a cavity at the center of the electrode assembly 100. If the core 102 is not blocked, there is no difficulty in the electrolyte injection process and the electrolyte injection efficiency is improved. In addition, by inserting a welding jig through the core 102, a welding process between the current collecting plate of the negative electrode (or, positive electrode) and the battery housing (or, rivet terminal) may be easily performed.

The height of the uncoated portion of the second portion B3 is relatively smaller than the height of the segment 61. Therefore, while the beading portion of the battery housing is pressed near the winding turn of the second portion B3, it is possible to prevent an internal short circuit from occurring as the beading portion and the top edge of the electrode assembly 100 contact each other.

In one modification, the second portion B3 may include segments 61 forming the segment alignment 50, and the heights of the segments 61 of the second portion B3 may decrease gradually or stepwise, unlike that shown in FIG. 13. In addition, in FIG. 13, the heights of the segments 61 of the segment alignment 50 are the same in a part of the outer circumference. However, the heights of the segments 61 of the segment alignment 50 may increase gradually or stepwise from the boundary between the first portion B1 and the third portion B2 to the boundary between the third portion B2 and the second portion B3. In the segment alignment 50, the region where the heights of the segments 61 change corresponds to the height variable region (②) in FIG. 10) of the segment.

The second uncoated portion 43*b* has the same structure as the first uncoated portion 43*a*. In one modification, the second uncoated portion 43*b* may have a conventional electrode structure or an electrode structure of other embodiments (modifications).

The end 101 of the segments 61 included in the segment alignment 50 may be bent in the radial direction of the electrode assembly 100, for example from the outer circumference toward the core. At this time, the uncoated portions of the first portion B1 and the second portion B3 are not substantially bent.

Since the segment alignment 50 includes a plurality of segments 61 aligned in the radial direction, the bending stress is relieved to prevent tearing or abnormal deformation of the uncoated portions 43*a*, 43*b* near the bending point. In addition, when the width and/or height and/or separation pitch of the segments 61 is adjusted according to the numerical range of the above-mentioned embodiment, the segments 61 are bent toward the core and overlapped in several layers enough to secure sufficient welding strength, and an empty hole (gap) is not formed in the bending surface region F.

FIG. 14 is a cross-sectional view of an electrode assembly 110 according to still another embodiment of the present disclosure, taken along the Y-axis direction (winding axis direction) to pass through the segment alignment 50.

Referring to FIG. 14, the electrode assembly 110 has substantially the same configuration as the electrode assembly 100 of FIG. 13, except that segments 61 forming the segment alignment 50 are also included in the second portion B3 and the height of the segment 61 of the second portion B3 is substantially identical to the height of the outermost segment 61 of the third portion B2.

In the electrode assembly 110, the height of the uncoated portion of the first portion B1 is relatively smaller than the height of the segments 61 included in the segment alignment 50. In addition, in the segment alignment 50, the bending length H of the innermost segment 61 is equal to or smaller than the radial length R of the winding turns formed by the first portion B1. Preferably, the winding turns formed by the first portion B1 may be the segment skip region (①) in FIG. 10) without segments. In a modification, the bending length H may be smaller than the sum of the radial length R of the winding turns formed by the first portion B1 and 10% of the radius of the core 112.

Therefore, even if the segments 61 included in the segment alignment 50 are bent, 90% or more of the diameter of the core 112 of the electrode assembly 110 is open to the outside. If the core 112 is not blocked, there is no difficulty in the electrolyte injection process, and the electrolyte injection efficiency is improved. In addition, the welding process between the current collecting plate of the negative electrode (or, positive electrode) and the battery housing (or, rivet terminal) may be easily performed by inserting a welding jig through the core 112.

In one modification, the structure in which the heights of the segments 61 included in the segment alignment 50 increase gradually or stepwise from the core toward the outer circumference may be extended to the winding turns formed by the second portion B3. In this case, the heights of the segments 61 included in the segment alignment 50 may increase gradually or stepwise from the boundary between the first portion B1 and the third portion B2 to the outermost surface of the electrode assembly 110.

The second uncoated portion 43*b* has the same structure as the first uncoated portion 43*a*. In one modification, the second uncoated portion 43*b* may have a conventional electrode structure or an electrode structure of other embodiments (modifications).

The end 111 of the segments 61 included in the segment alignment 50 may be bent in the radial direction of the electrode assembly 110, for example from the outer circumference toward the core. At this time, the uncoated portion of the first portion B1 is substantially not bent.

Since the segment alignment 50 include a plurality of segments 61 arranged in the radial direction, the bending stress is relieved, so it is possible to prevent tearing or abnormal deformation of the uncoated portions 43*a*, 43*b* near the bending point. In addition, when the width and/or height and/or separation pitch of the segments 61 is adjusted according to the numerical ranges of the above embodiment, the segments 61 are bent toward the core and overlapped in several layers enough to secure sufficient welding strength, and an empty hole (gap) is not formed in the bending surface region.

Figure 15:
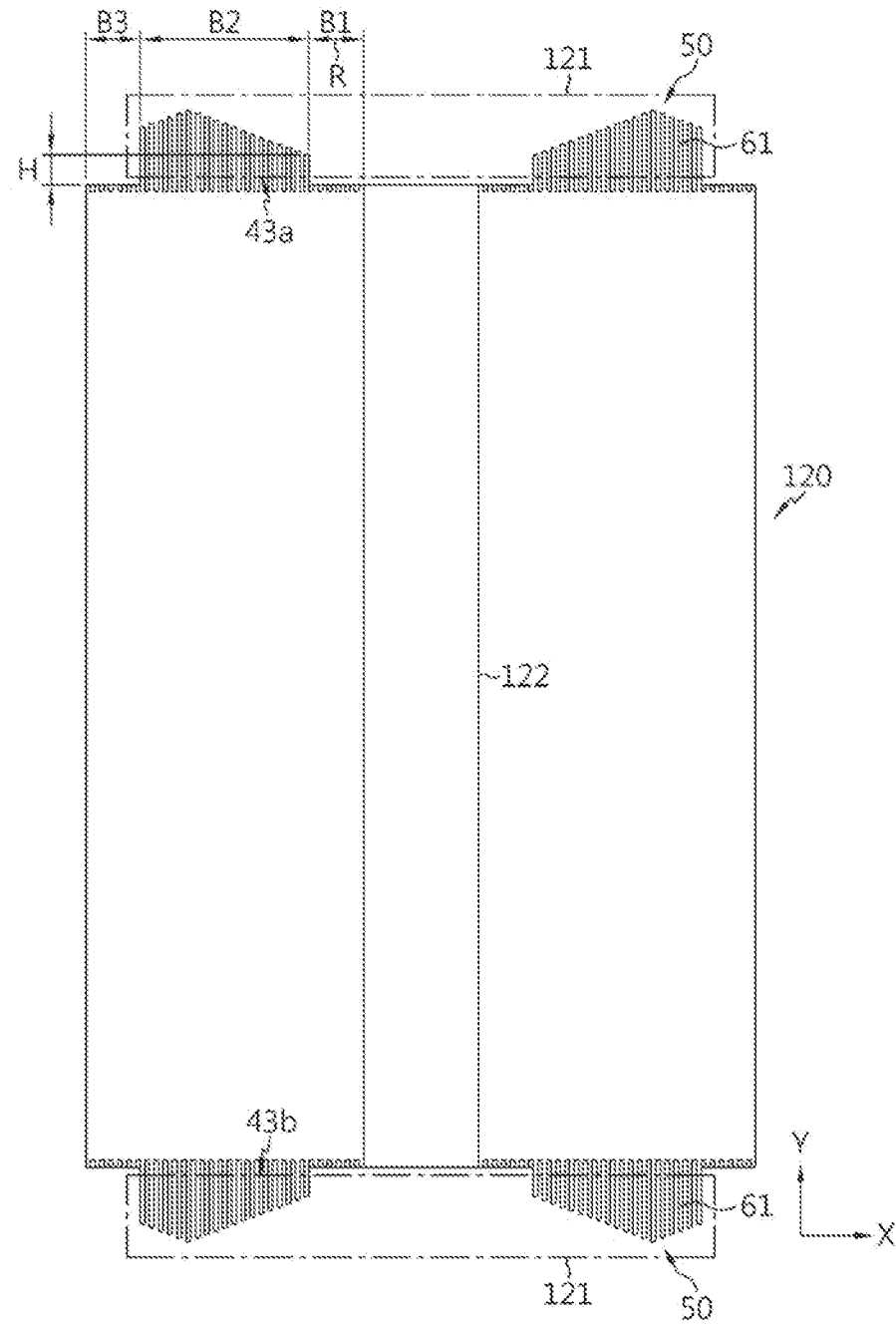
FIG. 15 is a cross-sectional view of a jelly-roll type electrode assembly in which an electrode according to still another embodiment of the present disclosure is applied to the first electrode (positive electrode) and the second electrode (negative electrode), taken along the Y-axis direction (winding axis direction) to pass through the segment alignment.

FIG. 15 is a cross-sectional view showing the electrode assembly 120 according to still another embodiment of the present disclosure, taken along the Y-axis direction (winding axis direction) to pass through the segment alignment 50.

Referring to FIG. 15, the electrode assembly 120 is substantially identical to the electrode assembly 100 of FIG. 13, except that the heights of the segments 61 included in the segment alignment 50 have a pattern of increasing gradually or stepwise and then decreasing. The radial region in which the heights of the segments 61 change may be regarded as the height variable region (② in FIG. 10) of the segments. Even in this case, the height variable region of the segments 61 may be designed so that the stack number uniform region in which the stack number of the segments 61 is 10 or more appears in the desirable numerical range described above in the bending surface region F formed by bending the segments 61.

In the electrode assembly 120, the height of the uncoated portion of the first portion B1 is relatively smaller than the height of the segments 61. In addition, the bending length H of the segment 61 closest to the core 122 is equal to or smaller than the radial length R of the winding turns formed by the first portion B1. The region corresponding to the winding turns formed by the first portion B1 corresponds to the segment skip region (① in FIG. 10) with no segment. In one modification, the bending length H may be less than the sum of the radial length R of the winding turns formed by the first portion B1 and 10% of the radius of the core 122.

Therefore, even if the segments 61 included in the segment alignment 50 is bent toward the core, 90% or more of the diameter of the core 122 of the electrode assembly 120 is open to the outside. If the core 122 is not blocked, there is no difficulty in the electrolyte injection process, and the electrolyte injection efficiency is improved. In addition, by inserting a welding jig through the core 122, the welding process may be easily performed between the current collecting plate of the negative electrode (or, positive electrode) and the battery housing (or, rivet terminal).

Also, the height of the uncoated portion of the second portion B3 is relatively smaller than the heights of the segments 61, and preferably, the segment 61 may not be formed in the second portion B3. Therefore, it is possible to prevent the phenomenon that the beading portion and the edge of the end of the electrode assembly 120 come into contact with each other to cause an internal short circuit while the beading portion of the battery housing is being pressed near the winding turns formed by the second portion B3. In one modification, the second portion B3 may include segments that forms the segment alignment 50, and the height of the segments of the second portion B3 may decrease gradually or stepwise toward the outer circumference.

The second uncoated portion 43*b* has the same structure as the first uncoated portion 43*a*. In one modification, the second uncoated portion 43*b* may have a conventional electrode structure or an electrode structure of other embodiments (modifications).

The ends 121 of the segments 61 included in the segment alignment 50 may be bent from the outer circumference of the electrode assembly 120 toward the core. At this time, the uncoated portions of the first portion B1 and the second portion B3 are substantially not bent.

Since the segment alignment 50 includes a plurality of segments 61 arranged in the radial direction, the bending stress is alleviated to prevent the uncoated portions 43*a*, 43*b* from being torn or abnormally deformed. In addition, when the width and/or height and/or separation pitch of the segments 61 is adjusted according to the numerical range of the above embodiment, the segments 61 are bent toward the core and overlapped in several layers enough to secure sufficient welding strength, and an empty hole (gap) is not formed in the bending surface region F.

Figure 16:
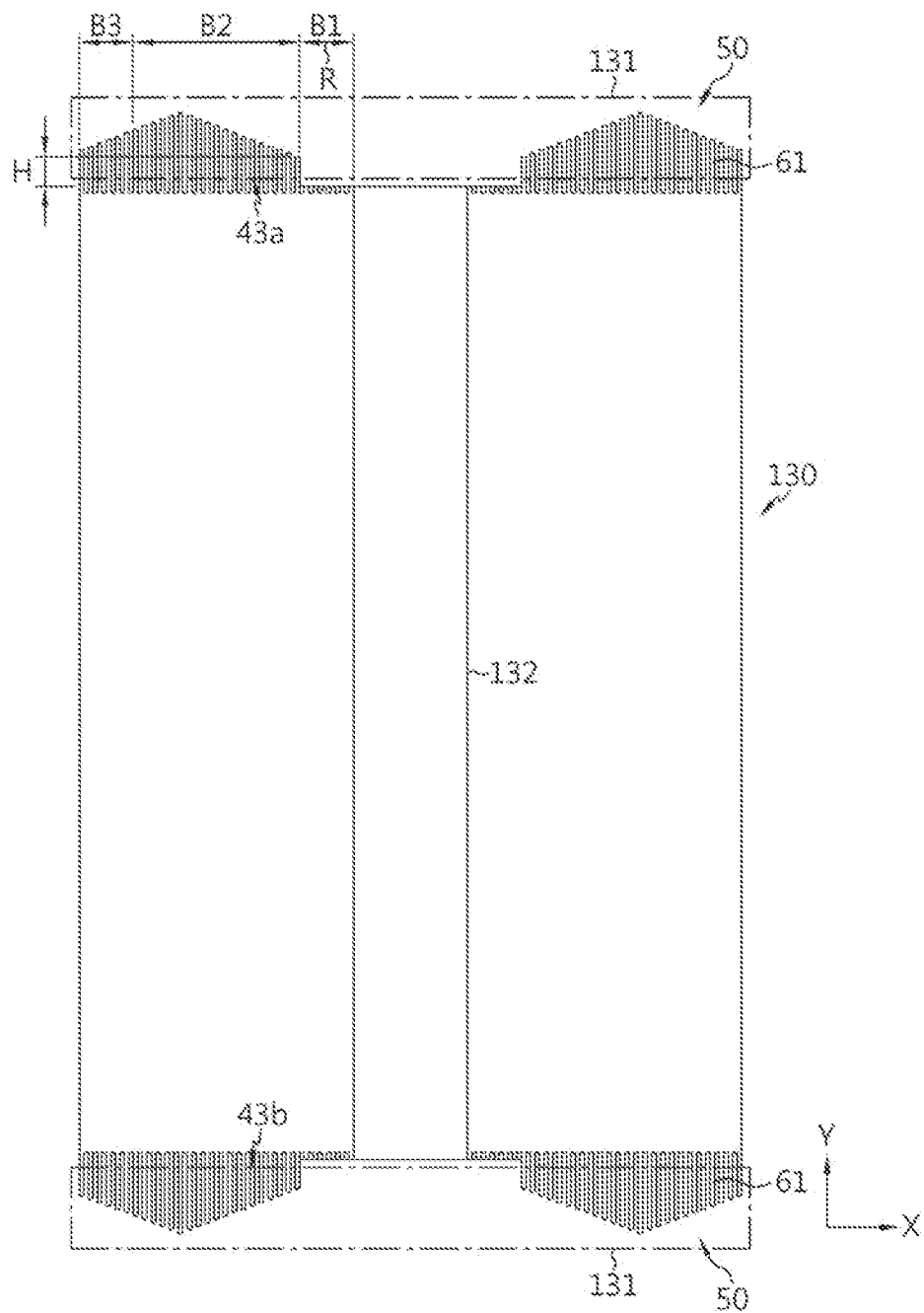
FIG. 16 is a cross-sectional view of a jelly-roll type electrode assembly in which an electrode according to still another embodiment of the present disclosure is applied to the first electrode (positive electrode) and the second electrode (negative electrode), taken along the Y-axis direction (winding axis direction) to pass through the segment alignment.

FIG. 16 is a cross-sectional view showing the electrode assembly 130 according to still another embodiment of the present disclosure, taken along the Y-axis direction (winding axis direction) to pass through the segment alignment 50.

Referring to FIG. 16, the electrode assembly 130 is substantially identical to the electrode assembly 120 of FIG. 15, except that the second portion B3 includes the segments 61 that form the segment alignment 50 and the height of the segments 61 has a pattern of decreasing gradually or stepwise from the boundary point of the second portion B3 and the third portion B2 toward the outermost surface of the electrode assembly 130.

In the electrode assembly 130, the height of the uncoated portion of the first portion B1 is relatively smaller than the height of the segments 61. In addition, the bending length H of the segment 61 closest to the core 132 is equal to or smaller than the radial length R of the winding turns formed by the first portion B1. The winding turns formed by the first portion B1 correspond to the segment skip region (① in FIG. 10) with no segment. In one modification, the bending length H may be less than the sum of the radial length R of the winding turns formed by the first portion B1 and 10% of the radius of the core 132.

Therefore, even if the segments 61 included in the segment alignment 50 are bent toward the core, 90% or more of the diameter of the core 132 of the electrode assembly 130 is open to the outside. If the core 132 is not blocked, there is no difficulty in the electrolyte injection process, and the electrolyte injection efficiency is improved. In addition, by inserting a welding jig through the core 132, the welding process may be easily performed between the current collecting plate of the negative electrode (or, positive electrode) and the battery housing (or, rivet terminal).

The second uncoated portion 43*b* has the same structure as the first uncoated portion 43*a*. In one modification, the second uncoated portion 43*b* may have a conventional electrode structure or the electrode structure of other embodiments (modifications).

The ends 131 of the segments 61 included in the segment alignment 50 may be bent from the outer circumference of the electrode assembly 130 toward the core. At this time, the uncoated portion of the first portion B1 is substantially not bent.

Since the segment alignment 50 includes a plurality of segments 61 arranged in the radial direction, the bending stress is alleviated to prevent the uncoated portions 43*a*, 43*b* near the bending point from being torn or abnormally deformed. In addition, when the width and/or height and/or separation pitch of the segments 61 is adjusted according to the numerical range of the above embodiment, the segments 61 are bent toward the core and overlapped in several layers enough to secure sufficient welding strength, and an empty hole (gap) is not formed in the bending surface region F.

Meanwhile, in the above embodiments (modifications), the ends of the segments 61 included in the segment alignment 50 may be bent from the core toward the outer circumference. In this case, it is preferable that the winding turns formed by the second portion B3 are designed as the segment skip region (① in FIG. 10) with no segment and not bent toward the outer circumference. In addition, the radial width of the winding turns formed by the second portion B3 may be equal to or greater than the bending length of the segment at the outermost side. In this case, when the outermost segment is bent toward the outer circumference, the end of the bent portion does not protrude toward the inner surface of the battery housing beyond the outer circumference of the electrode assembly. In addition, the structural change pattern of the segments included in the segment alignment 50 may be opposite to the above embodiments (modifications). For example, the heights of the segments may increase stepwise or gradually from the outer circumference toward the core. That is, by sequentially arranging the segment skip region (①) in FIG. 10), the height variable region (②) in FIG. 10), and the height uniform region (③) in FIG. 10) from the outer circumference of the electrode assembly toward the core, in the bending surface region F, the stack number uniform region in which the stack number of segments is 10 or more may appear in a desirable numerical range.

Various electrode assembly structures according to an embodiment of the present disclosure may be applied to a jelly-roll type cylindrical battery.

Preferably, the cylindrical battery may be, for example, a cylindrical battery whose form factor ratio (defined as a value obtained by dividing the diameter of the cylindrical battery by height, namely a ratio of diameter (Φ) to height (H)) is greater than about 0.4. Here, the form factor means a value indicating the diameter and height of a cylindrical battery.

Preferably, the cylindrical battery may have a diameter of 35 mm or more, preferably 40 mm to 50 mm. The cylindrical battery may have a height of 70 mm or more, preferably 75 mm to 90 mm. The cylindrical battery according to an embodiment of the present disclosure may be, for example, a 46110 battery, a 4875 battery, a 48110 battery, a 4880 battery, or a 4680 battery. In the numerical value representing the form factor, first two numbers indicate the diameter of the battery, and the remaining numbers indicate the height of the battery.

When an electrode assembly having a tab-less structure is applied to a cylindrical battery having a form factor ratio of more than 0.4, the stress applied in the radial direction when the uncoated portion is bent is large, so that the uncoated portion may be easily torn. In addition, when welding the current collecting plate to the bending surface region of the uncoated portion, it is necessary to sufficiently increase the number of stacked layers of the uncoated portion in the bending surface region in order to sufficiently secure the welding strength and lower the resistance. This requirement may be achieved by the electrode and the electrode assembly according to the embodiments (modifications) of the present disclosure.

A battery according to an embodiment of the present disclosure may be an approximately cylindrical battery, whose diameter is approximately 46 mm, height is approximately 110 mm, and form factor ratio is 0.418.

A battery according to another embodiment may be an approximately cylindrical battery, whose diameter is about 48 mm, height is about 75 mm, and form factor ratio is 0.640.

A battery according to still another embodiment may be an approximately cylindrical battery, whose diameter is approximately 48 mm, height is approximately 110 mm, and form factor ratio is 0.436.

A battery according to still another embodiment may be an approximately cylindrical battery, whose diameter is approximately 48 mm, height is approximately 80 mm, and form factor ratio is 0.600.

A battery according to still another embodiment may be an approximately cylindrical battery, whose diameter is approximately 46 mm, height is approximately 80 mm, and form factor ratio is 0.575.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

Hereinafter, the cylindrical battery according to an embodiment of the present disclosure will be described in detail.

Figure 17:
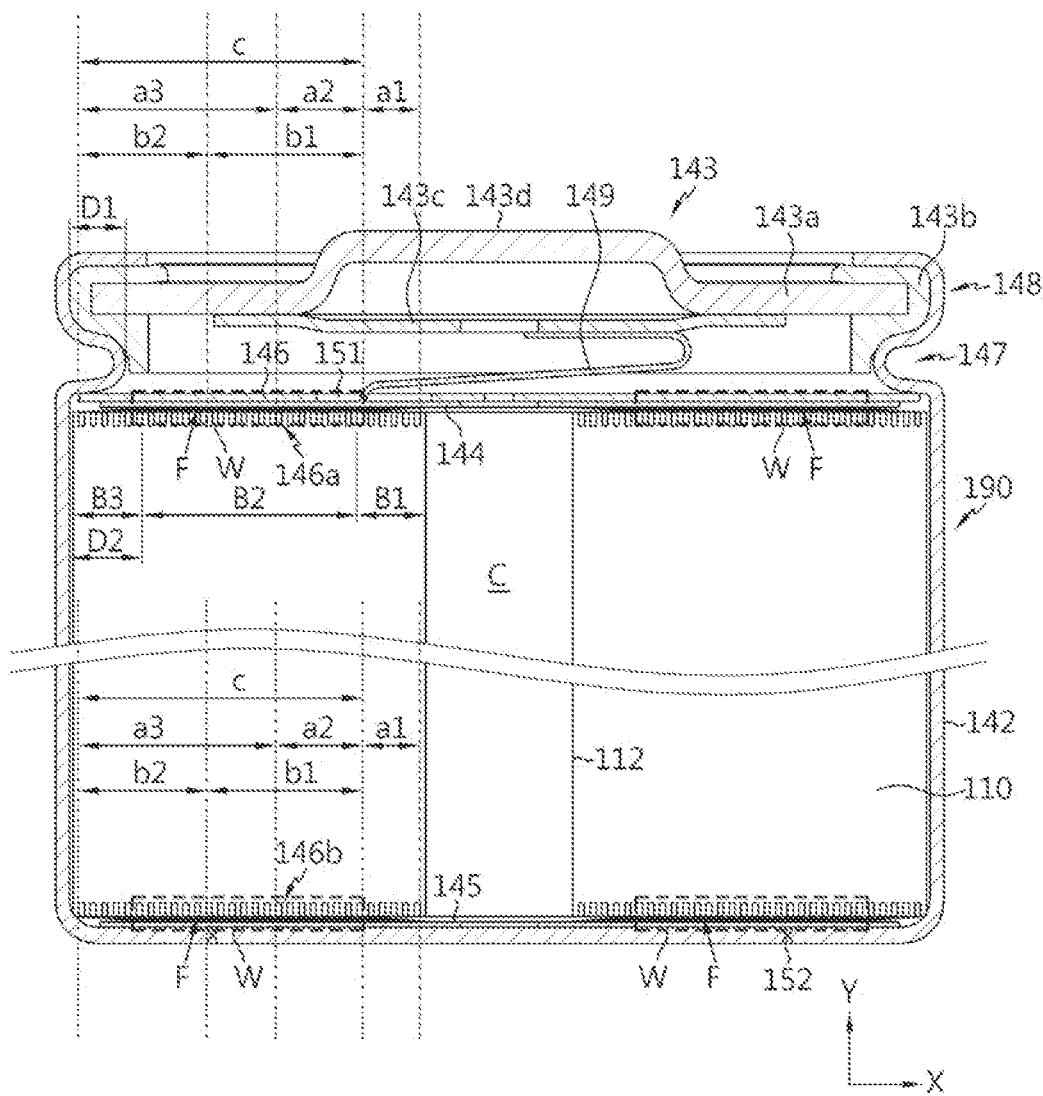
FIG. 17 is a sectional view showing a cylindrical battery according to an embodiment of the present disclosure, taken along the Y-axis direction to pass through the bending surface region of the segments included in the segment alignment.

FIG. 17 is a cross-sectional view showing a cylindrical battery 190 according to an embodiment of the present disclosure, taken along the Y-axis direction to pass through the bending surface region F (FIG. 6*a*) of the segments included in the segment alignment 50 (FIG. 6*a*).

Referring to FIG. 17, the cylindrical battery 190 according to an embodiment of the present disclosure includes an electrode assembly 110 having a first electrode, a separator and a second electrode, a battery housing 142 for accommodating the electrode assembly 110, and a sealing body 143 for sealing an open end of the battery housing 142.

The battery housing 142 is a cylindrical container with an opening at the top. The battery housing 142 is made of a conductive metal material such as aluminum, steel or stainless steel. A nickel coating layer may be formed on the surface of the battery housing 142. The battery housing 142 accommodates the electrode assembly 110 in the inner space through the top opening and also accommodates the electrolyte.

The electrolyte may be a salt having a structure like $A^+B^-$. Here, $A^+$ includes an alkali metal cation such as $Li^+$, $Na^+$, or $K^+$, or a combination thereof, and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

Figure 2:
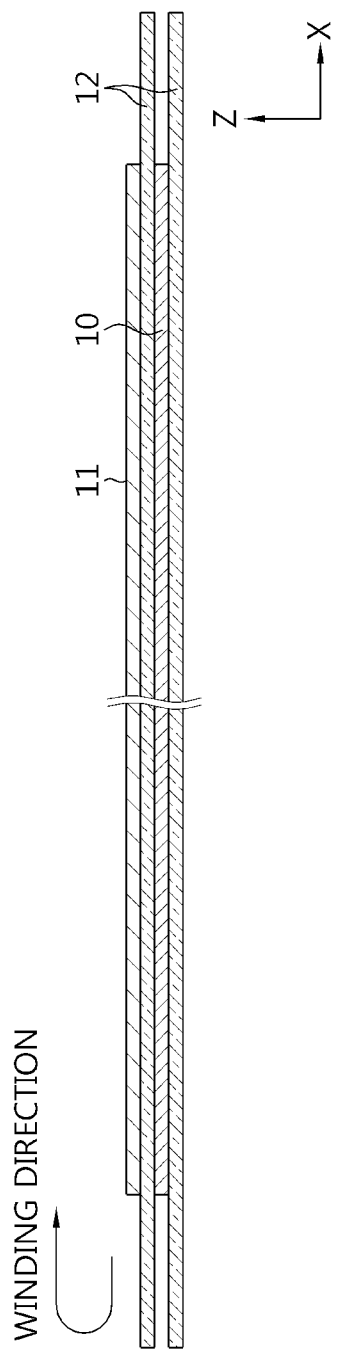
FIG. 2 is a diagram showing an electrode winding process of the conventional tab-less cylindrical battery.

The electrode assembly 110 may have a jelly-roll shape. The electrode assembly 110 may be manufactured by winding a laminate formed by sequentially laminating a lower separator, a first electrode, an upper separator, and a second electrode at least once, based on the winding center C, as shown in FIG. 2.

The first electrode and the second electrode have different polarities. That is, if one has positive polarity, the other has negative polarity. At least one of the first electrode and the second electrode may have an electrode structure according to the above embodiments (modifications). In addition, the other of the first electrode and the second electrode may have a conventional electrode structure or an electrode structure according to embodiments (modifications). The electrode pair included in the electrode assembly 110 is not limited to one electrode pair, two or more electrode pairs may be included.

In the upper and lower portions of the electrode assembly 110, as shown in FIGS. 6a and 7a, the segment alignment 50 (see FIGS. 6a and 7a) formed by the segments included in the first uncoated portion 146a of the first electrode and the second uncoated portion 146b of the second electrode is provided, respectively.

The segments included in the segment alignment 50 are bent in the radial direction of the electrode assembly 110, for example from the outer circumference toward the core, to form a bending surface region F.

The first portion B1 has a lower height than the other portion and corresponds to segment skip region a1 with no segment, so it is not bent toward the core.

Preferably, the bending surface region F may include the segment skip region a1, the height variable region a2 of the segments, and the height uniform region a3 of the segments from the core toward the outer circumference.

As shown in FIGS. 11a, 11b, and 11c, the bending surface region F includes a stack number uniform region b1 having a stack number of 10 or more adjacent to the segment skip region a1.

The bending surface region F may also include a stack number decrease region b2 adjacent to the outer circumference of the electrode assembly 110, where the stack number of segments decreases toward the outer circumference. Preferably, the stack number uniform region b1 may be set as a welding target area.

In the bending surface region F, the preferred numerical ranges of the ratio (a2/c) of the height variable region a2 of the segments to the radial region c containing segments, the ratio (b1/c) of the stack number uniform region b1 of the segments, and the ratio of the area of the stack number uniform region b1 to the area of the bending surface region F are already described above, and thus will not be described again.

The first current collecting plate 144 may be laser-welded to the bending surface region F of the first uncoated portion 146a, and the second current collecting plate 145 may be laser-welded to the bending surface region F of the second uncoated portion 146b. The welding method may be replaced by ultrasonic welding, resistance welding, spot welding, and the like.

Preferably, an area of 50% or more of the welding regions W of the first current collecting plate 144 and the second current collecting plate 145 may overlap with the stack number uniform region b1 of the bending surface region F. Optionally, the remaining area of the welding region W may overlap with the stack number decrease region b2 of bending surface region F. In terms of high welding strength, low resistance of the welding interface, and prevention of damage to the separator or the active material layer, it is more preferable that the entire welding region W overlaps the stack number uniform region b1.

Preferably, in the stack number uniform region b1 and, optionally, the stack number decrease region b2 overlapping with the welding region W, the stack number of segments may be 10 to 35.

Optionally, when the segment stack number of the stack number decrease region b2 overlapping with the welding region W is less than 10, the laser output for the stack number decrease region b2 may be lowered than the laser output for the stack number uniform region b1. That is, when the welding region W overlaps with the stack number uniform region b1 and the stack number decrease region b2 at the same time, the laser output may be varied according to the stack number of segments. In this case, the welding strength of the stack number uniform region b1 may be greater than the welding strength of the stack number decrease region b2.

In the bending surface region F formed on the upper portion and the lower portion of the electrode assembly 110, the radial length of the segment skip region a1 and/or the segment height variable region a2 and/or the segment height uniform region a3 may be the same or different.

In addition, the bending surface region F formed on the upper and lower portions of the electrode assembly 110 may form a plane-symmetric structure. Therefore, when the bending surface region F in the upper portion is projected toward the bending surface region F in the lower portion, they may substantially overlap each other.

In the electrode assembly 110, the height of the uncoated portion of the first portion B1 is relatively smaller than the height of the other portions. In addition, as shown in FIG. 14, the bending length H of the segment closest to the core is smaller than the sum of the radial length R of the winding turns formed by the first portion B1 and 10% of the radius of the core 112.

Therefore, even if the segments included in the segment alignment 50 are bent toward the core, 90% or more of the diameter of the core 112 of the electrode assembly 110 may be open to the outside. If the core 112 is not blocked, there is no difficulty in the electrolyte injection process, and the electrolyte injection efficiency is improved. In addition, the welding process between the second current collecting plate 145 and the battery housing 142 may be easily performed by inserting a welding jig through the core 112.

If the width and/or height and/or separation pitch of the segments is adjusted to satisfy the numerical range of the above embodiment, when the segments are bent, the segments are overlapped in several layers enough to secure sufficient welding strength, and an empty hole (gap) is not formed in the bending surface region F.

Preferably, the first current collecting plate 144 and the second current collecting plate 145 may have outer diameters covering the end of the segment 61 (FIG. 12) bent at the last winding turn of the first electrode and the second electrode. In this case, welding is possible in a state while the segments forming the bending surface region F are uniformly pressed by the current collecting plate, and the tightly stacked state of the segments may be well maintained even after welding. The tightly stacked state means a state where there is substantially no gap between the segments as shown in FIG. 10. The tightly stacked state contributes to lowering the resistance of the cylindrical battery 190 to a level suitable for rapid charging (for example, 4 milliohms) or less.

The sealing body 143 may include a cap plate 143a, a first gasket 143b for providing airtightness between the cap plate 143a and the battery housing 142 and having insulation, and a connection plate 143c electrically and mechanically coupled to the cap plate 143a.

The cap plate 143a is a component made of a conductive metal material, and covers the top opening of the battery housing 142. The cap plate 143a is electrically connected to the bending surface region F of the first electrode, and is electrically insulated from the battery housing 142 by means of the first gasket 143b. Accordingly, the cap plate 143a may function as the first electrode (for example, positive electrode) of the cylindrical battery 190.

The cap plate 143a is placed on the beading portion 147 formed on the battery housing 142, and is fixed by a crimping portion 148. Between the cap plate 143a and the crimping portion 148, the first gasket 143b may be interposed to secure the airtightness of the battery housing 142 and the electrical insulation between the battery housing 142 and the cap plate 143a. The cap plate 143a may have a protrusion 143d protruding upward from the center thereof.

The battery housing 142 is electrically connected to the bending surface region F of the second electrode. Therefore, the battery housing 142 has the same polarity as the second electrode. If the second electrode has negative polarity, the battery housing 142 also has negative polarity.

The battery housing 142 includes the beading portion 147 and the crimping portion 148 at the top thereof. The beading portion 147 is formed by press-fitting the periphery of the outer circumferential surface of the battery housing 142. The beading portion 147 prevents the electrode assembly 110 accommodated inside the battery housing 142 from escaping through the top opening of the battery housing 142, and may function as a support portion on which the sealing body 143 is placed.

The second portion B3 of the first electrode may not include a segment but may be notched in the same structure as the first portion B1. Preferably, the inner circumference of the beading portion 147 may be spaced apart from the winding turns formed by the second portion B3 of the first electrode by a predetermined interval. It is because the second portion B3 is notched like the first portion B1. More specifically, the lower end of the inner circumference of the beading portion 147 is separated from the winding turns formed by the second portion B3 of the first electrode by a predetermined interval. In addition, since the uncoated portion of the second portion B3 has a low height, the winding turns of the second portion B3 are not substantially affected even when the battery housing 142 is press-fitted at the outside to form the beading portion 147. Therefore, the winding turns of the second portion B3 are not pressed by other components such as the beading portion 147, and thus partial shape deformation of the electrode assembly 110 is prevented, thereby preventing a short circuit inside the cylindrical battery 190.

Preferably, when the press-fit depth of the beading portion 147 is defined as D1 and the radial length from the inner circumference of the battery housing 142 to the boundary point between the second portion B3 and the third portion B2 is defined as D2, the relational expression $D1 \leq D2$ may be satisfied. In this case, when press-fitting the battery housing 142 to form the beading portion 147, it is possible to substantially prevent the winding turns formed by the second portion B3 from being damaged.

The crimping portion 148 is formed on the beading portion 147. The crimping portion 148 has an extended and bent shape to cover the outer circumference of the cap plate 143a disposed on the beading portion 147 and a part of the upper surface of the cap plate 143a.

The cylindrical battery 190 may further include a first current collecting plate 144 and/or a second current collecting plate 145 and/or an insulator 146.

The first current collecting plate 144 is coupled to the upper portion of the electrode assembly 110. The first current collecting plate 144 is made of a conductive metal material such as aluminum, copper, steel, nickel and so on, and is electrically connected to the bending surface region F of the first electrode. The electric connection may be made by welding. A lead 149 may be connected to the first current collecting plate 144. The lead 149 may extend upward above the electrode assembly 110 and be coupled to the connection plate 143c or directly coupled to the lower surface of the cap plate 143a. The lead 149 may be connected to other components by welding.

Preferably, the first current collecting plate 144 may be integrally formed with the lead 149. In this case, the lead 149 may have an elongated plate shape extending outward from near the center of the first current collecting plate 144.

The first current collecting plate 144 and the bending surface region F of the first electrode may be coupled by, for example, laser welding. Laser welding may be performed by partially melting a base material of the current collecting plate. In one modification, the first current collecting plate 144 and the bending surface region F may be welded with a solder interposed therebetween. In this case, the solder may have a lower melting point compared to the first current collecting plate 144 and the first uncoated portion 146a. The laser welding may be replaced with resistance welding, ultrasonic welding, spot welding, or the like.

The second current collecting plate 145 may be coupled to the lower surface of the electrode assembly 110. One side of the second current collecting plate 145 may be coupled by welding to the bending surface region F of the second electrode, and the other side may be coupled to the inner bottom surface of the battery housing 142 by welding. The coupling structure between the second current collecting plate 145 and the bending surface region F of the second electrode may be substantially the same as the coupling structure between the first current collecting plate 144 and the bending surface region F of the first electrode.

The insulator 146 may cover the first current collecting plate 144. The insulator 146 may cover the first current collecting plate 144 at the upper surface of the first current collecting plate 144, thereby preventing direct contact between the first current collecting plate 144 and the inner circumference of the battery housing 142.

The insulator 146 has a lead hole 151 so that the lead 149 extending upward from the first current collecting plate 144 may be withdrawn therethrough. The lead 149 is drawn upward through the lead hole 151 and coupled to the lower surface of the connection plate 143c or the lower surface of the cap plate 143a.

A peripheral region of the edge of the insulator 146 may be interposed between the first current collecting plate 144 and the beading portion 147 to fix the coupled body of the electrode assembly 110 and the first current collecting plate 144. Accordingly, the movement of the coupled body of the electrode assembly 110 and the first current collecting plate 144 may be restricted in the height direction of the battery 140, thereby improving the assembly stability of the battery 140.

The insulator 146 may be made of an insulating polymer resin. In one example, the insulator 146 may be made of polyethylene, polypropylene, polyimide, or polybutylene terephthalate.

The battery housing 142 may further include a venting portion 152 formed at a lower surface thereof. The venting portion 152 corresponds to a region having a smaller thickness compared to the peripheral region of the lower surface of the battery housing 142. The venting portion 152 is structurally weak compared to the surrounding area. Accordingly, when an abnormality occurs in the cylindrical battery 190 and the internal pressure increases to a predetermined level or more, the venting portion 152 may be ruptured so that the gas generated inside the battery housing 142 is discharged to the outside. The internal pressure at which the venting portion 152 is ruptured may be approximately 15 kgf/cm$^2$ to 35 kgf/cm$^2$.

The venting portion 152 may be formed continuously or discontinuously while drawing a circle at the lower surface of the battery housing 142. In one modification, the venting portion 152 may be formed in a straight pattern or other patterns.

Figure 18:
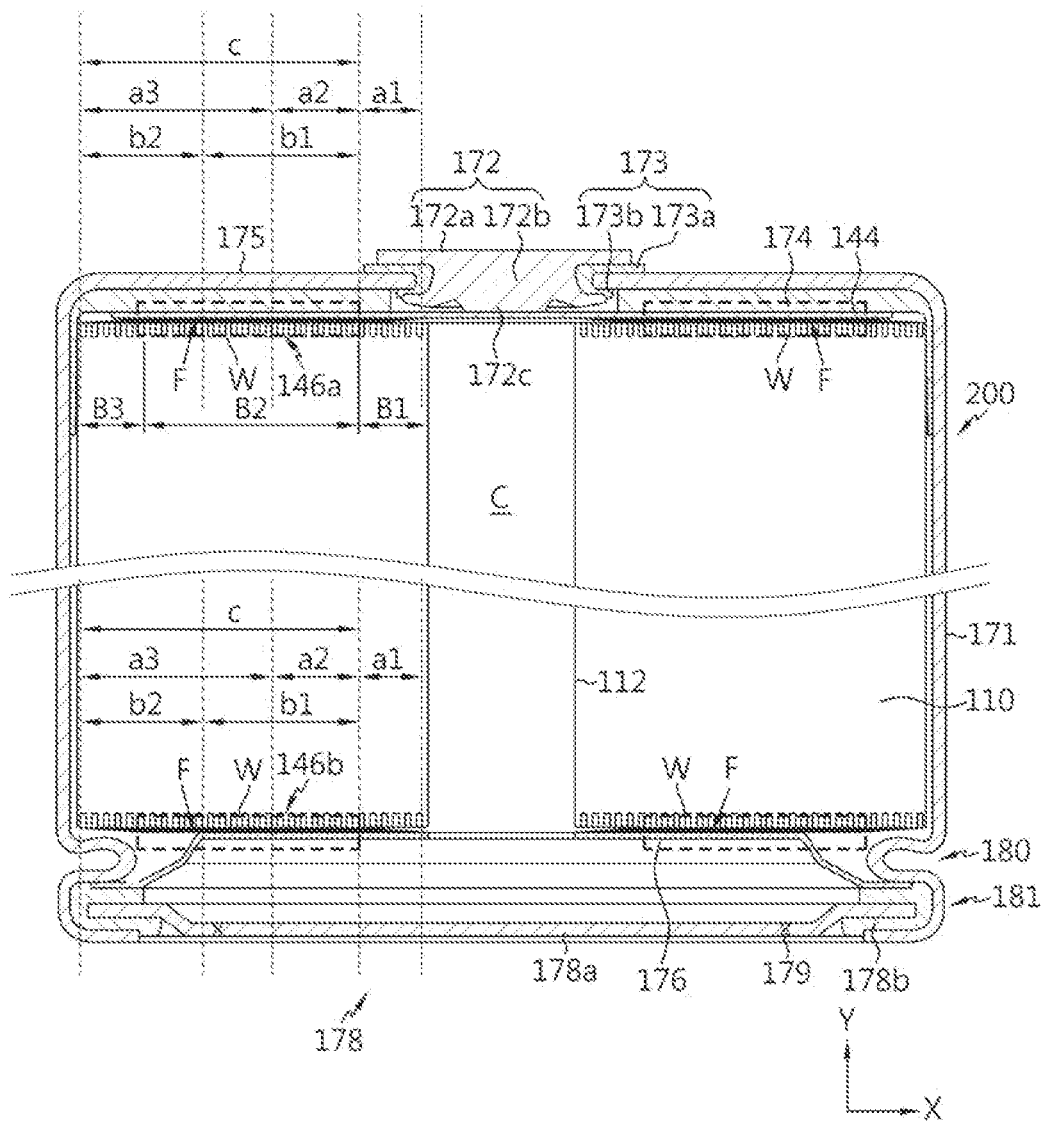
FIG. 18 is a sectional view showing a cylindrical battery according to another embodiment of the present disclosure, taken along the Y-axis direction to pass through the bending surface region of the segments included in the segment alignment pass through the bending surface region.

FIG. 18 is a cross-sectional view showing a cylindrical battery 200 according to an embodiment of the present disclosure, taken along the Y-axis direction to pass through the bending surface region F (FIG. 6a) of the segments included in the segment alignment 50 (FIG. 6a).

Referring to FIG. 18, the structure of the electrode assembly of the cylindrical battery 200 is substantially the same as that of the cylindrical battery 190 of in FIG. 17, and the other structure except for the electrode assembly is changed.

Specifically, the cylindrical battery 200 includes a battery housing 171 through which a rivet terminal 172 is installed. The rivet terminal 172 is installed through a perforation hole formed in the closed surface (the upper surface in the drawing) of the battery housing 171. The rivet terminal 172 is riveted to the perforation hole of the battery housing 171 in a state where a second gasket 173 made of an insulating material is interposed therebetween. The rivet terminal 172 is exposed to the outside in a direction opposite to the direction of gravity.

The rivet terminal 172 includes a terminal exposing portion 172a and a terminal insert portion 172b. The terminal exposing portion 172a is exposed to the outside of the closed surface of the battery housing 171. The terminal exposing portion 172a may be located approximately at a central portion of the closed surface of the battery housing 171. The maximum diameter of the terminal exposing portion 172a may be larger than the maximum diameter of the perforation hole formed in the battery housing 171. The terminal insert portion 172b may be electrically connected to the uncoated portion 146a of the first electrode through approximately the central portion of the closed surface of the battery housing 171. The lower edge of the terminal insert portion 172b may be riveted onto the inner surface of the battery housing 171. That is, the lower edge of the terminal insert portion 172b may have a shape curved toward the inner surface of the battery housing 171. A flat portion 172c is included at the inner side of the lower edge of the terminal insert portion 172b. The maximum diameter of the lower portion of the riveted terminal insert portion 172b may be larger than the maximum diameter of the perforation hole of the battery housing 171.

The flat portion 172c of the terminal insert portion 172b may be welded to the center portion of the first current collecting plate 144 connected to the bending surface region F of the first electrode. The laser welding may be adopted as a preferable welding method, but the laser welding may be replaced with other welding methods such as ultrasonic welding.

An insulator 174 made of an insulating material may be interposed between the first current collecting plate 144 and the inner surface of the battery housing 171. The insulator 174 covers the upper portion of the first current collecting plate 144 and the top edge of the electrode assembly 110. Accordingly, it is possible to prevent the second portion B3 of the electrode assembly 110 from contacting the inner surface of the battery housing 171 having a different polarity to cause a short circuit.

The thickness of the insulator 174 corresponds to or is slightly greater than the distance between the upper surface of the first current collecting plate 144 and the inner surface of the closed portion of the battery housing 171. Accordingly, the insulator 174 may contact the upper surface of the first current collecting plate 144 and the inner surface of the closed portion of the battery housing 171.

The terminal insert portion 172b of the rivet terminal 172 may be welded to the first current collecting plate 144 through the perforation hole of the insulator 174. A diameter of the perforation hole formed in the insulator 174 may be larger than a diameter of the riveting portion at the lower end of the terminal insert portion 172b. Preferably, the perforation hole may expose the lower portion of the terminal insert portion 172b and the second gasket 173.

The second gasket 173 is interposed between the battery housing 171 and the rivet terminal 172 to prevent the battery housing 171 and the rivet terminal 172 having opposite polarities from electrically contacting each other. Accordingly, the upper surface of the battery housing 171 having an approximately flat shape may function as the second electrode (for example, negative electrode) of the cylindrical battery 200.

The second gasket 173 includes a gasket exposing portion 173a and a gasket insert portion 173b. The gasket exposing portion 173a is interposed between the terminal exposing portion 172a of the rivet terminal 172 and the battery housing 171. The gasket insert portion 173b is interposed between the terminal insert portion 172b of the rivet terminal 172 and the battery housing 171. The gasket insert portion 173b may be deformed together when the terminal insert portion 172b is riveted, so as to be in close contact with the inner surface of the battery housing 171. The second gasket 173 may be made of, for example, a polymer resin having insulation property.

The gasket exposing portion 173a of the second gasket 173 may have an extended shape to cover the outer circumference of the terminal exposing portion 172a of the rivet terminal 172. When the second gasket 173 covers the outer circumference of the rivet terminal 172, it is possible to prevent a short circuit from occurring while an electrical connection part such as a bus bar is coupled to the upper surface of the battery housing 171 and/or the rivet terminal 172. Although not shown in the drawings, the gasket exposing portion 173a may have an extended shape to cover not only the outer circumference surface of the terminal exposing portion 172a but also a part of the upper surface thereof.

When the second gasket 173 is made of a polymer resin, the second gasket 173 may be coupled to the battery housing 171 and the rivet terminal 172 by thermal fusion. In this case, airtightness at the coupling interface between the second gasket 173 and the rivet terminal 172 and at the coupling interface between the second gasket 173 and the battery housing 171 may be enhanced. Meanwhile, when the gasket exposing portion 173a of the second gasket 173 has a shape extending to the upper surface of the terminal exposing portion 172a, the rivet terminal 172 may be integrally coupled with the second gasket 173 by insert injection molding.

In the upper surface of the battery housing 171, a remaining area 175 other than the area occupied by the rivet terminal 172 and the second gasket 173 corresponds to the second electrode terminal having a polarity opposite to that of the rivet terminal 172.

The second current collecting plate 176 is coupled to the lower portion of the electrode assembly 141. The second current collecting plate 176 is made of a conductive metal material such as aluminum, steel, copper or nickel, and is electrically connected to the bending surface region F of the second electrode.

Preferably, the second current collecting plate 176 is electrically connected to the battery housing 171. To this end, at least a portion of the edge of the second current collecting plate 176 may be interposed and fixed between the inner surface of the battery housing 171 and a first gasket 178b. In one example, at least a portion of the edge of the second current collecting plate 176 may be fixed to the beading portion 180 by welding in a state of being supported on the lower surface of the beading portion 180 formed at the bottom of the battery housing 171. In one modification, at least a portion of the edge of the second current collecting plate 176 may be directly welded to the inner wall surface of the battery housing 171.

Preferably, the second current collecting plate 176 and the bending surface region F of the second electrode may be coupled by welding, for example laser welding. In addition, the welded portion of the second current collecting plate 176 and the bending surface region F may be spaced apart by a predetermined interval toward the core C based on the inner circumference of the beading portion 180.

A sealing body 178 for sealing the lower open end of the battery housing 171 includes a cap plate 178a and a first gasket 178b. The first gasket 178b electrically separates the cap plate 178a and the battery housing 171. A crimping portion 181 fixes the edge of the cap plate 178a and the first gasket 178b together. The cap plate 178a has a venting portion 179. The configuration of the venting portion 179 is substantially the same as the above embodiment (modification). The lower surface of the cap plate 178a may be located above the lower end of the crimping portion 181. In this case, a space is formed under the cap plate 178a to smoothly perform venting. In particular, it is useful when the cylindrical battery 200 is installed so that the crimping portion 181 faces the direction of gravity.

Preferably, the cap plate 178a is made of a conductive metal material. However, since the first gasket 178b is interposed between the cap plate 178a and the battery housing 171, the cap plate 178a does not have electrical polarity. The sealing body 178 seals the open end of the lower portion of the battery housing 171 and mainly functions to discharge gas when the internal pressure of the battery 200 increases over a critical value. A threshold value of the pressure is 15 kgf/cm² to 35 kgf/cm².

Preferably, the rivet terminal 172 electrically connected to the bending surface region F of the first electrode is used as the first electrode terminal. In addition, in the upper surface of the battery housing 171 electrically connected to the bending surface region F of the second electrode through the second current collecting plate 176, a part 175 except for the rivet terminal 172 is used as the second electrode terminal having a different polarity from the first electrode terminal. If two electrode terminals are located at the upper portion of the cylindrical battery 200 as above, it is possible to arrange electrical connection components such as bus bars at only one side of the cylindrical battery 200. This may bring about simplification of the battery pack structure and improvement of energy density. In addition, since the part 175 used as the second electrode terminal has an approximately flat shape, a sufficient joining area may be secured for joining electrical connection components such as bus bars. Accordingly, the cylindrical battery 200 may reduce the resistance at the joining portion of the electrical connection components to a desirable level.

Figure 19:
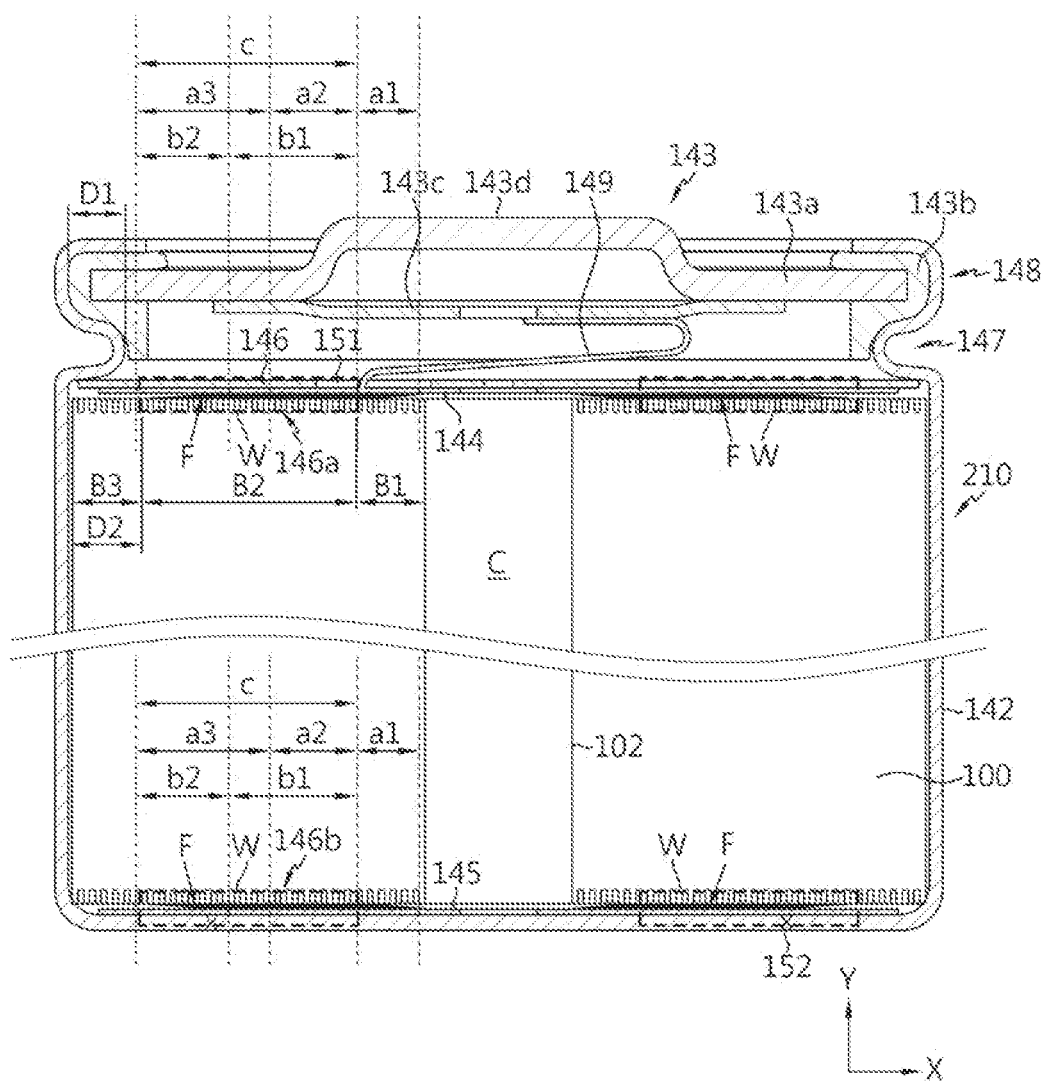
FIG. 19 is a sectional view showing a cylindrical battery according to still another embodiment of the present disclosure, taken along the Y-axis direction to pass through the bending surface region of the segments included in the segment alignment.

FIG. 19 is a cross-sectional view showing a cylindrical battery 210 according to still another embodiment of the present disclosure, taken along the Y-axis direction to pass through the bending surface region F (FIG. 6a) of the segments included in the segment alignment 50 (FIG. 6a).

Referring to FIG. 19, the cylindrical battery 210 includes the electrode assembly 100 shown in FIG. 13, and other configurations except for the electrode assembly 100 are substantially the same as those of the cylindrical battery 190 shown in FIG. 17. Accordingly, the configuration described with reference to FIGS. 13 and 17 may be substantially equally applied to this embodiment.

Preferably, the first and second uncoated portions 146a, 146b of the electrode assembly 100 include a plurality of segment groups 61g. The plurality of segment groups 61g forms a segment alignment 50 (FIG. 6a) at the upper and lower portions of the electrode assembly 100. The segments 61 included in the segment alignment 50 are bent in the radial direction of the electrode assembly 100, for example from the outer circumference toward the core. At this time, since the first portion B1 of the first uncoated portion 146a and the uncoated portions of the second portion B3 have a lower height than other portions and do not include segments, so they are not substantially bent. This is the same in the case of the second uncoated portion 146b.

Also in this embodiment, the bending surface region F formed by the segments 61 included in the segment alignment 50 may include a segment skip region a1, a segment height variable region a2, and a segment height uniform region a3 from the core toward the outer circumference. However, since the uncoated portion of the second portion B3 is not bent, the radial length of the bending surface region F may be shorter than in the case of the above embodiment.

As shown in FIGS. 11a, 11b, and 11c, the bending surface region F includes a stack number uniform region b1 having a stack number of 10 or more adjacent to the segment skip region a1.

The bending surface region F may also include a stack number decrease region b2 adjacent to the winding turns of the second portion B3 of the electrode assembly 100, where the stack number of segments decreases toward the outer circumference. Preferably, the stack number uniform region b1 may be set as a welding target area.

In the bending surface region F, the preferred numerical ranges of the ratio (a2/c) of the height variable region a2 of the segments to the radial region c containing segments, the ratio (b1/c) of the stack number uniform region b1 of the segments, and the ratio of the area of the stack number uniform region b1 to the area of the bending surface region F are already described above, and thus will not be described again.

The first current collecting plate 144 may be welded to the bending surface region F of the first uncoated portion 146a, and the second current collecting plate 145 may be welded to the bending surface region F of the second uncoated portion 146b.

The overlapping relationship between the stack number uniform region b1 and the stack number decrease region b2 and the welding region W, the outer diameters of the first current collecting plate 144 and the second current collecting plate 145, and the configuration in which the first portion B1 does not block the core are substantially the same as described above.

Meanwhile, the second portion B3 does not include segments, and the height of the uncoated portion is lower than that of the segments of the third portion B2. Therefore, when the segments of the third portion B2 are bent, the second portion B3 is not substantially bent. In addition, since the winding turns of the second portion B3 are sufficiently spaced from the beading portion 147, the problem of damage to the winding turns of the second portion B3 may be solved while the beading portion 147 is press-fitted.

Figure 20:
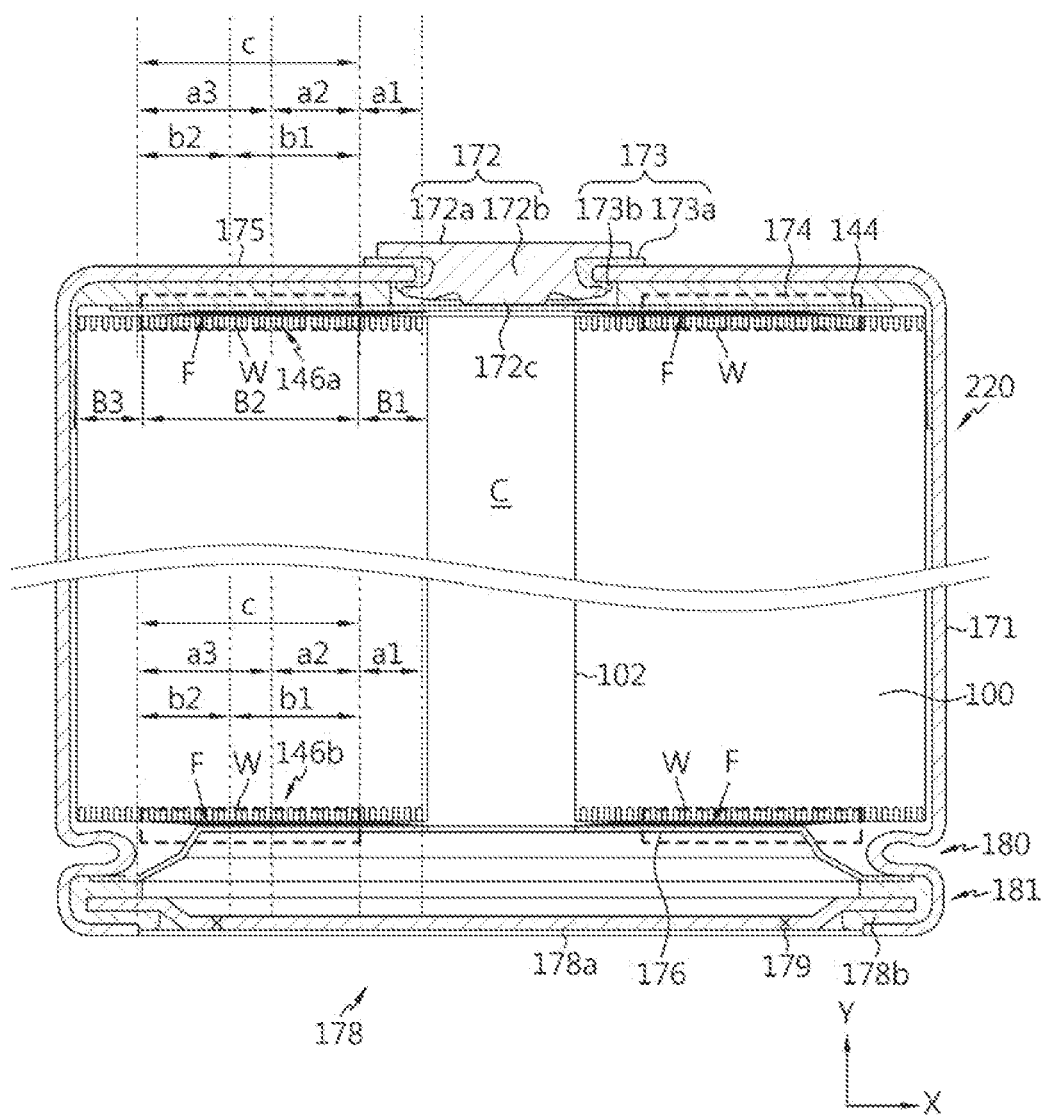
FIG. 20 is a sectional view showing a cylindrical battery according to still another embodiment of the present disclosure, taken along the Y-axis direction to pass through the bending surface region of the segments included in the segment alignment.

FIG. 20 is a cross-sectional view showing a cylindrical battery 220 according to still another embodiment of the present disclosure, taken along the Y-axis direction to pass through the bending surface region F (FIG. 6a) of the segments included in the segment alignment 50 (FIG. 6a).

Referring to FIG. 20, the cylindrical battery 220 includes the electrode assembly 100 shown in FIG. 13, and other configurations except for the electrode assembly 100 are substantially the same as those of the cylindrical battery 200 shown in FIG. 18. Accordingly, the configuration described with reference to FIGS. 13 and 18 may be substantially equally applied to this embodiment.

Preferably, the first and second uncoated portions 146a, 146b of the electrode assembly 100 includes a plurality of segment groups 61g, and the plurality of segment groups 61g are arranged in the radial direction to form a segment alignment 50 (FIG. 6a). Also, the segments included in the segment alignment 50 are bent from the outer circumference toward the core of the electrode assembly 100 to form a bending surface region F. At this time, since in the first portion B1 of the first uncoated portion 146a and the second portion B3, the uncoated portion has a lower height than the other portions and does not include segments, it is not substantially bent toward the core. This is also identical in the case of the second uncoated portion 146b.

Accordingly, also in this embodiment, the bending surface region F may include a segment skip region a1, a segment height variable region a2, and a segment height uniform region a3 from the core toward the outer circumference, similar to the embodiment of FIG. 19. However, since the uncoated portion of the second portion B3 is not bent, the radial length of the bending surface region F may be shorter than in the case of the above embodiment.

As shown in FIGS. 11a, 11b, and 11c, the bending surface region F includes a stack number uniform region b1 having a stack number of 10 or more adjacent to the segment skip region a1.

The bending surface region F may also include a stack number decrease region b2 adjacent to the winding turns of the second portion B3 of the electrode assembly 100, where the stack number of segments decreases toward the outer circumference. Preferably, the stack number uniform region b1 may be set as a welding target area.

In the bending surface region F, the preferred numerical ranges of the ratio (a2/c) of the height variable region a2 of the segments to the radial region c containing segments, the ratio (b1/c) of the stack number uniform region b1 of the segments, and the ratio of the area of the stack number uniform region b1 to the area of the bending surface region F are already described above, and thus will not be described again.

The first current collecting plate 144 may be welded to the bending surface region F of the first uncoated portion 146a, and the second current collecting plate 176 may be welded to the bending surface region F of the second uncoated portion 146b.

The overlapping relationship between the stack number uniform region b1 and the stack number decrease region b2 and the welding region W, the outer diameters of the first current collecting plate 144 and the second current collecting plate 176, and the configuration in which the first portion B1 does not block the core are substantially the same as described above.

Figure 21:
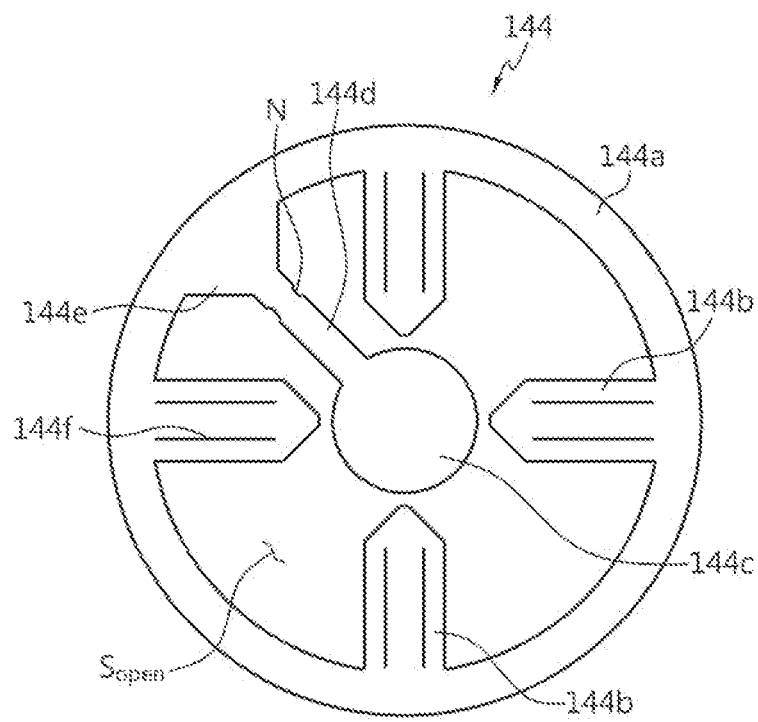
FIG. 21 is a top plan view showing a structure of a first current collecting plate according to an embodiment of the present disclosure.
Figure 22:
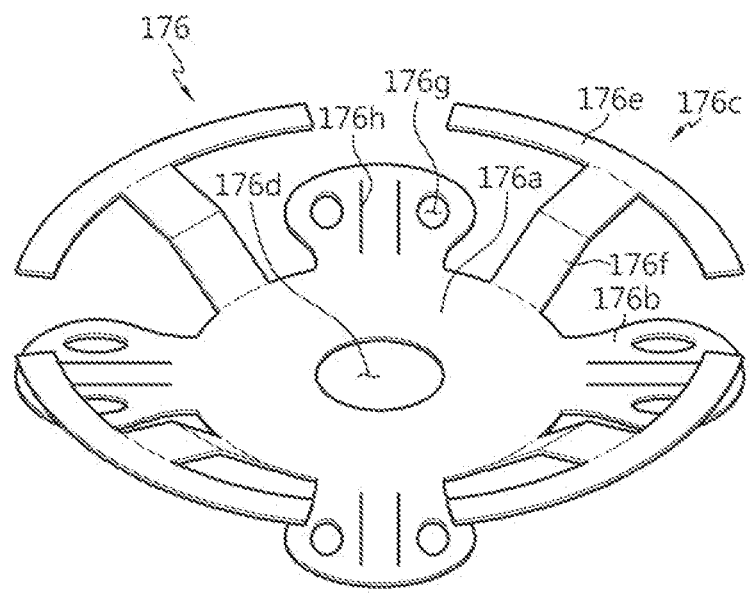
FIG. 22 is a perspective view showing a structure of a second current collecting plate according to an embodiment of the present disclosure.

In the embodiments (modifications), the first current collecting plate 144 and the second current collecting plate 176 included in the cylindrical batteries 200, 220 including the rivet terminal 172 may have an improved structure as shown in FIGS. 21 and 22.

The improved structure of the first current collecting plate 144 and the second current collecting plate 176 may contribute to lowering the resistance of the cylindrical battery, improving vibration resistance, and improving energy density. In particular, the first current collecting plate 144 and the second current collecting plate 176 are more effective when used in a large cylindrical battery whose ratio of diameter to height is greater than 0.4.

FIG. 21 is a top plan view showing the structure of the first current collecting plate 144 according to an embodiment of the present disclosure.

Referring to FIGS. 20 and 21 together, the first current collecting plate 144 may include an edge portion 144a, a first uncoated portion coupling portion 144b, and a terminal coupling portion 144c. The edge portion 144a is disposed on the electrode assembly 100. The edge portion 144a may have a substantially rim shape having an empty space ($S_{open}$) formed therein. In the drawings of the present disclosure, only a case in which the edge portion 144a has a substantially circular rim shape is illustrated, but the present disclosure is not limited thereto. The edge portion 61 may have a substantially rectangular rim shape, a hexagonal rim shape, an octagonal rim shape, or other rim shapes, unlike the illustrated one. The number of the edge portion 144a may be increased to two or more. In this case, another edge portion in the form of a rim may be included inside the edge portion 144a.

The terminal coupling portion 144c may have a diameter equal to or greater than the diameter of the flat portion 172c formed on the bottom surface of the rivet terminal 172 in order to secure a welding region for coupling with the flat portion 172c formed on the bottom surface of the rivet terminal 172.

The first uncoated portion coupling portion 144b extends inward from the edge portion 144a and is coupled to the bending surface region F of the uncoated portion 146a by welding. The terminal coupling portion 144c is spaced apart from the first uncoated portion coupling portion 144b and is positioned inside the edge portion 144a. The terminal coupling portion 144c may be coupled to the rivet terminal 172 by welding. The terminal coupling portion 144c may be located, for example, approximately at the center of the inner space ($S_{open}$) surrounded by the edge portion 144a. The terminal coupling portion 144c may be provided at a position corresponding to the hole formed in the core C of the electrode assembly 100. The terminal coupling portion 144c may be configured to cover the hole formed in the core C of the electrode assembly 100 so that the hole formed in the core C of the electrode assembly 100 is not exposed out of the terminal coupling portion 144c. To this end, the terminal coupling portion 144c may have a larger diameter or width than the hole formed in the core C of the electrode assembly 100.

The first uncoated portion coupling portion 144b and the terminal coupling portion 144c may not be directly connected, but may be disposed to be spaced apart from each other and indirectly connected by the edge portion 144a. Since the first current collecting plate 144 has a structure in which the first uncoated portion coupling portion 144b and the terminal coupling portion 144c are not directly connected to each other but are connected through the edge portion 144c as above, when shock and/or vibration occurs at the cylindrical battery 220, it is possible to disperse the shock applied to the coupling portion between the first uncoated portion coupling portion 144b and the first uncoated portion 146a and the coupling portion between the terminal coupling portion 144c and the rivet terminal 172. In the drawings of the present disclosure, only a case in which four first uncoated portion coupling portions 144b are provided is illustrated, but the present disclosure is not limited thereto. The number of the first uncoated portion coupling portions 144b may be variously determined in consideration of manufacturing difficulty according to the complexity of the shape, electric resistance, the inner space ($S_{open}$) inside the edge portion 144a considering electrolyte impregnation, and the like.

The first current collecting plate 144 may further include a bridge portion 144d extending inward from the edge portion 144a and connected to the terminal coupling portion 144c. At least a part of the bridge portion 144d may have a smaller sectional area compared to the first uncoated portion coupling portion 144b and the edge portion 144a. For example, at least a part of the bridge portion 144d may be formed to have a smaller width and/or thickness compared to the first uncoated portion coupling portion 144b. In this case, the electric resistance increases in the bridge portion 144d. Therefore, when a current flows through the bridge portion 144d, the relatively large resistance causes a part of the bridge portion 144d to be melted due to overcurrent heating. Accordingly, the overcurrent is irreversibly blocked. The sectional area of the bridge portion 144d may be adjusted to an appropriate level in consideration of the overcurrent blocking function.

The bridge portion 144d may include a taper portion 144e whose width is gradually decreased from the inner surface of the edge portion 144a toward the terminal coupling portion 144c. When the taper portion 144e is provided, the rigidity of the component may be improved at the connection portion between the bridge portion 144d and the edge portion 144a. When the taper portion 144e is provided, in the process of manufacturing the cylindrical battery 220, for example, a transfer device and/or a worker may easily and safely transport the first current collecting plate 144 and/or a coupled body of the first current collecting plate 144 and the electrode assembly 100 by gripping the taper portion 144e. That is, when the taper portion 144e is provided, it is possible to prevent product defects that may occur by gripping a portion where welding is performed with other components such as the first uncoated portion coupling portion 144b and the terminal coupling portion 144c.

The first uncoated portion coupling portion 144b may be provided in plural. The plurality of first uncoated portion coupling portions 144b may be disposed substantially at regular intervals from each other in the extending direction of the edge portion 144a. An extension length of each of the plurality of first uncoated portion coupling portions 144b may be substantially equal to each other. The first uncoated portion coupling portion 144b may be coupled to the bending surface region F of the uncoated portion 146a by laser welding. The welding may be replaced by ultrasonic welding, spot welding, or the like.

A welding pattern 144f formed by welding between the first uncoated portion coupling portion 144b and the bending surface region F may have a structure extending along the radial direction of the electrode assembly 100. The welding pattern 144f may be an array of line patterns or dot patterns.

The welding pattern 144f corresponds to the welding region. Therefore, it is desirable that the welding pattern 144f overlaps with the stack number uniform region b1 of the bending surface region F by 50% or more. The welding pattern 144f that does not overlap with the stack number uniform region b1 may overlap with the stack number decrease region b2. More preferably, the entire welding pattern 144f may overlap with the stack number uniform region b1 of the bending surface region F. In the bending surface region F below the point where the welding pattern 144f is formed, the stack number uniform region b1 and, optionally, the stack number decrease region b2 preferably have the stack number of 10 or more.

The terminal coupling portion 144c may be disposed to be surrounded by the plurality of first uncoated portion coupling portions 144b. The terminal coupling portion 144c may be coupled to the flat portion 172c of the rivet terminal 172 by welding. The bridge portion 144d may be positioned between a pair of first uncoated portion coupling portions 144b adjacent to each other. In this case, the distance from the bridge portion 144d to any one of the pair of first uncoated portion coupling portions 144b along the extending direction of the edge portion 144a may be substantially equal to the distance from the bridge portion 144d to the other one of the pair of first uncoated portion coupling portions 144b along the extending direction of the edge portion 144a. The plurality of first uncoated portion coupling portions 144b may be formed to have substantially the same sectional area. The plurality of first uncoated portion coupling portions 144b may be formed to have substantially the same width and thickness.

Although not shown in the drawings, the bridge portion 144d may be provided in plural. Each of the plurality of bridge portions 144d may be disposed between a pair of first uncoated portion coupling portions 144b adjacent to each other. The plurality of bridge portions 144d may be disposed substantially at regular intervals to each other in the extending direction of the edge portion 144a. A distance from each of the plurality of bridge portions 144d to one of the pair of first uncoated portion coupling portions 144b adjacent to each other along the extending direction of the edge portion 144a may be substantially equal to a distance from each of the plurality of the bridge portion 144d to the other first uncoated portion coupling portion 144b.

In the case where the first uncoated portion coupling portion 144b and/or the bridge portion 144d is provided in plural as described above, if the distance between the first uncoated portion coupling portions 144b and/or the distance between the bridge portions 144d and/or the distance between the first uncoated portion coupling portion 144b and the bridge portion 144d is uniformly formed, a current flowing from the first uncoated portion coupling portion 144b toward the bridge portion 144d or a current flowing from the bridge portion 144d toward the first uncoated portion coupling portion 144b may be smoothly formed.

The bridge portion 144d may include a notching portion N formed to partially reduce a sectional area of the bridge portion 144d. The sectional area of the notching portion N may be adjusted, for example, by partially reducing the width and/or thickness of the bridge portion 144d. When the notching portion N is provided, electric resistance is increased in the region where the notching portion N is formed, thereby enabling rapid current interruption when overcurrent occurs.

The notching portion N is preferably provided in a region corresponding to the stack number uniform region of the electrode assembly 100 in order to prevent foreign substances generated during rupturing from flowing into the electrode assembly 100. This is because, in this region, the number of overlapping layers of the segments of the uncoated portion 146*a* is maintained to the maximum and thus the overlapped segments may function as a mask.

The notching portion N may be wrapped with an insulating tape. Then, since the heat generated in the notching portion N is not dissipated to the outside, the notching portion N may be ruptured more quickly when an overcurrent flows through the bridge portion 144*d*.

FIG. 22 is a top plan view showing the structure of the second current collecting plate 176 according to an embodiment of the present disclosure.

Referring to FIGS. 20 and 22 together, the second current collecting plate 176 is disposed below the electrode assembly 100. In addition, the second current collecting plate 176 may be configured to electrically connect the uncoated portion 146*b* of the electrode assembly 100 and the battery housing 171. The second current collecting plate 176 is made of a metal material with conductivity and is electrically connected to the bending surface region F of the uncoated portion 146*b*. In addition, the second current collecting plate 176 is electrically connected to the battery housing 171. The edge portion of the second current collecting plate 176 may be interposed and fixed between the inner surface of the battery housing 171 and the first gasket 178*b*. Specifically, the edge portion of the second current collecting plate 176 may be interposed between the lower surface of the beading portion 180 of the battery housing 171 and the first gasket 178*b*. However, the present disclosure is not limited thereto, and the edge portion of the second current collecting plate 176 may be welded to the inner wall surface of the battery housing 171 in a region where the beading portion 180 is not formed.

The second current collecting plate 176 may include a support portion 176*a* disposed below the electrode assembly 100, a second uncoated portion coupling portion 176*b* extending from the support portion 176*a* approximately along the radial direction of the electrode assembly 100 and coupled to the bending surface region F of the uncoated portion 146*b*, and a housing coupling portion 176*c* extending from the support portion 176*a* toward the inner surface of the battery housing 171 approximately along an inclined direction based on the radial direction of the electrode assembly 100 and coupled to the inner surface of the battery housing 171. The second uncoated portion coupling portion 176*b* and the housing coupling portion 176*c* are indirectly connected through the support portion 176*a*, and are not directly connected to each other. Therefore, when an external shock is applied to the cylindrical battery 220 of the present disclosure, it is possible to minimize the possibility of damage to the coupling portion of the second current collecting plate 176 and the electrode assembly 100 and the coupling portion of the second current collecting plate 176 and the battery housing 171. However, the second current collecting plate 176 of the present disclosure is not limited to the structure where the second uncoated portion coupling portion 176*b* and the housing coupling portion 176*c* are only indirectly connected. For example, the second current collecting plate 176 may have a structure that does not include the support portion 176*a* for indirectly connecting the second uncoated portion coupling portion 176*b* and the housing coupling portion 176*c* and/or a structure in which the uncoated portion 146*b* and the housing coupling portion 176*c* are directly connected to each other.

The support portion 176*a* and the second uncoated portion coupling portion 176*b* are disposed below the electrode assembly 100. The second uncoated portion coupling portion 176*b* is coupled to the bending surface region F of the uncoated portion 146*b*. In addition to the second uncoated portion coupling portion 176*b*, the support portion 176*a* may also be coupled to the uncoated portion 146*b*. The second uncoated portion coupling portion 176*b* and the bending surface region F of the uncoated portion 146*b* may be coupled by welding. The welding may be replaced with ultrasonic welding or spot welding. The support portion 176*a* and the second uncoated portion coupling portion 176*b* are located higher than the beading portion 180 when the beading portion 180 is formed on the battery housing 171.

The support portion 176*a* has a current collecting plate hole 176*d* formed at a location corresponding to the hole formed at the core C of the electrode assembly 100. The core C of the electrode assembly 100 and the current collecting plate hole 176*d* communicating with each other may function as a passage for inserting a welding rod for welding between the rivet terminal 172 and the terminal coupling portion 144*c* of the first current collecting plate 144 or for irradiating a laser beam.

The current collecting plate hole 176*d* may have a radius of $0.5r_c$ or more compared to the radius ($r_c$) of the hole formed in the core C of the electrode assembly 100. If the radius of the current collecting plate hole 176*d* is $0.5r_c$ to $1.0r_c$, when a vent occurs in the cylindrical battery 220, the phenomenon that the winding structure of the separator or electrodes near the core C of the electrode assembly 100 is pushed out of the core C due to the vent pressure is prevented. When the radius of the current collecting plate hole 176*d* is larger than $1.0r_c$, the opening of the core C is maximized, so the electrolyte may be easily injected in the electrolyte injection process.

When the second uncoated portion coupling portion 176*b* is provided in plural, the plurality of second uncoated portion coupling portions 176*b* may have a shape extending approximately radially from the support portion 176*a* of the second current collecting plate 176 toward the sidewall of the battery housing 171. The plurality of second uncoated portion coupling portions 176*b* may be positioned to be spaced apart from each other along the periphery of the support portion 176*a*.

The housing coupling portion 176*c* may be provided in plural. In this case, the plurality of housing coupling portions 176*c* may have a shape extending approximately radially from the center of the second current collecting plate 176 toward the sidewall of the battery housing 171. Accordingly, the electrical connection between the second current collecting plate 176 and the battery housing 171 may be made at a plurality of points. Since the coupling for electrical connection is made at a plurality of points, the coupling area may be maximized, thereby minimizing electric resistance. The plurality of housing coupling portions 176*c* may be positioned to be spaced apart from each other along the periphery of the support portion 176*a*. At least one housing coupling portion 176*c* may be positioned between the second uncoated portion coupling portions 176*b* adjacent to each other. The plurality of housing coupling portions 176*c* may be coupled to, for example, the beading portion 180 in the inner surface of the battery housing 171. The housing coupling portions 176*c* may be coupled, particularly, to the lower surface of the beading portion 180 by laser welding. The welding may be replaced with, for example, ultrasonic welding, spot welding, or the like. By coupling the plurality of housing coupling portions 176*c* on the beading portion 180 by welding in this way, the current path may be distributed radially so that the resistance level of the cylindrical battery 220 is limited to about 4 milliohms or less. In addition, as the lower surface of the beading portion 180 has a shape extending in a direction approximately parallel to the upper surface of the battery housing 171, namely in a direction approximately perpendicular to the sidewall of the battery housing 171, and the housing coupling portion 176c also has a shape extending in the same direction, namely in the radial direction and the circumferential direction, the housing coupling portion 176c may be stably in contact with the beading portion 180. In addition, as the housing coupling portion 176c is stably in contact with the flat portion of the beading portion 180, the two components may be welded smoothly, thereby improving the coupling force between the two components and minimizing the increase in resistance at the coupling portion.

The housing coupling portion 176c may include a contact portion 176e coupled onto the inner surface of the battery housing 171 and a connection portion 176f for connecting the support portion 176a and the contact portion 176e.

The contact portion 176e is coupled onto the inner surface of the battery housing 171. In the case where the beading portion 180 is formed on the battery housing 171, the contact portion 176e may be coupled onto the beading portion 180 as described above. More specifically, the contact portion 176e may be electrically coupled to the flat portion formed at the lower surface of the beading portion 180 formed on the battery housing 171, and may be interposed between the lower surface of the beading portion 180 and the first gasket 178b. In this case, for stable contact and coupling, the contact portion 176e may have a shape extending on the beading portion 180 by a predetermined length along the circumferential direction of the battery housing 171.

The connection portion 176f may be bent at an obtuse angle. The bending point may be higher than the middle point of the connection portion 176f. When the connection portion 176f is bent, the contact portion 176e may be stably supported on the flat surface of the beading portion 180. The connection portion 176f is divided into a lower portion and an upper portion based on the bending point, and the lower portion may have a greater length than the upper portion. In addition, the lower portion of the bending point may have a greater inclination angle based on the surface of the support portion 176a than the upper portion. When the connection portion 176f is bent, a pressure (force) applied in the vertical direction of the battery housing 171 may be buffered. For example, in the process of sizing the battery housing 171, when a pressure is transmitted to the contact portion 176e so that the contact portion 176e moves vertically toward the support portion 176b, the bending point of the connection portion 176f moves upward, so that the shape of the connection portion 176 is deformed to buffer the stress.

Meanwhile, the maximum distance from the center of the second current collecting plate 176 to the end of the second uncoated portion coupling portion 176b along the radial direction of the electrode assembly 100 is preferably equal to or smaller than the inner diameter of the battery housing 171 in a region where the beading portion 180 is formed, namely the minimum inner diameter of the battery housing 171. This is to prevent the end of the second uncoated portion coupling portion 176b from pressing the edge of electrode assembly 100 during the sizing process of compressing the battery housing 171 along the height direction.

The second uncoated portion coupling portion 176b includes a hole 176g. The hole 176g may be used as a passage through which the electrolyte may move. The welding pattern 176h formed by welding between the second uncoated portion coupling portion 176b and the bending surface region F may have a structure to extend along the radial direction of the electrode assembly 100. The welding pattern 176h may be a line pattern or a dot array pattern.

The welding pattern 176h corresponds to the welding region. Therefore, it is preferable that the welding pattern 176h overlaps by 50% or more with the stack number uniform region b1 of the bending surface region F located in the lower portion of the electrode assembly 100. The welding pattern 176h that does not overlap with the stack number uniform region b1 may overlap with the stack number decrease region b2. More preferably, the entire welding pattern 176h may overlap with the stack number uniform region b1 of the bending surface region F. In the bending surface region F at the upper portion of the point where the welding pattern 176h is formed, the stack number uniform region b1 and, optionally, the stack number decrease region b2 preferably have the stack number of 10 or more.

The outer diameters of the first current collecting plate 144 and the second current collecting plate 176 described above are different from each other. The outer diameter is an outer diameter of the contact area between the bending surface region F and the current collecting plate. The outer diameter is defined as a maximum value of the distance between two points where a straight line passing through the center of the core C of the electrode assembly meets the edge of the contact area. Since the second current collecting plate 176 is located inside the beading portion, its outer diameter is smaller than that of the first current collecting plate 144. In addition, the length of the welding pattern 144f of the first current collecting plate 144 is longer than the length of the welding pattern 176h of the second current collecting plate 176. Preferably, the welding pattern 144f and the welding pattern 176h may extend toward the outer circumference from substantially the same point based on the center of the core C.

The cylindrical battery 200, 220 according to an embodiment of the present disclosure have an advantage in that electrical connection can be performed at the upper portion thereof.

Figure 23:
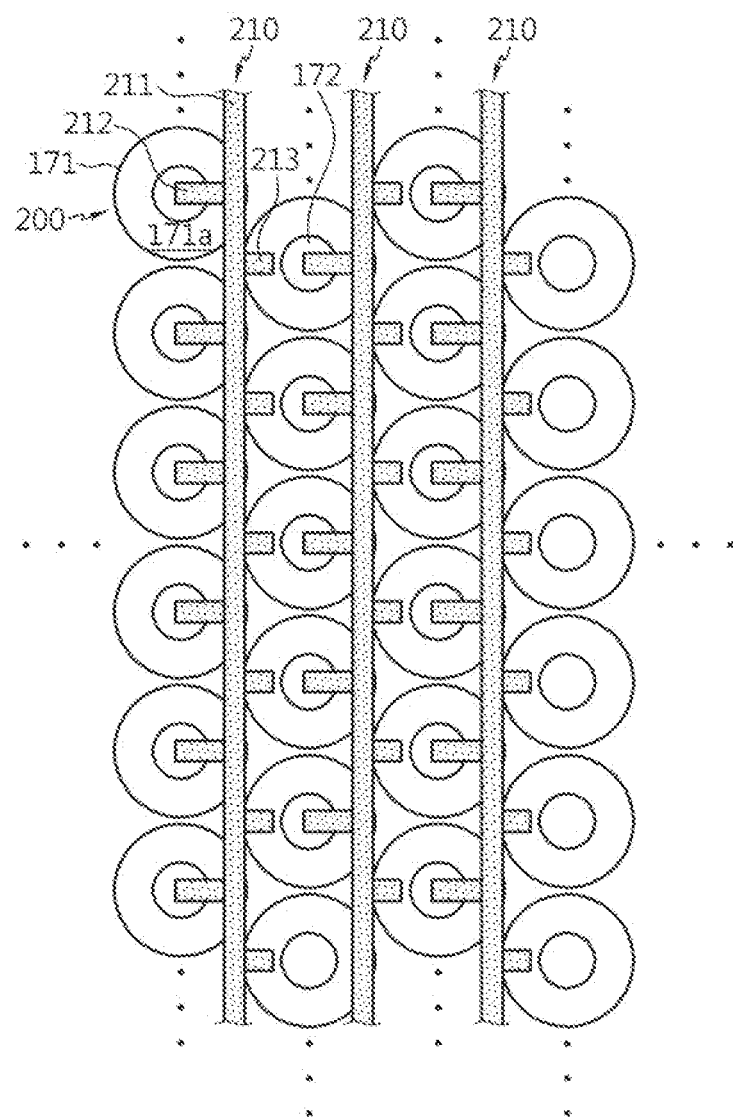
FIG. 23 is a top plan view showing a state in which a plurality of cylindrical batteries are electrically connected.
Figure 24:
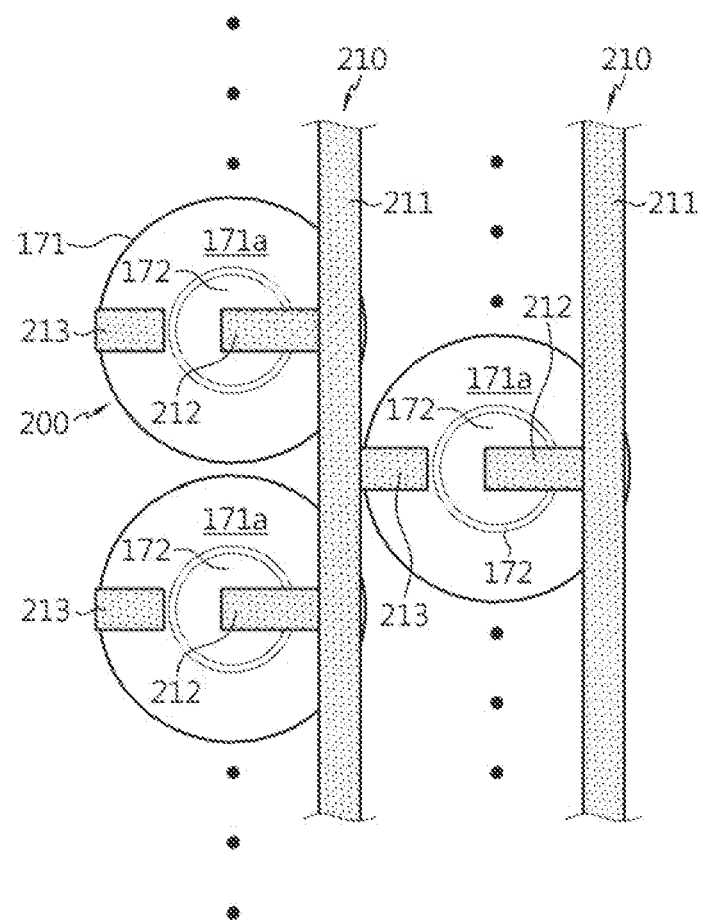
FIG. 24 is a partially enlarged view of FIG. 23.

FIG. 23 is a top plan view illustrating a state in which a plurality of cylindrical batteries 200 are electrically connected, and FIG. 24 is a partially enlarged view of FIG. 23. The cylindrical battery 200 may be replaced with a cylindrical battery 220 having a different structure.

Referring to FIGS. 23 and 24, a plurality of cylindrical batteries 200 may be connected in series and in parallel at an upper portion of the cylindrical batteries 200 using a bus bar 210. The number of cylindrical batteries 200 may be increased or decreased in consideration of the capacity of the battery pack.

In each cylindrical battery 200, the rivet terminal 172 may have a positive polarity, and the flat surface 171a around the rivet terminal 172 of the battery housing 171 may have a negative polarity, or vice versa.

Preferably, the plurality of cylindrical batteries 200 may be arranged in a plurality of columns and rows. Columns are provided in a vertical direction based on the drawing, and rows are provided in a left and right direction based on the drawing. In addition, in order to maximize space efficiency, the cylindrical batteries 200 may be arranged in a closest packing structure. The closest packing structure is formed when an equilateral triangle is formed by connecting the centers of the rivet terminals 172 exposed out of the battery housing 171 to each other. Preferably, the bus bar 210 connects the cylindrical batteries 200 arranged in the same column in parallel to each other, and connects the cylindrical batteries 200 arranged in two neighboring columns in series with each other.

Preferably, the bus bar 210 may include a body portion 211, a plurality of first bus bar terminals 212 and a plurality of second bus bar terminals 213 for serial and parallel connection.

The body portion 211 may extend along the column of the cylindrical batteries 200 between neighboring rivet terminals 172. Alternatively, the body portion 211 may extend along the column of the cylindrical batteries 200, and may be regularly bent like a zigzag shape.

The plurality of first bus bar terminals 212 may extend in one side direction of the body portion 211 and may be electrically coupled to the rivet terminal 172 of the cylindrical battery 200 located in one side direction. The electrical connection between the first bus bar terminal 212 and the rivet terminal 172 may be achieved by laser welding, ultrasonic welding, or the like.

The plurality of second bus bar terminals 213 may extend in the other side direction of the body portion 211 and may be electrically coupled to the flat surface 171a around the rivet terminal 172 located in the other side direction. The electrical coupling between the second bus bar terminal 213 and the flat surface 171a may be performed by laser welding, ultrasonic welding, or the like.

Preferably, the body portion 211, the plurality of first bus bar terminals 212 and the plurality of second bus bar terminals 213 may be made of one conductive metal plate. The metal plate may be, for example, an aluminum plate or a copper plate, but the present disclosure is not limited thereto. In a modified example, the body portion 211, the plurality of first bus bar terminals 212 and the second bus bar terminals 213 may be manufactured as separate pieces and then coupled to each other by welding or the like.

The cylindrical battery 200 of the present disclosure as described above has a structure in which resistance is minimized by enlarging the welding region by means of the bending surface region F, multiplexing current paths by means of the second current collecting plate 176, minimizing a current path length, or the like. The AC resistance of the cylindrical battery 200 measured through a resistance meter between the positive electrode and the negative electrode, namely between the rivet terminal 172 and the flat surface 171a around the rivet terminal 172, may be approximately 4 milliohms or less, suitable for fast charging.

In the cylindrical battery 200 according to the present disclosure, since the rivet terminal 172 having a positive polarity and the flat surface 171a having a negative polarity are located in the same direction, it is easy to electrically connect the cylindrical batteries 200 using the bus bar 210.

In addition, since the rivet terminal 172 of the cylindrical battery 200 and the flat surface 171a around the rivet terminal 172 have a large area, the coupling area of the bus bar 210 may be sufficiently secured to sufficiently reduce the resistance of the battery pack including the cylindrical battery 200.

In addition, since electrical wiring may be performed on the upper portion of the cylindrical battery 200, there is an advantage in maximizing the energy density per unit volume of the battery module/pack.

The cylindrical battery according to the above embodiments (modifications) may be used to manufacture a battery pack.

Figure 25:
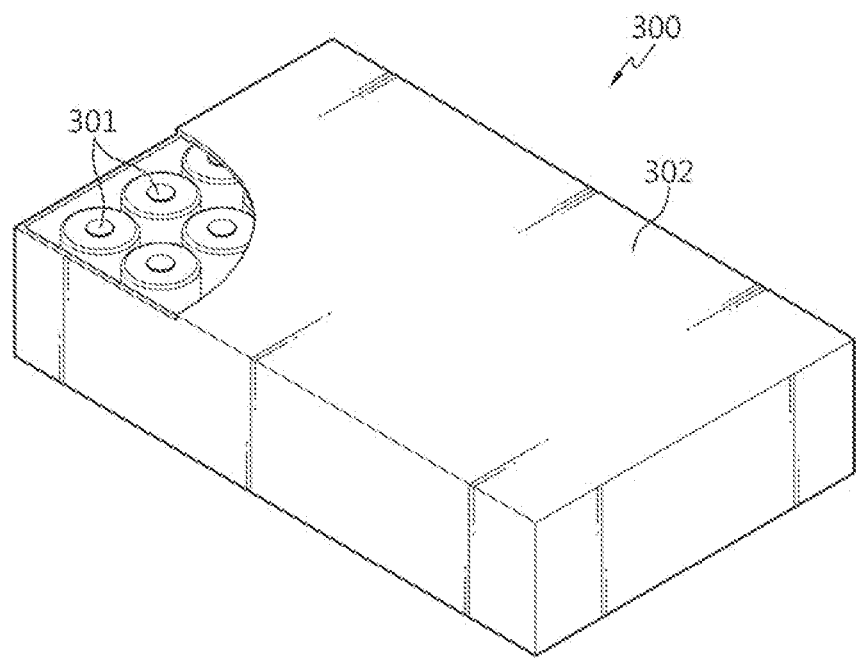
FIG. 25 is a diagram schematically showing a battery pack according to an embodiment of the present disclosure.

FIG. 25 is a diagram schematically showing a battery pack according to an embodiment of the present disclosure.

Referring to FIG. 25, a battery pack 300 according to an embodiment of the present disclosure includes an aggregate in which cylindrical batteries 301 are electrically connected, and a pack housing 302 for accommodating the aggregate. The cylindrical battery 301 may be any one of the batteries according to the above embodiments (modifications). In the drawing, components such as a bus bar for electrical connection of the cylindrical batteries 301, a cooling unit, and an external terminal are not depicted for convenience of illustration.

The battery pack 300 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 26:
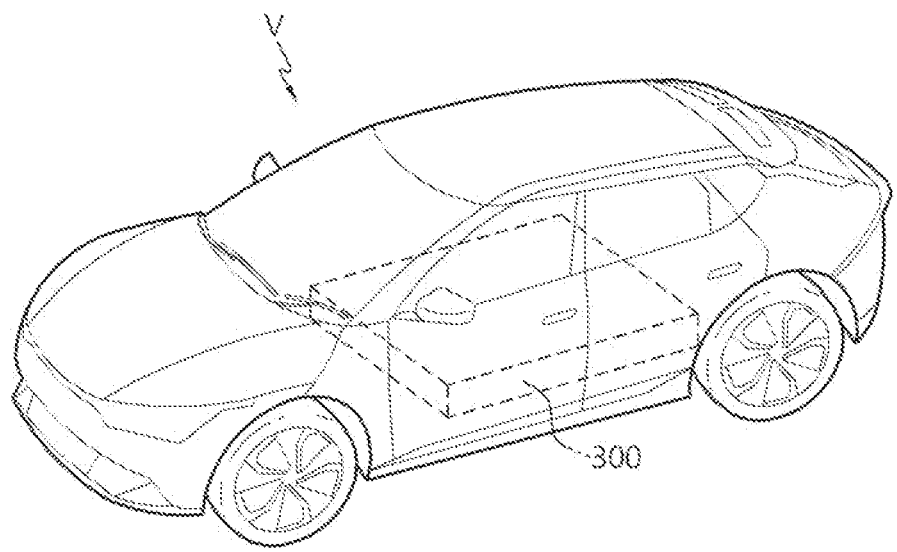
FIG. 26 is a diagram schematically showing a vehicle including the battery pack according to an embodiment of the present disclosure.

FIG. 26 is a diagram schematically showing a vehicle including the battery pack 300 of FIG. 25.

Referring to FIG. 26, a vehicle V according to an embodiment of the present disclosure includes the battery pack 300 according to an embodiment of the present disclosure. The vehicle V operates by receiving power from the battery pack 300 according to an embodiment of the present disclosure.

According to the present disclosure, the internal resistance of the battery may be reduced, and the energy density may be increased by using the uncoated portion itself protruding at the upper portion and the lower portion of the electrode assembly as an electrode tab.

According to another aspect of the present disclosure, by improving the structure of the uncoated portion of the electrode assembly so that the electrode assembly and the inner circumference of the battery housing do not interfere in the process of forming the beading portion of the battery housing, it is possible to prevent a short circuit from occurring inside the cylindrical battery due to partial deformation of the electrode assembly.

According to still another aspect of the present disclosure, by improving the structure of the uncoated portion of the electrode assembly, it is possible to prevent the uncoated portion from being torn when the uncoated portion is bent, and it is possible to improve the welding strength of the current collecting plate by sufficiently increasing the number of overlapping layers of the uncoated portion.

According to still another aspect of the present disclosure, it is possible to improve electrolyte impregnation (rate and uniformity) by applying a plurality of segments to the uncoated portion of the electrode, arranging the plurality of segments in a predetermined direction when the electrode is wound, and exposing the end of the active material layer formed on the electrode between the winding turn of the separator in a region where the segments are not disposed.

According to still another aspect of the present disclosure, by applying a segment structure to the uncoated portion of the electrode and optimizing the dimensions (width, height, separation pitch) of the segments to sufficiently increase the segment stack number of the area used as the welding target area, it is possible to improve the properties of the area where the current collecting plate is welded.

According to still another aspect of the present disclosure, an electrode assembly having improved energy density and reduced resistance may be provided by applying a structure in which a current collecting plate is welded to a broad area of the bending surface region formed by bending the segments.

According to still another aspect of the present disclosure, a cylindrical battery having an improved design so that electrical wiring can be performed at the upper portion thereof may be provided.

According to still another aspect of the present disclosure, by improving the structure of the uncoated portion adjacent to the core of the electrode assembly, the cavity in the core of the electrode assembly is prevented from being blocked when the uncoated portion is bent, so that the electrolyte injection process and the process of welding the battery housing (or, rivet terminal) and the current collecting plate may be easily performed.

According to still another aspect of the present disclosure, it is possible to provide a cylindrical battery having a structure in which the internal resistance is low, an internal short circuit is prevented, and the welding strength between the current collecting plate and the uncoated portion is improved, and a battery pack and a vehicle including the cylindrical battery.

In particular, the present disclosure may provide a cylindrical battery having a ratio of diameter to height of 0.4 or more and a resistance of 4 milliohm or less, and a battery pack and a vehicle including the cylindrical battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode assembly comprising a first electrode, a second electrode, and a separator interposed therebetween, the first electrode, the second electrode, and the separator being wound in a winding direction about a winding axis to define a core and an outer circumference of the electrode assembly,
    wherein the first electrode includes a first active material portion coated with an active material layer along the winding direction and a first uncoated portion not coated with an active material layer, the first uncoated portion protruding beyond the separator, the first uncoated portion including a segment region divided into a plurality of independently bendable segments by a plurality of cut grooves along the winding direction, the segment region including a plurality of segment groups separated by a group separation pitch along the winding direction,
    wherein a first end of the electrode assembly includes a plurality of segment alignments in which the plurality of segment groups are aligned to be overlapped along a radial direction of the electrode assembly, the segments included in each segment alignment are bent along the radial direction to form a bending surface region, and
    wherein, in winding turns corresponding to the plurality of segment alignments, group separation pitches of segment groups disposed in a same winding turn are substantially identical, and separation pitches of the segment groups is greater in a winding turn of a region adjacent to the outer circumference of the electrode assembly than in a winding turn of a region adjacent to the core of the electrode assembly.

2. The electrode assembly according to claim 1, wherein each segment alignment includes a radial region in which the group separation pitch increases stepwise or gradually from the winding turn of the region adjacent to the core of the electrode assembly toward the winding turn of the region adjacent to the outer circumference.

3. The electrode assembly according to claim 1, wherein the bending surface region of each segment alignment partially defines a surface of the first end of the electrode assembly.

4. The electrode assembly according to claim 3, wherein the bending surface region of each segment alignment approximately has a shape of a geometric figure, and
    wherein widths in the winding direction of segment groups located within the geometric figure increase stepwise or gradually along the radial direction of the electrode assembly.

5. The electrode assembly according to claim 4, wherein the geometric figure has a fan shape.

6. The electrode assembly according to claim 4, wherein the geometric figure has a rectangular or trapezoidal shape.

7. The electrode assembly according to claim 1, wherein an electrolyte impregnation portion is defined between adjacent bending surface regions in a circumferential direction of the electrode assembly, whereby an end of the first active material portion is recessed inward from the first end of the electrode assembly relative to an end of the separator such that the end of the first active material portion is exposed between the winding turns of the separator.

8. The electrode assembly according to claim 7, wherein the plurality of segment alignments extend radially based on a center of the core of the electrode assembly.

9. The electrode assembly according to claim 7, wherein each of the electrolyte impregnation portions extend radially based on the center of the core of the electrode assembly.

10. The electrode assembly according to claim 1, wherein the plurality of segment alignments extend in a cross (+) shape or a linear shape based on a center of the core of the electrode assembly, when viewed along the winding axis of the electrode assembly.

11. The electrode assembly according to claim 1, wherein, when a line connecting a center of the core of the electrode assembly and a geometric center of a figure approximately corresponding to each bending surface region is defined as an angle measurement line, angles between adjacent angle measurement lines of adjacent bending surface regions in a circumferential direction of the electrode assembly are substantially identical.

12. The electrode assembly according to claim 1, wherein, when a line connecting a center of the core of the electrode assembly and a geometric center of a figure approximately corresponding to each bending surface region is defined as an angle measurement line, an angle between adjacent angle measurement lines of adjacent bending surface regions in a circumferential direction of the electrode assembly is 30°±10°, 40°±10°, 45°±10°, 60°±10°, 72°±10°, 90°±10°, 120°±10° or 180°±10°.

13. The electrode assembly according to claim 1, wherein, when a line connecting a center of the core of the electrode assembly and a geometric center of a figure approximately corresponding to each bending surface region is defined as an angle measurement line, an angle between adjacent angle measurement lines of adjacent bending surface regions in a circumferential direction of the electrode assembly is 90°±10°, and
    wherein the group separation pitch between segment groups disposed in a same winding turn is set within the range of 8 mm to 50 mm.

14. The electrode assembly according to claim 13, wherein the group separation pitch increases stepwise or gradually as the number of winding turns increases.

15. The electrode assembly according to claim 1, wherein, when a line connecting a center of the core of the electrode assembly and a geometric center of a figure approximately corresponding to the bending surface region is defined as an angle measurement line, an angle between adjacent angle measurement lines of adjacent bending surface regions in a circumferential direction of the electrode assembly is 180°±10°, and
wherein the group separation pitch between segment groups disposed in a same winding turn is set within the range of 30 mm to 90 mm.

16. The electrode assembly according to claim 15, wherein the group separation pitch increases stepwise or gradually as the number of winding turns increases.

17. The electrode assembly according to claim 1, wherein each of the segments has a shape of a geometric figure in which one or more straight lines, one or more curved lines, or combinations thereof are connected.

18. The electrode assembly according to claim 17, wherein each of the segments has a greater width in a lower portion than in an upper portion along the winding axis.

19. The electrode assembly according to claim 17, wherein each of the segments has a tapered shape in which a width decreases gradually or continuously from a lower portion toward an upper portion along the winding axis.

20. The electrode assembly according to claim 1, wherein each segment alignment includes a height variable region in which heights of the segments increase stepwise from a first height ($h_1$) to an $N-1^{th}$ height ($h_{N-1}$, N is a natural number of 3 or more) from the core of the electrode assembly toward the outer circumference of the electrode assembly, and a height uniform region in which heights of the segments are uniform as an $N^{th}$ height ($h_N$, greater than $h_{N-1}$).

21. The electrode assembly according to claim 20, wherein, when a starting radius of a winding turn containing a segment with a height $h_k$ (k is a natural number of 1 to N) is $r_k$ and the radius of the core of the electrode assembly is $r_c$, the height $h_k$ of the segment satisfies the following formula:

$$2\text{ mm} \leq h_k \leq r_k - \alpha^* r_c (\alpha \text{ is } 0.90 \text{ to } 1).$$

22. The electrode assembly according to claim 1, wherein, based on a cross section along the winding axis direction, and sequentially along the radial direction of the electrode assembly, each segment alignment includes a segment skip region having no segment, a height variable region where heights of the segments vary, and a height uniform region where heights of the segments are uniform, whereby the plurality of segments are disposed in the height variable region and the height uniform region.

23. The electrode assembly according to claim 22, wherein, when a number of segments meeting an imaginary line parallel to the winding axis direction at an arbitrary radius location of each bending surface region based on a center of the core of the electrode assembly is defined as a stack number of the segments at the corresponding radius location, the bending surface region includes, from the core of the electrode assembly toward the outer circumference of the electrode assembly, a stack number uniform region where the stack number of the segments is uniform and a stack number decrease region where the stack number of the segments decreases toward the outer circumference of the electrode assembly.

24. The electrode assembly according to claim 23, wherein, in the stack number uniform region, the stack number of the segments is 10 to 35.

25. The electrode assembly according to claim 23, wherein the first electrode is a positive electrode, and wherein a stack thickness of the segments in the stack number uniform region is in the range of 100 μm to 875 μm.

26. The electrode assembly according to claim 23, wherein the first electrode is a negative electrode, and
wherein a stack thickness of the segments in the stack number uniform region is in the range of 50 μm to 700 μm.

27. The electrode assembly according to claim 1, wherein the second electrode includes a second active material portion coated with an active material layer along the winding direction and a second uncoated portion not coated with an active material layer, the second uncoated portion including a segment region divided into a plurality of independently bendable segments by a plurality of cut grooves provided along the winding direction, the segment region of the second uncoated portion including a plurality of segment groups separated by a group separation pitch along the winding direction,
wherein a second end of the electrode assembly includes a plurality of segment alignments in which the plurality of segment groups of the second uncoated portion are aligned along the radial direction of the electrode assembly, the segments included in each segment alignment of the second uncoated portion are bent along the radial direction of the electrode assembly to form a bending surface region, and
wherein, in winding turns corresponding to the plurality of segment alignments of the second uncoated portion, group separation pitches of segment groups disposed in a same winding turn are substantially identical, and separation pitches of the segment groups of the second uncoated portion is greater in a winding turn of a region adjacent to the outer circumference of the electrode assembly than in a winding turn of the region adjacent to the core of the electrode assembly.

28. The electrode assembly according to claim 27, wherein the plurality of segment alignments included in the first end of the electrode assembly and the plurality of segment alignments included in the second end of the electrode assembly are disposed to be plane-symmetrical to each other.

29. The electrode assembly according to claim 1, wherein a total number of winding turns of the electrode assembly is 20 to 55, and
wherein the electrode assembly has a diameter of 35 mm to 50 mm.

30. A battery, comprising:
the electrode assembly according to claim 1;
a battery housing configured to accommodate the electrode assembly therein, the battery housing having an open end, the battery housing being electrically connected to one of the first electrode and the second electrode to have a first polarity;
a sealing body configured to seal the open end of the battery housing; and
a terminal having a surface exposed outside the battery housing, the terminal being electrically connected to another of the first electrode and the second electrode to have a second polarity.

31. The battery according to claim 30, further comprising:
a beading portion at the open end of the battery housing;
a current collecting plate electrically coupled to the bending surface regions; and
an insulator configured to cover the current collecting plate, the insulator having an edge interposed and fixed between an inner circumference of the beading portion and the current collecting plate.

32. The battery according to claim 30, wherein the electrode assembly has a cavity at the core of the electrode assembly, the cavity not being blocked by the bending surface region such that the cavity is exposed to outside the electrode assembly.

33. The battery according to claim 30, wherein the sealing body includes a cap plate configured to seal the open end of the battery housing, and a gasket configured to surround an edge of the cap plate and crimped to the open end of the battery housing, and wherein the terminal having the second polarity is the cap plate.

34. The battery according to claim 30, further comprising a current collecting plate electrically connected to the uncoated portion of the second electrode having the first polarity, at least a part of an edge of the current collection plate being coupled to a sidewall of the battery housing, wherein the sealing body includes a cap plate with no polarity and a gasket configured to surround an edge of the cap plate, the gasket being crimped to the open end of the battery housing, wherein the battery housing includes a perforation hole in a center of a closed surface of the battery housing opposite the open end of the battery housing, and wherein the terminal is a rivet terminal extending through the perforation hole, the terminal being insulated from the battery can and electrically connected to the first electrode to have the second polarity.

35. A battery pack, comprising a plurality of batteries according to claim 30.

36. A vehicle, comprising the battery pack according to claim 35.

* * * * *